United States Patent
England et al.

(10) Patent No.: US 11,521,473 B2
(45) Date of Patent: Dec. 6, 2022

(54) AUDIO/VIDEO ELECTRONIC DEVICE

(71) Applicant: Amazon Technologies, Inc., Seattle, WA (US)

(72) Inventors: Matthew J. England, Santa Monica, CA (US); Ilya Vladimirovich Brailovskiy, Los Gatos, CA (US); Jason Gluckman, Encinitas, CA (US); Spiro Sacre, Los Angeles, CA (US); James Siminoff, Pacific Palisades, CA (US); Mark Siminoff, Mountain View, CA (US); Matthew Carter, San Jose, CA (US); Robert Macauley, Santa Monica, CA (US); Andrii Malivanchuk, Sunnyvale, CA (US); Fernando Palomar, Venice, CA (US); Vadym Tkachuk, Kiev (UA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/587,749

(22) Filed: Sep. 30, 2019

(65) Prior Publication Data
US 2021/0097830 A1    Apr. 1, 2021

(51) Int. Cl.
*G08B 13/196* (2006.01)
*H04N 7/18* (2006.01)

(52) U.S. Cl.
CPC . *G08B 13/19695* (2013.01); *G08B 13/19604* (2013.01); *G08B 13/19645* (2013.01); *G08B 13/19665* (2013.01); *H04N 7/186* (2013.01)

(58) Field of Classification Search
CPC ........ H04N 7/186; H04N 5/243; H04N 5/144; H04N 5/23219; H04N 5/2351; H04N 5/2353; H04N 5/2355
See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 | 11/2003 |
| CN | 2792061 | 6/2006 |

(Continued)

OTHER PUBLICATIONS

The PCT Search Report and Written Opinion dated Nov. 6, 2020 for PCT Application No. PCT/US2020/050901, 15 pages.

(Continued)

*Primary Examiner* — Peet Dhillon
(74) *Attorney, Agent, or Firm* — Lee & Hayes, P.C.

(57) ABSTRACT

This disclosure describes, in part, an audio/video (A/V) device that includes a first camera for generating first image data and one or more second cameras for both motion detection and generating second image data. For instance, the A/V device may generate and then store the second image data in one or more buffers. The A/V device may then detect an event, such as possible motion of an object. Based on detecting the event, A/V device may cause the one or more second cameras to cease generating the second image data and cause the first camera to begin generating the first image data. The A/V device may then process the second image data and send the processed second image data to a computing system. Next, the A/V device may process the first image data and send the processed first image data to the computing system.

20 Claims, 25 Drawing Sheets

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,906,722 B1* | 2/2018 | Gigot ............... H04N 5/2351 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2010/0225455 A1 | 9/2010 | Claiborne et al. |
| 2013/0057695 A1 | 3/2013 | Huisking |
| 2014/0267716 A1 | 9/2014 | Child et al. |
| 2015/0035987 A1 | 2/2015 | Fernandez |
| 2015/0163463 A1 | 6/2015 | Hwang et al. |
| 2015/0213838 A1* | 7/2015 | Dinev ............... G11B 27/031 386/224 |
| 2015/0312486 A1* | 10/2015 | Song ............... H04N 5/23245 348/262 |
| 2017/0160138 A1* | 6/2017 | Jeong ............... G11B 20/00891 |
| 2018/0103200 A1 | 4/2018 | Bracy |
| 2018/0165933 A1 | 6/2018 | Siminoff |
| 2018/0176512 A1 | 6/2018 | Siminoff |
| 2018/0227507 A1* | 8/2018 | Siminoff ............... H04N 7/188 |
| 2018/0233010 A1* | 8/2018 | Modestine ........ G08B 13/19671 |
| 2018/0249059 A1* | 8/2018 | Jeong ............... H04N 5/2352 |
| 2018/0302569 A1* | 10/2018 | Cabral ............. H04N 5/232939 |
| 2018/0338129 A1* | 11/2018 | Hejl ................ H04N 13/239 |
| 2018/0343390 A1 | 11/2018 | Duran et al. |
| 2020/0036918 A1* | 1/2020 | Ingle ............... H04N 5/35509 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

OTHER PUBLICATIONS

The International Preliminary Report on Patentability for PCT Application No. PCT/US20/50901, dated Apr. 14, 2022, 9 pages.

\* cited by examiner

AUDIO/VIDEO ELECTRONIC DEVICE

BACKGROUND

Home security is a concern for many homeowners and renters. Those seeking to protect or monitor their homes often wish to have video and audio communications with visitors. Audio/Video recording and communication devices (A/V devices) provide this functionality. For example, audio data and video data generated by an A/V device can be uploaded to a computing system. The computing system may then send the audio data and video data to a client device associated with the A/V device. Using the audio data and video data, the client device may display video representing a visitor as well as output sound representing speech from the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
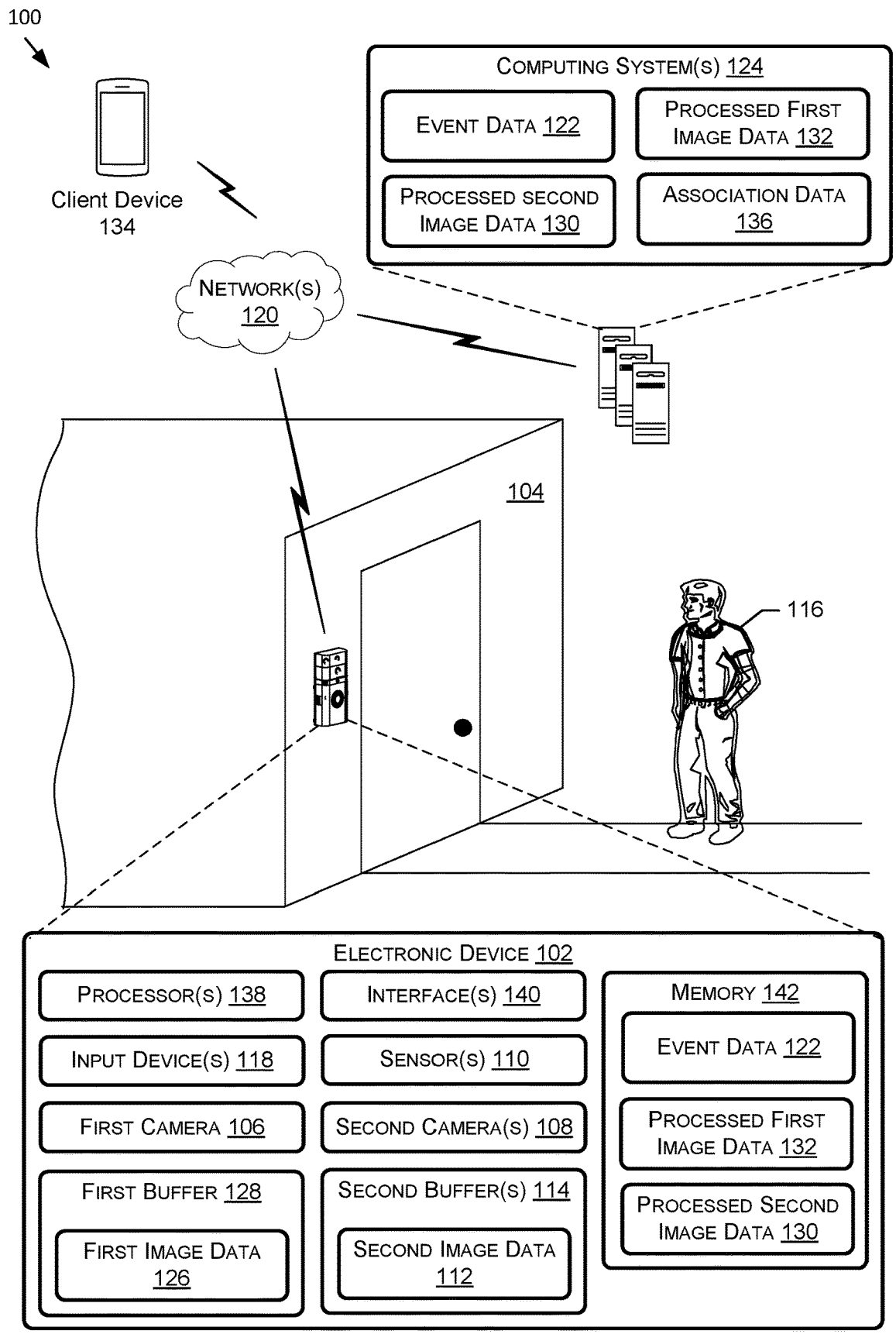
FIG. 1 is a functional block diagram illustrating an example environment that includes an electronic device using different types of cameras to generate image data representing an event, according to various aspects of the present disclosure.

An electronic device (e.g., an A/V device, a security camera, and/or any other device that includes at least one camera) may detect motion and, in response, generate image data representing image(s) depicting a field of view (FOV) of the electronic device. The electronic device may then send the image data to a computing system (e.g., one or more servers and/or services) for storage and/or relay to a client device (e.g., a smartphone) associated with the electronic device. The electronic device may use motion sensors, such as passive infrared (PIR) sensors, to detect motion. In some instances, the PIR sensors may produce false positives, such as detecting motion when no motion is actually occurring, and/or detecting motion of objects that are of little interest to a user of the electronic device, such as animals or passing cars. In such instances, the user may not want to receive notifications about the detected motion, and/or may not want to view images of the detected objects.

In another example, the electronic device may consume more power when the camera is activated and generating the image data. To conserve power, the electronic device may deactivate the camera until motion has been detected. However, the camera may take a few seconds to power up and record images, which may cause the camera to not record a portion of the motion event that the user would like to see. Additionally, if the motion sensors detect objects that are of little importance to the user, the electronic device may waste power generating the image data representing such objects. This problem may be a concern where the electronic device is battery powered, as the life of the battery will be shortened.

The present embodiments address these issues by describing an electronic device with improved motion detecting, power saving, and image generating capabilities. For instance, the electronic device may include, in addition to the "main" camera (also referred to as the "first camera") for generating image data (also referred to as "first image data"), one or more second cameras that the electronic device uses for motion detection and/or generating image data (also referred to as "second image data") prior to detection of an event. In some examples, the electronic device includes three second cameras (also referred to as "the second camera, the third camera, and the fourth camera"), although in other examples, the electronic device may include any number of second cameras. The second cameras may be arranged in a row that horizontally and/or vertically extends across the front of the electronic device. This arrangement may increase the combined field of view (FOV) of the second cameras.

For example, the electronic device, or a housing of the electronic device, may include a front, a back, a top, a bottom, a left side, a right side, a left corner located between the front and the left side, and a right corner located between the front and the right side. As such, the second camera may be disposed at, or proximate to, the left corner and oriented in a first direction. The second camera may therefore capture image data (also referred to as "third image data") in front of and/or to the left side of the electronic device. Additionally, the third camera may be disposed at, and/or proximate to, the front of the electronic device and oriented in a second direction. The third camera may therefore capture image data (also referred to as "fourth image data") in front of and/or to the sides of the electronic device. Furthermore, the fourth camera may be disposed at, and/or proximate to, the right corner and orientated in a third direction. The fourth camera may therefore capture image data (also referred to as "fifth image data") in front of and/or to the right side of the electronic device.

The third image data generated by the third camera, the fourth image data generated by the fourth camera, and the fifth image data generated by the fifth camera may be stitched or otherwise combined together. In some instances, the second camera may have a horizontal FOV that overlaps between 10 degrees and 30 degrees with the horizontal FOV of the third camera and/or the third camera may have a horizontal FOV that overlaps between 10 degrees and 30 degrees with a horizontal FOV of the fourth camera. As such, and collectively, the second camera, the third camera, and/or the fourth camera may capture a horizontal FOV of substantially 120 degrees, 160 degrees, 165 degrees, 175 degrees, 200 degrees, and/or any other angle. In some examples, collectively, the second camera, the third camera, and/or the fourth camera may have a horizontal FOV that is substantially the same as the horizontal FOV of the first camera. Furthermore, in some instances, collectively, the second camera, the third camera, and/or the fourth camera may have a vertical FOV of substantially 50 degrees, 75 degrees, 90 degrees, and/or any other angle. In some examples, collectively, the second camera, the third camera, and/or the fourth camera may have a vertical FOV that is less than the vertical FOV of the first camera. However, in other examples, collectively, the second camera, the third camera, and/or the fourth camera may have a vertical FOV that is equal to and/or greater than the vertical FOV of the first camera.

In some instances, the first camera may include a first type of camera and the second camera(s) may each include a second type of camera. In some examples, the first type of camera may include a high resolution camera and the second type of camera may include a low resolution camera, where resolution may refer to the pixel count of the camera's image sensor (e.g., number of total pixels, number of recorded pixels, number of effective pixels, etc.). As described above, a camera may be a high-resolution camera when the pixel count of the camera's image sensor is equal to or greater than a threshold pixel count. Additionally, a camera may be a low-resolution camera when the pixel count of the camera's image sensor is equal to or less than a threshold pixel count. The threshold pixel count may be, but is not limited to, 76,800 (e.g., 320×240 pixels), 172,800 pixels (e.g., 480×360 pixels), 307,200 pixels (e.g., 640×480 pixels), 921,600 pixels (e.g., 1280×720) 1,108,922 pixels (e.g., 1216×912 pixels), 3,763,200 pixels (e.g., 2240×1680 pixels), or any other pixel count.

Additionally, or alternatively, in some examples, the first type of camera may include a camera that uses a first amount of power to operate and the second type of camera may include a camera that uses a second amount of power to operate. The second amount of power may be less than the first amount of power. As such, the first camera may consume more power to operate than each of the second camera(s). For example, the first type of camera may consume tens of mW or hundreds of mW, while the second type of camera may consume single-digit amounts of mW.

Additionally, or alternatively, in some examples, the first type of camera may include a camera having a color image sensor (e.g., RGB or RGB-IR), while the second type of camera may include a camera having a monochromatic image sensor (e.g., black and white or grayscale).

Additionally, or alternatively, in some examples, the first type of camera may include a camera with a first size FOV and the second type of camera may include a camera with a second size FOV. In such examples, the first size FOV may be greater than the second size FOV, horizontally and/or vertically.

The electronic device may use the second camera(s) for one or more purposes. For a first example, the electronic device may use the image data generated by the second camera(s) to confirm motion detection and/or confirm the detected motion is an object of interest. For example, the electronic device may initially detect possible motion using one or more motion sensors (e.g., PIR sensors). After detecting the possible motion, the electronic device may analyze the second image data generated by the second camera(s) using one or more object recognition techniques. The one or more object recognition techniques may include, but are not limited to, appearance-based methods (e.g., edge matching, divide-and-conquer search, greyscale matching, gradient matching, histograms of receptive field responses, large modelbases, etc.), feature-based techniques (e.g., interpolation trees, hypothesize and test, pose consistency, etc.), and/or any other object recognition techniques. Based on the analysis, the electronic device may determine that the second image data represents an object and/or determine that the second image data represents a type of object, such as a person, animal, vehicle, tree, bush, and/or any other type of object. As such, the electronic device may then determine that the possible motion includes actual motion of an object and/or that the possible motion includes motion of an object of interest, such as a person. Based on the determination(s), the electronic device may then cause the first camera to begin generating the first image data.

For a second example, the electronic device may cause the second camera(s) to continuously generate the second image data even when the first camera is deactivated (e.g., turned off, not generating the first image data, etc.). While generating the second image data, the second camera(s) may be storing the second image data in rolling buffer(s). For example, the rolling buffer(s) may store a threshold amount of the most recent second image data generated by the second camera(s). The threshold amount may include, but is not limited to, the most recent 5 seconds, 10 seconds, 20 seconds, minute, and/or any other time period. In some instances, the second camera(s) store the second image data in a single buffer. In other instances, the second camera(s) store the second image data in more than one buffer. For example, each of the second cameras may include its own buffer for storing the image data.

As described herein, a buffer may include a temporary memory that stores data while the data is being generated, processed, and/or transferred. A buffer is usually used for temporarily storing data when a program or hardware device needs an uninterrupted flow of information. A rolling buffer continues to store data in the buffer and, when the buffer is full, overwrites the oldest data stored in the buffer. For example, when image data is being generated and then stored in a rolling buffer, when the rolling buffer is full, the oldest image data stored in the rolling buffer is overwritten with new image data that is being generated. This way, the rolling buffer may always contain the most recently generated image data.

After detecting an event (e.g., motion, input, etc.) that causes the first camera to activate and/or generate the first image data, the electronic device may send the first image data to a computing system. Additionally, the electronic device may send the second image data stored in the buffer(s) to the computing system. Since the second image data stored in the buffer(s) is generated prior to the detection of the event and/or prior to the generating of the first image data, the electronic device is able to send image data (e.g., the second image data) representing a first time period that occurs prior to and/or during detection of the event and image data (e.g., the first image data) representing a second time period that occurs after detection of the event. This way, the user is still able to view what occurred proximate to the electronic device both prior to and after the event is detected.

In some instances, in order to preserve the second image data from before the event, the electronic device may cause the second camera(s) to deactivate and/or stop storing the second image data in the buffer(s) after detecting the event. This is so that the second camera(s) do not overwrite the second image data that is already stored in the buffer(s), which, as described herein, represents the first time period prior to detecting the event. The electronic device may also cause the first camera to activate and/or begin generating the first image data. In some instances, the first camera begins storing the first image data in a buffer so that the electronic device can process the second image data and/or the first image data before sending the second image data and/or the first image data to the computing system.

For example, the electronic device may begin processing the second image data stored in the buffer(s) associated with the second camera(s). In some instances, the electronic device is processing the second image data while the first camera is storing the first image data in the buffer associated with the first camera. To process the second image data, and if there are multiple second cameras, the electronic device may process the second image using one or more image stitching techniques in order to generate processed second image data. For example, and in instances where there are the multiple second cameras, the electronic device may process the third image data, the fourth image data, and the fifth image data using the one or more image stitching techniques in order to generate the processed second image data. As such, the processed second image data may represent the combined FOV of the second camera, the third camera, and the fourth camera.

Additionally, or alternatively, in some instances, the electronic device may process the second image data (which may have already been processed using the one or more image stitching techniques) using one or more image processing techniques (e.g., using an image signal processor (ISP)) in order to generate the processed second image data. In some instances, the one or more image processing techniques may include, but are not limited to, Bayer transformation, demosaicing, noise reduction, image sharpening, and/or any other image processing techniques. While these are just a some example of image processing techniques, in other examples, the electronic device may processes the second image data using additional and/or alternative image processing techniques.

Additionally, or alternatively, in some instances, the electronic device may process the second image data (which may have already been processed using one or more image stitching techniques and/or one or more image processing techniques) using one or more encoding techniques in order to generate the processed second image data. As described herein, video encoding is the process of compressing the image data from a first format into a second, different format. For instance, the video encoding may convert uncompressed image data into compressed image data. For example, the one or more encoding techniques may encode the second image data from a first data format to a second, different data format. In some instances, the one or more encoding techniques encode the second image data into a similar data format as the first image data. For example, if second image data includes a first data format, such as quarter video graphics array (QVGA), and the first image data includes a second data format, such as H.264, then the one or more video encoding techniques may encode the second image data from the QVGA format to the H.264 format (e.g., the processed second image data).

In some instances, QVGA is a small-screen display mode that includes a 320×240 resolution. Often, QVGA is used when a display is longer vertically than horizontally. Additionally, H.264 is a digital video compression standard that uses about half the data to deliver the same quality video as other data formats. In some instances, H.264 is used for providing high definition digital video. While these are just some examples of data formats for encoding the second image data, in other examples, the one or more encoding techniques may encode the second image data from any first data format to any second data format.

In some instances, the first camera is generating and then storing the first image data in the buffer as the second image data is being processed. After processing the second image data, the electronic device may begin processing the first image data that has accumulated in the buffer using one or more of the techniques described herein with regard to the second image data. In some instances, the electronic device processes the first image data accumulated in the buffer using a first processing rate. After the electronic device has processed the first image data that accumulated in the buffer, the electronic device processes the first image data as the first camera is currently generating and then storing the first image data in the buffer. In some instances, the electronic device processes this first image data using a second processing rate.

In some instances, the first processing rate is greater than the second rate. In other words, the electronic device processes the first image data that accumulated in the buffer at a fast processing rate in order to "catch up" and process the first image data that is currently being generated and then stored by the first camera. In some examples, the first processing rate and/or the second processing rate may include a bit rate, such as, but not limited to, 1 Mbit/s, 50 Mbit/s, 100 Mbit/s, and/or any other bit rate. Additionally, or alternatively, in some examples, the first processing rate and/or the second processing rate may include a frame rate, such as, but not limited to, 15 frames per second, 30 frames per second, 60 frames per second, and/or any other frame rate.

In some instances, the electronic device may be sending the processed second image data to the computing system as the electronic device is still processing the second image data. This may occur until the electronic device finishes processing the second image data and/or sends the last of the processed second image data to the computing system. After sending the processed second image data, the electronic device may send the processed first image data to the computing system as the electronic device is still processing the first image data. This may occur until the electronic device finishes processing the first image data and/or sends the last of the processed first image data to the computing system. In other words, the electronic device may send the processed image data to the computing system even as the electronic device is still generating and processing new image data.

The computing system may receive and then store the processed second image data and the processed first image data. In some instances, the computing system may store data that associates the processed second image data with the processed first image data. In some instances, the computing system may store data that associates the processed second image data and/or the processed first image data with information about the event. The information may include, but is not limited to, a type of the event (e.g., motion detection, input received, etc.), a time of the event, a location of the event, an identifier of the electronic device, and/or any other information that describes the event and/or the electronic device. Still, in some instances, the computing system may store data that associates the processed second image data and/or the processed first image data with an identifier associated with the electronic device and/or a user profile.

The computing system may send data associated with the event to a client device associated with the electronic device. The data may represent a notification, a message, an alert, and/or any other type of data that indicates that the event occurred (e.g., the electronic device detected motion of an object, the electronic device received an input, etc.). Additionally, the computing system may send the processed second image data and/or processed first image data to the client device. In some instances, the computing system sends the processed second image data and/or processed first image data after receiving, from the client device, data representing a request to view image data associated with the event. For example, after receiving the data representing the event, the client device may display the notification about the event. The client device may then receive an input associated with viewing the event. Based on the input, the client device may send the data representing the request to the computing system.

Additionally, or alternatively, in some instances, the computing system may initially send the processed first image data to the client device. The computing system may then send the processed second image data to the computing system after receiving, from the client device, data representing a request for the second image data. For example, after receiving the processed first image data, the client device may display image(s) (also referred to as "first image(s)") represented by the processed first image data. The client device may then receive an input associated with viewing image(s) (also referred to as "second image(s)") represented by the second image data. For instance, the user of the client device may want to determine what happened prior to detection of the event. Based on the input, the client device may send the data representing the request to the computing system.

In some instances, the client device may display the first image(s) and/or the second image(s) using various techniques. For a first example, the client device may display the second image(s) followed by displaying the first image(s). In such an example, the client device may display the second image(s) using a first playback speed (and/or first frame rate) and display the first image(s) using a second playback speed (and/or a second frame rate). In some instances, the first playback speed (and/or the first frame rate) may be the same as the second playback speed (and/or the second frame rate). In other instances, the first playback speed (and/or the first frame rate) may be different than the second playback speed (and/or the second frame rate). For instance, the first playback speed (and/or the first frame rate) may be greater than the second playback speech (and/or the second frame rate).

As described herein, a playback speed may relate to a speed at which a video is being played. In some examples, a faster playback speed will cause frames of the video to be skipped while a slower playback speed will cause frames of the video to be displayed for longer periods of time. Additionally, a frame rate is a frequency at which frames of the video are recorded and/or displayed. For example, a frame rate for displaying images may include, but is not limited to, 15 frames per second, 30 frames per second, 60 frames per second, and/or any other frame rate.

For a second example, the client device may display the first image(s) using at least a first portion of the display of the client device, and the client device may display the second image(s) using a second portion of the display of the client device. In some instances, the second portion of the display may be included within the first portion of the display, such that the client device is using a picture-in-picture format to display the second image(s) within the first image(s). In some instances, picture-in-picture may include displaying the first image(s) using the full display and displaying the second image(s) in an inset window. In some instances, the client device may continuously repeat the displaying of the second image(s) while displaying the first image(s). For example, if the second image(s) represent a video, the electronic device may continuously repeat playing the video within the second portion of the display.

For a third example, and since the vertical FOV of the first camera may be greater than the vertical FOV of the second camera(s), the client device may display the second image(s) using a first portion of the display. The client device may then display a top portion of the first image(s) using a second portion of the display and a bottom portion of the first images(s) using a third portion of the display. The top portion of the display may be above the first portion of the display and the bottom portion of the display may be below the first portion of the display. In other words, even though the client device is displaying the second image(s) represented by the processed second image data, the client device is still displaying a vertical FOV that is similar to the vertical FOV of the first camera. In examples where the client device displays the first image(s) and the second image(s) using such a technique, the client device may use a mean filter, and/or other techniques, to blur the portions of the first image(s).

Although the examples above describe the electronic device continuously activating the second camera(s), except when an event is detected that causes the second camera(s) to be temporarily deactivated, in other examples the electronic device may deactivate the second camera(s) at one or more additional and/or alternative times. For example, the electronic device may determine an amount of ambient light within the environment proximate to the electronic device. In some instances, the electronic device determines the amount of light using a light sensor of the electronic device. In such instances, the electronic device may then compare the sensed amount of light to a light threshold. If the electronic device determines that the amount of light satisfies (e.g., is equal to or greater than) the light threshold, then the electronic device may determine to activate and/or continue to activate the second camera(s). However, if the electronic device determines that the sensed amount of light does not satisfy (e.g., is less than) the light threshold, then the electronic device may determine to deactivate and/or continue to deactivate the second camera(s).

Additionally, or alternatively, in some instances, the electronic device may analyze the second image data to determine one or more statistics representing the amount of light. The electronic device may analyze the second image data to determine the one or more statistics at given time intervals, such as, but not limited to, every minute, five minutes, ten minutes, and/or any other time interval. If the second camera(s) are already activated, then the electronic device may analyze the second image data being generated by the second camera(s). However, if the second camera(s) are deactivated, then the electronic device may cause the second camera(s) to activate in order to generate the second image data for analysis. In some instances, the second camera(s) may deactivate after generating the second image data.

The one or more statistics may include, but are not limited to, a number of black pixels represented by the second image(s), a number of dark pixels represented by the second image(s), a number of bright pixels represented by the second image(s), a number of saturated pixels represented by the second image(s), and/or one or more other statistics. As discussed above, the second image data may represent grayscale images. As such, and in some instances, the electronic device may determine that a pixel includes a black pixel when the intensity of the pixel is 0, determine that a pixel is a dark pixel when the intensity of the pixel is between 0 and a first threshold (e.g., 120, 128, 140, etc.), determine that a pixel is a bright pixel when the intensity of the pixel is between the first threshold and a second threshold (e.g., 200, 210, 230, etc.), and determine that a pixel is a saturated pixel when the intensity of the pixel is greater than the second threshold.

The electronic device may then use the one or more statistics to determine if the amount of light satisfies a light threshold. In some examples, the electronic device may determine that the amount of light does not satisfy the light threshold when the number of black pixels and/or the number of dark pixels satisfies a pixel threshold, and the electronic device may determine that the amount of light satisfies the light threshold when the number of black pixels and/or the number of dark pixels does not satisfy the pixel threshold. In some examples, the electronic device may determine that the amount of light satisfies the light threshold when the number of bright pixels and/or the number of saturated pixels satisfies the pixel threshold, and the electronic device may determine that the amount of light does not satisfy the light threshold when the number of bright pixels and/or the number of saturated pixels does not satisfy the pixel threshold. In either example, the pixel threshold may include, but is not limited to, 500 pixels, 1,000 pixels, 5,000 pixels, and/or any other number of pixels.

Additionally, or alternatively, in some examples, the electronic device may determine that the amount of light does not satisfy the light threshold when the percentage of black pixels and/or the percentage of dark pixels satisfies a percentage threshold, and the electronic device may determine that the amount of light satisfies the light threshold when the percentage of black pixels and/or the percentage of dark pixels does not satisfy the percentage threshold. In some examples, the electronic device may determine that the amount of light satisfies the light threshold when the percentage of bright pixels and/or the percentage of saturated pixels satisfies the percentage threshold, and the electronic device may determine that the amount of light does not satisfy the light threshold when the percentage of bright pixels and/or percentage of saturated pixels does not satisfy the percentage threshold. In any of these examples, the percentage threshold may include, but is not limited to, 40%, 50%, 60%, 70%, and/or any other percentage.

Additionally, or alternatively, in some instances, the electronic device may determine an average intensity for the second image(s) using the number of black pixels, the number of dark pixels, the number of bright pixels, and the number of saturated pixels. The electronic device may then determine that the amount of light satisfies the light threshold when the average intensity satisfies a threshold intensity, and determine that the amount of light does not satisfy the light threshold when the average intensity does not satisfy the intensity threshold. The intensity threshold may include, but is not limited to, 80, 110, 128, 140, 150, 200, and/or any other intensity.

In any of the examples above, the electronic device may cause the second camera(s) to deactivate when the amount of light does not satisfy the light threshold. Additionally, the electronic device may cause the second camera(s) to activate when the amount of light satisfies the light threshold. In some instances, the electronic device may perform these techniques for activating and/or deactivating the second camera(s) in order to conserve power. For example, the electronic device may deactivate the second camera(s) when there is not sufficient light for the second camera(s) to operate. However, during such times, the electronic device may still use the motion sensors for performing the motion detection.

In some instances, the electronic device may use one or more processors for performing the operations described herein. For example, the electronic device may use first processor(s) for communicating with the second camera(s), such as to cause the second camera(s) to activate, cause the second camera(s) to deactivate, retrieve the second image data generated by the second camera(s), and/or perform other types of communications. The electronic device may further use second processor(s) for performing the image and/or video processing techniques described herein. In some examples, the second processor(s) receive the second image data from the first processor(s) and receive the first image data from the first camera. This way, in such examples, the second processor(s) do not communicate with the second camera(s).

As described herein, image data may represent one or more images (e.g., video frames) and/or a video. The image data may include raw image data, which is generated by the image sensors of the cameras and/or uncompressed, or processed image data, which is processed using one or more data processing techniques (e.g., compression). The raw image data may include one or more data formats, such as, but is not limited to, QVGA, serial digital interface (SDI), and/or any other uncompressed formats. The processed image data may include one or more data formats, such as, but not limited to, H.264, Moving Picture Expert Group (MPEG), Dirac, and/or any other processed formats. In some instances, the electronic device may process the raw image data in order to generate the processed image data. Additionally, or alternatively, in other instances, one or more other computing devices may process the raw image data in order to generate the processed image data.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a functional block diagram illustrating an example environment 100 that includes an electronic device 102 using different types of cameras to generate data representing an event, according to various aspects of the present disclosure. As shown, the electronic device 102 may be located on a structure 104 which, in the example of FIG. 1, includes a house. However, in other examples, the structure 104 may include an apartment, an office, a business, a wall, and/or any other type of structure. The electronic device 102 includes a first camera 106 and one or more second camera(s) 108. In some instances, the first camera 106 may include a first type of camera and the second camera(s) 108 may each include a second, different type of camera. In some instances, the second camera(s) 108 may include three separate cameras. In other instances, the second camera(s) 108 may include any number of separate cameras.

The electronic device 102 may activate the second camera(s) 108 at various times. For example, the electronic device 102 may activate the second camera(s) 108 when an amount of light proximate to the electronic device 102 satisfies a threshold light threshold and deactivate the second camera(s) 108 when the amount of light does not satisfy the light threshold. In some instances, the electronic device 102 determines whether the amount of light satisfies the light threshold using one or more sensors 110, such as one or more light sensors. In other instances, the electronic device 102 determines whether the amount of light satisfies the light threshold using second image data 112 generated by the second camera(s) 108. Still, in some instances, the electronic device 102 determines whether the amount of light satisfies the light threshold using the one or more sensors 110 and the second image data 112 generated by the second camera(s) 108. In any instance, the electronic device 102 may determine whether the amount of light satisfies the light threshold at given time intervals, such as, but not limited to, every minute, five minutes, ten minutes, and/or any other time interval.

When the second camera(s) 108 are activated, the second camera(s) 108 may be generating the second image data 112 representing images of the area proximate to the structure 104. For instance, the second image data 112 may represent images of the FOV(s) of the second camera(s) 108. The second camera(s) 108 may then store the second image data 112 in second buffer(s) 114 associated with the second camera(s) 108. In some instances, when there are multiple second cameras 108, the electronic device 102 may include a single second buffer 114 for all of the second camera(s) 108. In other instances, when there are multiple second cameras 108, the electronic device may include a respective second buffer 114 for each of the second cameras 108. In some instances, the second image data 112 stored in the second buffer(s) 114 is raw data received from the image sensor(s) of the second camera(s) 108.

In the example of FIG. 1, the second camera(s) 108 may generate the second image data 112 representing an object 116, such as a person, approaching the structure 104. The electronic device 102 may then detect an event. In some instances, the electronic device 102 may detect the event by receiving an input using input device(s) 118. The input device(s) 118 may include, but are not limited to, a button, a touch sensor, and/or any other input/detecting device. In some instances, the electronic device 102 may detect the event by detecting motion of the object 116. For instance, the sensor(s) 110, such as motion sensor(s), may detect possible motion of the object 116. The electronic device 102 may then analyze the second image data 112 to determine that the second image data 112 represents the object 116 and/or to determine that the second image data 112 represents a type of object (e.g., a person) that is of interest to a user of the electronic device 102. Based on determining that the second image data 112 represents the object 116 and/or the type of object, the electronic device 102 may detect the event.

In some instances, the electronic device 102 may determine that the second image data 112 represents the object 116 and/or the type of object using one or more techniques associated with object recognition. Object recognition is the technology in the field of computer vision that finds and/or identifies objects represented by the image data 112. The one or more object recognition techniques may include, but are not limited to, appearance-based techniques (e.g., edge matching, dive-and-conquer search, greyscale matching, etc.), feature-based techniques (e.g., interpretation trees, hypothesis and test, etc.), and/or other techniques.

The appearance-based techniques may use example images of different objects (e.g., templates) to perform object recognition. For instance, the appearance-based techniques may initially identify objects represented by the second image data 112 by identifying one or more conditions. The one or more conditions may include, but are not limited to, changes in lighting or other color (e.g., white color), changes in viewing direction, changes in size, and changes in shape. The appearance-based techniques may then identify the objects based on the one or more conditions. Additionally, the appearance-based techniques may compare the second image data 112 representing the identified objects to image data representing the example images. Based on identifying matches, the appearance-based techniques may identify that the second image data 112 represents objects and/or identify the types of objects represented by the second image data 112.

The feature-based techniques may search to find feasible matches between object features represented by the second image data 112 and image features of various objects. The feature-based techniques may extract the object features based on surface patches, corners, and linear edges representing the objects represented by the second image data 112. Based on finding the matches between the object features and the image features, the feature-based techniques may identify that the second image data 112 represents objects and/or identify the types of objects represented by the second image data 112.

In some instances, the electronic device 102 initially analyzes the second image data 112, using the one or more object recognition techniques, to determine that the second image data 112 represents an object. The electronic device 102 may then further analyze the second image data 112, using the one or more object recognition techniques, to determine the type of object (e.g., a person) represented by the second image data 112.

Based on detecting the event, the electronic device 102 may generate and then send, over one or more network(s) 120, event data 122 to a computing system(s) 124. The event data 122 may indicate that the input was received by the electronic device 102 and/or that the motion was detected by the electronic device 102. Additionally, the electronic device 102 may cause the second camera(s) 108 to stop generating the second image data 112. This may be so that the second camera(s) 108 do not overwrite the second image data 112 that is already stored in the second buffer(s) 114, which represents images of the area proximate to the structure 104 prior to detection of the event. Additionally, the electronic device 102 may activate the first camera 106 to begin generating first image data 126. In some instances, the first camera 106 begins storing the first image data 126 in a first buffer 128 associated with the first camera 106. In some instances, the first camera 106 stores the first image data 126 in the first buffer 128 while the electronic device 102 is processing the second image data 112 stored in the second buffer(s) 114. In some instances, the first image data 126 stored in the first buffer 128 is raw data received from the image sensor of the first camera 106.

In some instances, the first camera 106 may include metal-oxide-semiconductor (CMOS) and/or charge-coupled device (CCD) image sensor(s) that operates with some variation of the RGB color model (or any other color model). The image sensor(s) may include a grid of red, green, and blue detectors, such as in one or more rows. For color separation, the image sensor(s) may include a Bayer filter sensor, a Feveon X3 sensor, and/or a 3-CCD sensor. While these are just a few examples of image sensor(s) for the first camera 106, in other examples, the first camera 106 may include additional and/or alternative image sensor(s). In contrast, the second camera(s) 108 may use a CMOS image sensor that does not operate within the RGB (or any other color) model.

In some instances, the second camera(s) 108 may each include a Glance sensor manufactured by Qualcomm, Inc. of San Diego, Calif. The Glance sensor may include an integrated image sensor (e.g., metal-oxide semiconductor (CMOS) image sensor) and a low-power processor. In some instances, the second camera(s) 108 may include a resolution of 320×240 pixels. In some instances, the second camera(s) 108 may consume about 2 mW or less than about 2 mW of power, as opposed to hundreds of mW for the first camera 106.***

A color model or color space is a mathematical representation for a color. For example, the RGB color space is based on a Cartesian coordinate system, and the HSI color space is based on a polar coordinate system. RGB (red-green-blue) is a color model in which any color is formed through the appropriate mixture of red, green, and blue. CMY (cyan-magenta-yellow) is a color model in which any color is formed through the appropriate mixture of cyan, magenta, and yellow.

For example, based on detecting the event, the electronic device 102 may process the second image data 112 using one or more of the image and/or video processing techniques described herein in order to generate processed second image data 130. While processing the second image data 112, the electronic device 102 may be sending, over the network(s) 120, the processed second image data 130 to the computing system(s) 124. For example, the electronic device 102 may begin sending first frames represented by the processed second image data 130 while still processing the second image data 112. Additionally, the electronic device 102 may send the last frames represented by the processed second image data 130 after finishing the processing of the second image data 112. In some instances, the electronic device 102 may then once again activate the second camera(s) 108.

In some instances, the first camera 106 is generating and then storing the first image data 126 in the first buffer 128 as the second image data 112 is being processed. After processing the second image data 112, the electronic device 102 may begin processing the first image data 126 that has accumulated in the first buffer 128 (the "accumulated first image data 126") using one or more of the techniques described herein with regard to the second image data 112. In some instances, the electronic device 102 processes the accumulated first image data 126 using a first processing rate. After the electronic device 102 has processed the accumulated first image data 126, the electronic device 102 processes the first image data 126 as the first camera 106 is currently generating and then storing the first image data 126 in the first buffer 128 (the "currently generated first image data 126"). In some instances, the electronic device 102 processes the currently generated first image data 126 using a second processing rate. In some instances, the first processing rate is greater than the second rate.

In other words, the electronic device 102 processes the accumulated first image data 126 at a fast processing rate in order to "catch up," to the currently generated first image data 126. In some examples, the first processing rate and/or the second processing rate may include a bit rate, such as, but not limited to, 1 Mbit/s, 50 Mbit/s, 100 Mbit/s, and/or any other bit rate. Additionally, or alternatively, in some examples, the first processing rate and/or the second processing rate may include a frame rate, such as, but not limited to, 15 frames per second, 30 frames per second, 60 frames per second, and/or any other frame rate.

While processing the first image data 126, the electronic device 102 may be sending, over the network(s) 120, the processed first image data 132 to the computing system(s) 124. For example, the electronic device 102 may begin sending first frames represented by the processed first image data 132 while still processing the first image data 126. Additionally, the electronic device 102 may send the last frames represented by the processed first image data 132 after finishing the processing of the first image data 126. In various embodiments, the electronic device 102 may continue to generate, process, and send the first image data 126 until the detected event ends (e.g., motion is no longer detected in the area around the electronic device 102), or until a period of time (e.g., fifteen seconds, thirty seconds, minute, and/or any other period of time) has elapsed since detecting the event, or until the electronic device 102 receives, over the network(s) 120 and from the computing system(s) 124, data (which may be represented by the event data 122) representing an instruction to cease generating the first image data 126.

The computing system(s) 124 may send, over the network(s) 120, communication data to a client device 134, where the communication data represents a communication indicating that the event occurred. Additionally, the computing system(s) 124 may store the processed first image data 132 and/or the processed second image data 130. In some instances, the computing system(s) 124 stores association data 136 that associates the processed first image data 132 with the processed second image data 130. In some instances, the computing system(s) 124 stores association data 136 that associates the processed first image data 132 and/or the processed second image data 130 with information associated with the event detected by the electronic device 102. The information may include, but is not limited to, a type of the event (e.g., motion detection, input received, etc.), a time of the event, a location of the event, an identifier of the electronic device 102, and/or any other information that describes the event and/or the electronic device 102.

The computing system(s) 124 may also send, over the network(s) 120, the processed first image data 132 and/or the processed second image data 130 to the client device 134. In some instances, the computing system(s) 124 sends the processed first image data 132 and/or processed second image data 130 after receiving, from the client device 134, data representing a request to view image data associated with the event. For example, after receiving the communication data, the client device 134 may display the communication about the event. The client device 134 may then receive an input associated with viewing the event. Based on the input, the client device 134 may send, over the network(s) 120, the data representing the request to the computing system(s) 124.

Additionally, or alternatively, in some instances, the computing system(s) 124 may initially send, over the network(s) 120, the processed first image data 132 to the client device 134. The computing system(s) 124 may then send, over the network(s) 120, the processed second image data 130 to the computing system(s) 124 after receiving, from the client device 134, data representing a request for the second image data 112. For example, after receiving the processed first image data 132, the client device 134 may display image(s) (also referred to as "first image(s)") represented by the processed first image data 132. The client device 134 may then receive an input associated with viewing image(s) (also referred to as "second image(s)") represented by the processed second image data 130. For instance, the user of the client device 134 may want to determine what happened prior to detection of the event. Based on the input, the client device 134 may send, over the network(s) 120, the data representing the request to the computing system(s) 124.

The client device 134 may then display the first image(s) represented by the processed first image data 132 and/or the second image(s) represented by the processed second image data 130 using one or more techniques. Various techniques for displaying the first image(s) and/or the second image(s) are described in more detail with regard to FIGS. 4A-4C.

Figure 8:
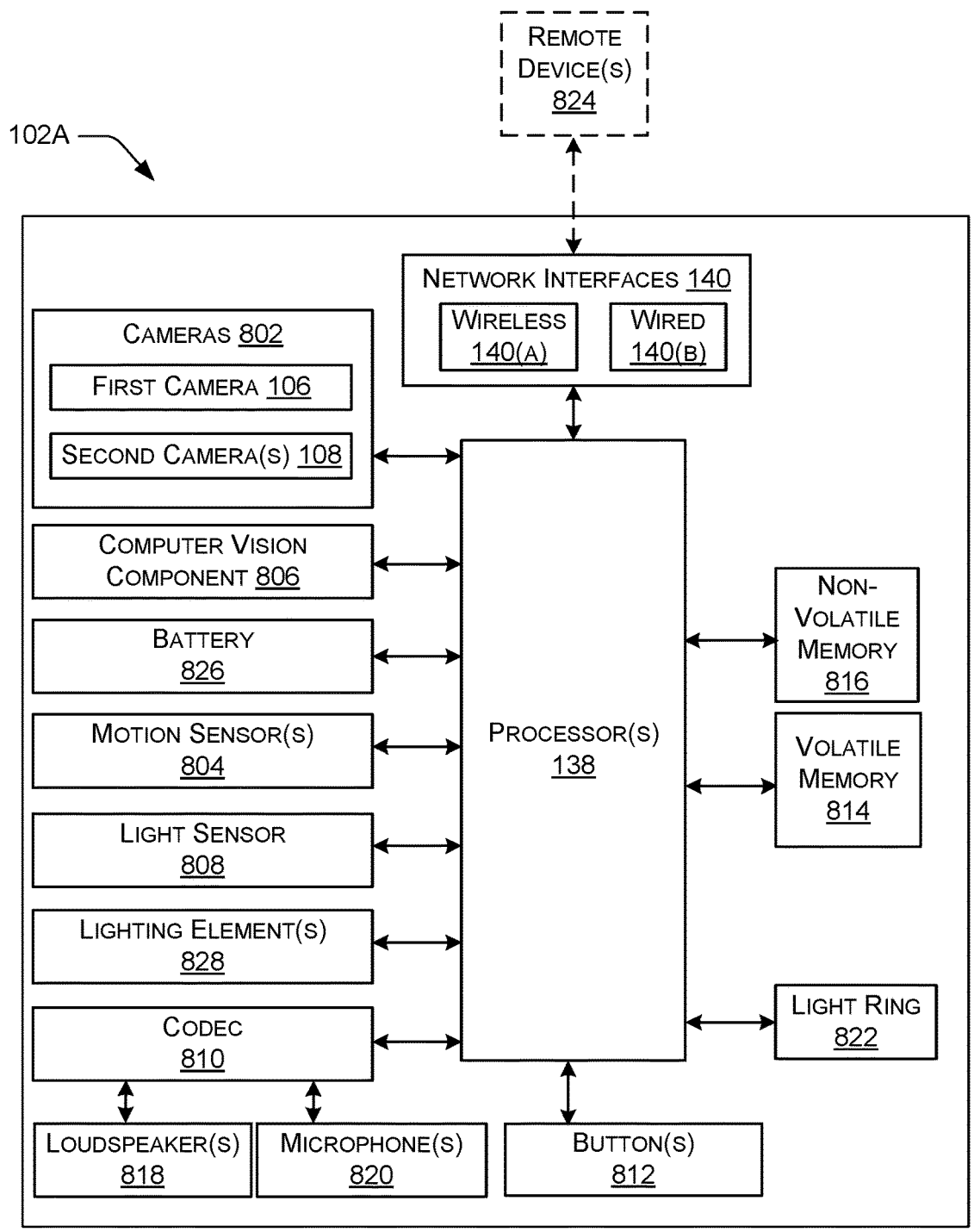
FIG. 8 illustrates example components of an electronic device, according to an aspect of the present disclosure.

As further illustrated in the example of FIG. 1, the electronic device 102 further includes processor(s) 138, network interface(s) 140, and memory 142, which are described in more detail with regard to FIG. 8.

While the above examples describe the electronic device 102 as processing the first image data 126 and/or the second image data 112, in other examples, the computing system(s) 124 may process the first image data 126 and/or the second image data 112. For example, the electronic device 102 may send the raw first image data 126 and/or the raw second image data 112 to the computing system(s) 124. The computing system(s) 124 may then perform similar processes as described herein with respect to the electronic device 102 to process the first image data 124 in order to generate the processed first image data 132 and/or process the second image data 112 in order to generate the processed second image data 130.

Figure 2A:
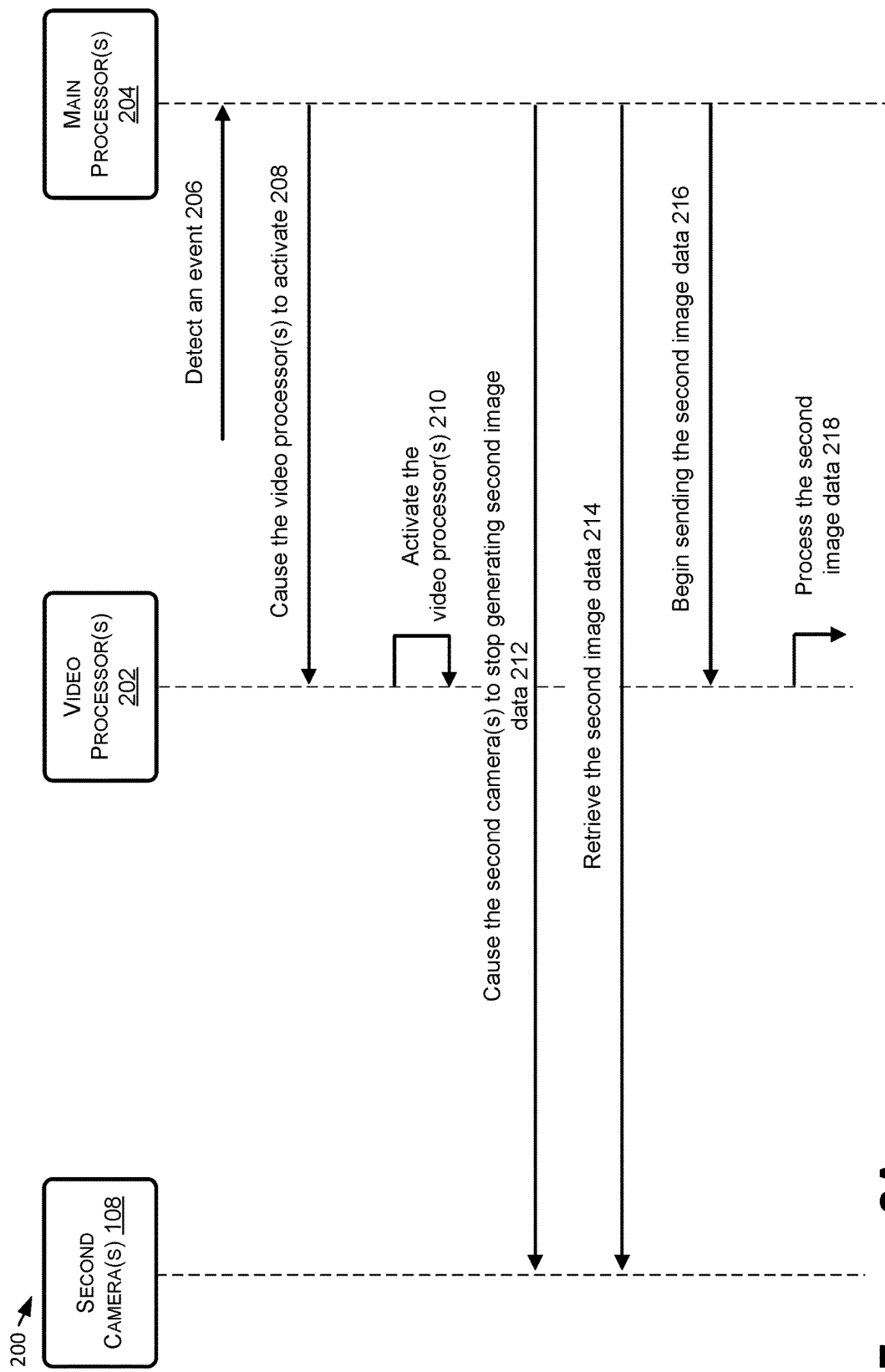
FIGS. 2A-2B are a sequence diagram illustrating an example process for an electronic device generating and then processing image data, according to various aspects of the present disclosure.
Figure 2B:
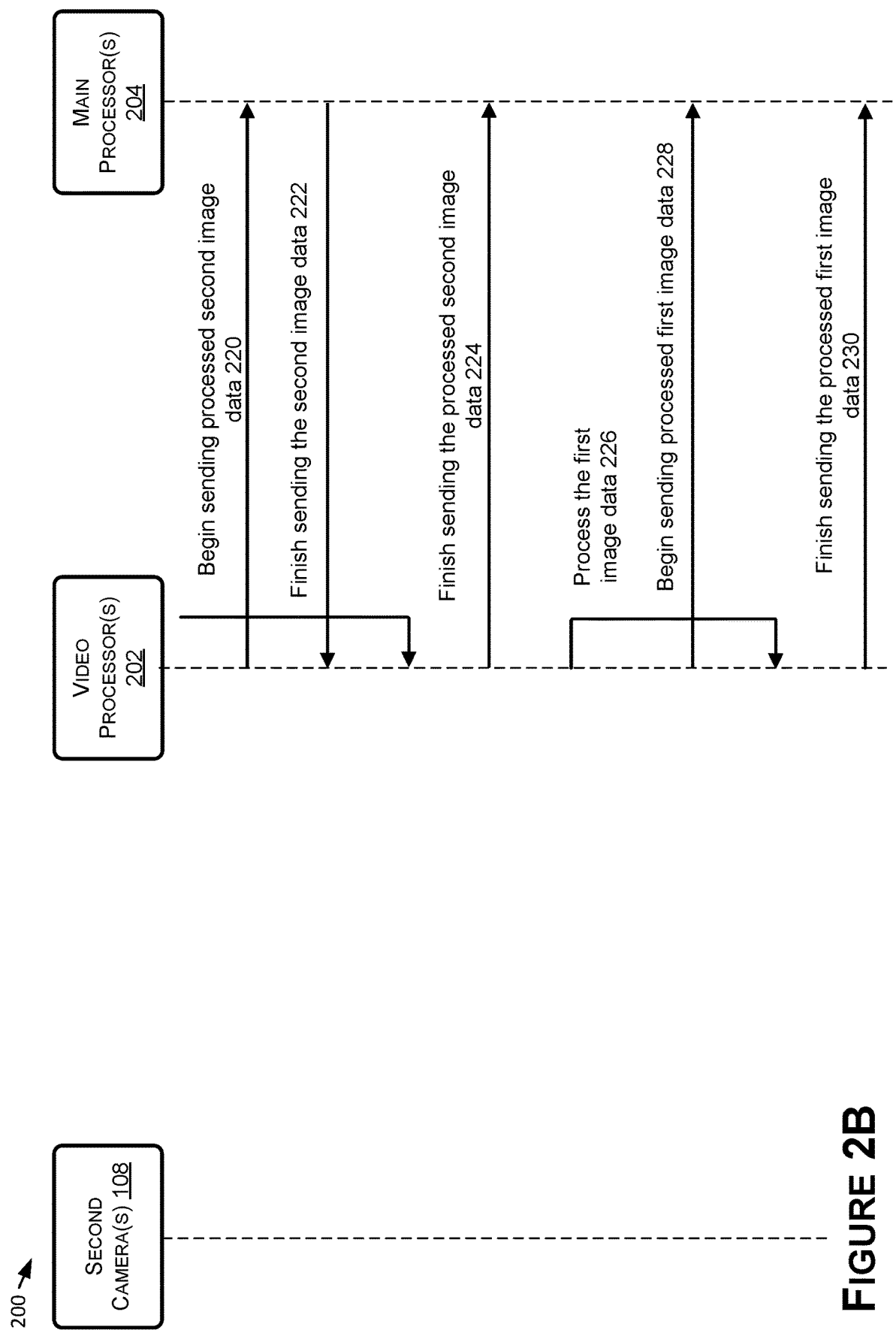

FIGS. 2A-2B are a sequence diagram illustrating an example process 200 for generating and then processing image data, according to various aspects of the present disclosure. The example of FIGS. 2A-2B illustrates example communications between the second camera(s) 108, video processor(s) 202, and main processor(s) 204 of the electronic device 102. The video processor(s) 202 and/or the main processor(s) 204 may correspond to the processor(s) 138 from FIG. 1.

As shown, at 206, the main processor(s) 204 may detect an event. In some instances, the main processor(s) 204 may detect the event by detecting, using the motion sensor(s) 110, possible motion of an object within a FOV of the motion sensor(s) 110. In some instances, the main processor(s) 204 may detect the event by receiving, using the input device(s) 118, input from an object (e.g., a doorbell button press). Still, in some instances, the main processor(s) 204 may detect the event by detecting, using the second camera(s) 108, an object located within the FOV of the second camera(s) 108 and/or a specific type of object located within the FOV of the second camera(s) 108.

At 208, the main processor(s) 204 may cause the video processor(s) 202 to activate and, at 210, the video processor(s) 202 may activate. In some instances, to cause the video processor(s) 202 to activate, the main processor(s) 204 may send a signal to the video processor(s) 202 that causes the video processor(s) 202 to power up. In some instances, to cause the video processor(s) 202 to activate, the main processor(s) 204 may cause power to be provided to the video processor(s) 202, where the power causes the video processor(s) 202 to power up.

At 212, the main processor(s) 204 may cause the second camera(s) 108 to stop generating second image data 112 and, at 214, the main processor(s) 204 may retrieve the second image data 112. In some instances, to cause the second camera(s) 108 to stop generating the second image data 112, the main processor(s) 204 may send a signal to the second camera(s) 108 that causes the second camera(s) 108 to stop generating the second image data 112 and/or turn off. In some instances, to cause the second camera(s) 108 to deactivate, the main processor(s) 204 may cause power to no longer be provided to the second camera(s) 108. The main processor(s) 204 may then retrieve the second image data 112 that is stored in the second buffer(s) 114, which represents images of the area proximate to the electronic device 102 prior to the detection of the event.

At 216, the main processor(s) 204 may begin sending the second image data 112 to the video processor(s) 202 and, at 218, the video processor(s) 202 may process the second image data 112. For instance, after retrieving the second image data 112, the main processor(s) 204 may begin sending the second image data 112 to the video processor(s) 202 for processing. In some instances, to process the second image data 112, and if there are multiple second cameras 108, the video processor(s) 202 may process the second image data 112 using one or more image stitching techniques. For example, and in instances where there are three second cameras, the video processor(s) 202 may process the third image data, the fourth image data, and the fifth image data using the one or more image stitching techniques in order to generate the processed second image data 130. As such, the processed second image data 130 may represent the combined FOV of the second camera, the third camera, and the fourth camera.

Image stitching is the process of combining multiple images with overlapping fields of view in order to product a segmented panorama or high-resolution image. For an example of image stitching, the one or more image stitching techniques may analyze image(s) (referred to as "third image(s)") represented by the third image data with respect to image(s) (referred to as "fourth image(s)") represented by the fourth image data in order to identify features represented by the third image(s) that match features represented by the fourth image(s). The one or more image stitching techniques may then align the third image(s) with the fourth image(s) using the matching features. In some instances, the one or more image stitching techniques minimize the sum of absolute differences between overlapping pixels in the third image(s) and the fourth image(s). In some instances, the one or more image stitching techniques may use calibration data associated with the second camera and the third camera when identifying the features and/or aligning the third image(s) with the fourth image(s).

The one or more image stitching techniques may then perform image calibration on the third image(s) and the fourth image(s). The image calibration may reduce optical defects, such as, but not limited to, distortions, exposure differences between images, vignetting, camera response, and/or chromatic aberrations. Image calibration provides pixel-to-real-distance conversion factors that allow image scaling to metric units. This information can then be used to convert pixel measurements performed on the images to the corresponding values in the real world.

Image distortion is a lens defect that causes straight lines to blow out toward the edge of the image. Vignetting is a defect that darkens the corner of an image due to light falloff around the perimeter of the lens. Exposure differences between images refers to the differences in the lightness between the images. Chromatic aberrations is a failure of a lens to focus all colors to the same point, which is caused by dispersion.

In some instances, the one or more image stitching techniques perform image alignment in order to transform the third image(s) and the fourth image(s) into the same viewpoint. In some instances, the image alignment transforms the coordinate system of the third image(s) and/or the fourth image(s) by generating a new coordinate system that outputs a matching viewpoint between the third image(s) and the fourth image(s). In some instances, the types of transformation may include pure transformation, pure rotation, or transformation and rotation. The image alignment may use the matching features between the third image(s) and the fourth image(s) when performing the transformations of the coordinate systems.

The one or more image stitching techniques may then perform image blending, which executes the adjustments determined in the image calibration. For instance, the image blending may adjust colors between the third image(s) and the fourth image(s) to compensate for exposure differences. The third image(s) are then blended together with the fourth image(s) and seam line adjustment is performed in order to reduce the visibility of the seams between the third image(s) and the fourth image(s). In some instances, the seam line adjustment includes reducing or minimizing the intensity differences between overlapping pixels.

In some instances, the one or more stitching techniques may perform similar processes between the fourth image(s) and image(s) (referred to as "fifth image(s)") represented by the fifth image data. As a result, the one or more image stitching techniques may generate composite image(s) that includes at least a portion of the third image(s), at least a portion of the fourth image(s), and at least a portion of the fifth image(s). While this is just one example process for performing image stitching, in other examples, the one or more image stitching techniques may perform additional and/or alternative image stitching processes.

Additionally, or alternatively, in some instances, the video processor(s) 202 may process the second image data 112 (which may have already been processed using the one or more image stitching techniques) using one or more image processing techniques (e.g., using an image signal processor (ISP)) in order to generate the processed second image data 130. In some instances, the one or more image processing techniques may include, but are not limited to, Bayer transformation, demosaicing, noise reduction, image sharpening, and/or any other image processing techniques. In some instances, such as when the second camera(s) 108 include grayscale cameras, one or more of the image processing techniques may not be applied. For example, Bayer transformation may not be applied.

Bayer transformation may include applying different color filters to image data. For instance, Bayer transformation may include applying red, green, and blue color patterns to the image data using a pattern that is designated by a Bayer filter. This aspect may provide more color in the images represented by the image data.

For example, demosaicing may include evaluating the color and brightness of individual pixels of the composite image(s). The color and brightness for the individual pixels are then compared to color(s) and brightness(es) of the neighboring pixels in order to produce a color and brightness value for the individual pixels. The entire composite image(s) are then assessed in order to estimate the correct distribution of contrast. This is then applied to the composite image(s) by adjusting the gamma values of the composite image(s).

Noise from electronic circuitry in the electronic device 102 may cause random spots of wrong color in images represented by image data. As such, noise reduction includes analyzing the image data in order to identify the defects caused by noise. The defects are removed from the images.

Image sharpening may include interpolating the color and brightness of individual pixels to even out any fuzziness that may have occurred with the composite image(s). To prevent impression of depth, the edges and contours within the composite image(s) are identified and then sharpened.

Additionally, or alternatively, in some instances, the video processor(s) 202 may process the second image data 112 (which may have already been processed using one or more image stitching techniques and/or one or more image processing techniques) using one or more encoding techniques in order to generate the processed second image data 130. As described herein, video encoding is the process of compressing the image data from a first format into a second, different format. For instance, the video encoding may convert uncompressed image data in to compressed image data. Two well-known video encoding techniques include interframe coding and intraframe coding. Interframe coding is video compression in which temporal redundancy is factored in. This form of compression takes advantage of the similarities between successive frames, so only the differences between them are coded, providing for higher compression ratios. Intraframe coding is video compression in which temporal redundancy is not factored in. This form of compression does not take advantage of any similarities between successive frames, resulting in lower compression ratios. However, individual frames can be better accessed and manipulated.

For example, the one or more encoding techniques may encode the second image data 112 from a first data format to a second, different data format. In some instances, the one or more encoding techniques encode the second image data 112 into a similar data format as the first image data 126. For example, if the second image data 112 includes a first data format, such as quarter video graphics array (QVGA), and the first image data 126 includes a second data format, such as H.264, then the one or more video encoding techniques may encode the second image data from the QVGA format to the H.264 format (e.g., the processed second image data 130). While these are just some of examples of data formats for encoding the second image data 112, in other examples, the one or more encoding techniques may encode the second image data 112 from any first data format to any second data format.

With reference to FIG. 2B, at 220 the video processor(s) 202 may begin sending processed second image data to the main processor(s) 204. For instance, as the video processor(s) 202 are processing the second image data 112 to generate the processed second image data 130, the video processor(s) 202 may be sending the processed second image data 130 to the main processor(s) 204. Additionally, the main processor(s) 204 may cause the electronic device 102 to begin sending the processed second image data 130 to the computing system(s) 124 as the video processor(s) 202 are still processing the second image data 112.

At 222, the main processor(s) 204 may finish sending the second image data 112 to the video processor(s) 202 and, at 224, the video processor(s) 202 may finish sending the processed second image data 130 to the main processor(s) 204. For instance, the main processor(s) 204 may send the final portion(s) of the second image data 112 to the video processor(s) 202 for processing. After the video processor(s) 202 finish processing the second image data 112, the video processor(s) 202 may then send the last of the processed second image data 130 to the main processor(s) 204. Additionally, the main processor(s) 204 may cause the electronic device 102 to begin sending the last of the processed second image data 130 to the computing system(s) 124.

At 226, the video processor(s) 202 may process the first image data 126. For instance, after processing the second image data 112, the video processor(s) 202 may retrieve the first image data 126 stored in the first buffer 128. The video processor(s) 202 may then begin processing the first image data 126. In some instances, the electronic device 102 processes the first image data 126 accumulated in the first buffer 128 (the "accumulated first image data 126") using a first processing rate. After the electronic device 102 has processed the accumulated first image data 126, the electronic device 102 processes the first image data 126 as the first camera 106 is currently generating and then storing the first image data 126 in the first buffer 126 (the "currently generated first image data 126"). In some instances, the electronic device 102 processes the currently generated first image data 126 using a second processing rate, where the second processing rate is slower than the first processing rate.

At 228, the video processor(s) 202 may begin sending processed first image data 132 to the main processor(s) 204 and, at 230, the video processor(s) 202 may finish sending the processed first image data 132 to the main processor(s) 204. For instance, as the video processor(s) 202 are processing the first image data 126, the video processor(s) 202 may begin sending the processed first image data 132 to the main processor(s) 204. Additionally, the main processor(s) 204 may cause the electronic device 102 to begin sending the processed first image data 132 to the computing system(s) 124 as the video processor(s) 202 are still processing the first image data 126. After the video processor(s) 202 finish processing the first image data 126, the video processor(s) 202 may finish sending the last of the processed first image data 132 to the main processor(s) 204. Additionally, the main processor(s) 204 may cause the electronic device 102 to finish sending the processed first image data 132 to the computing system(s) 124.

Figure 2C:
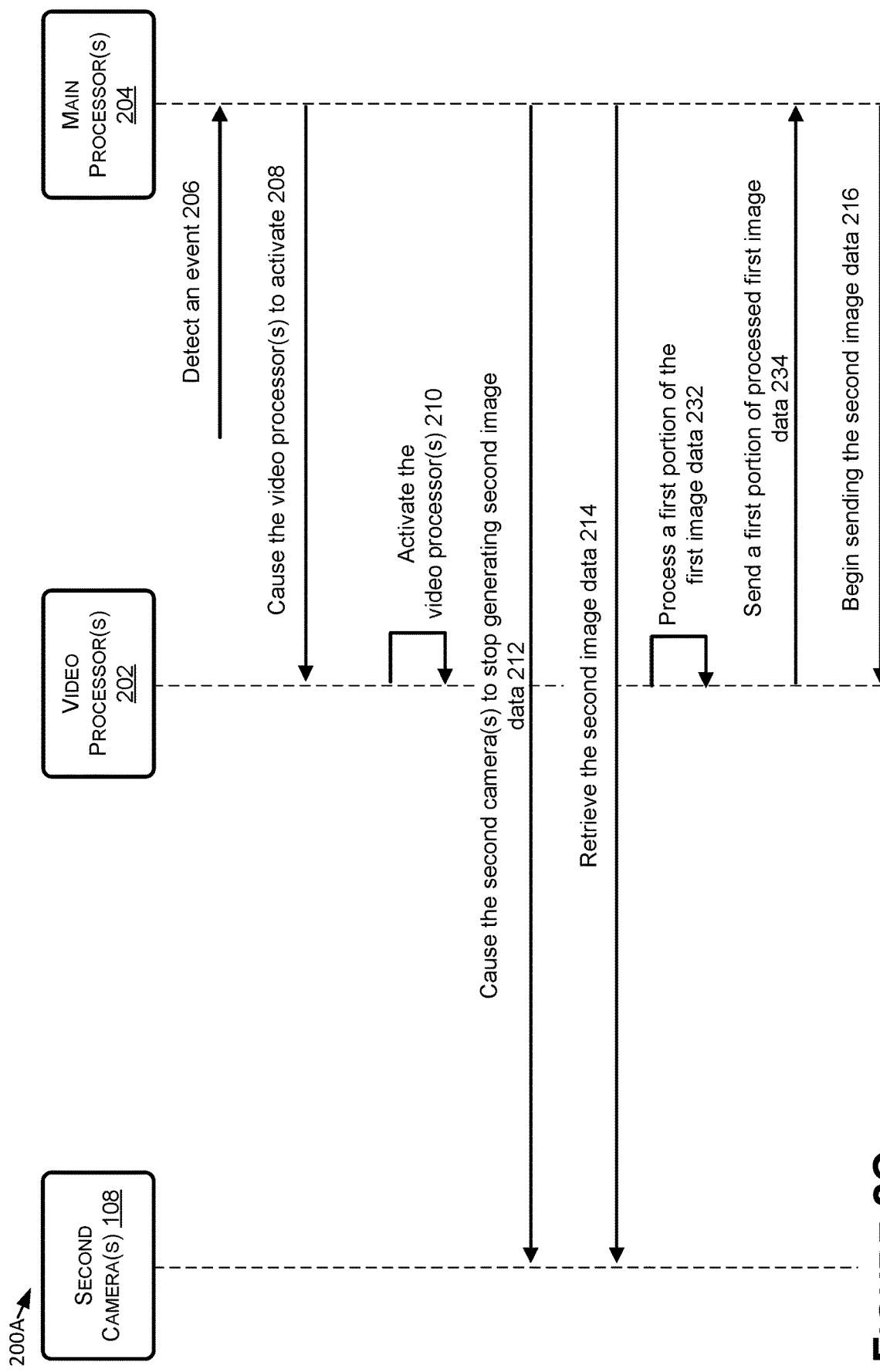
FIGS. 2C-2D are another sequence diagram illustrating an example process for an electronic device generating and then processing image data, according to various aspects of the present disclosure.
Figure 2D:
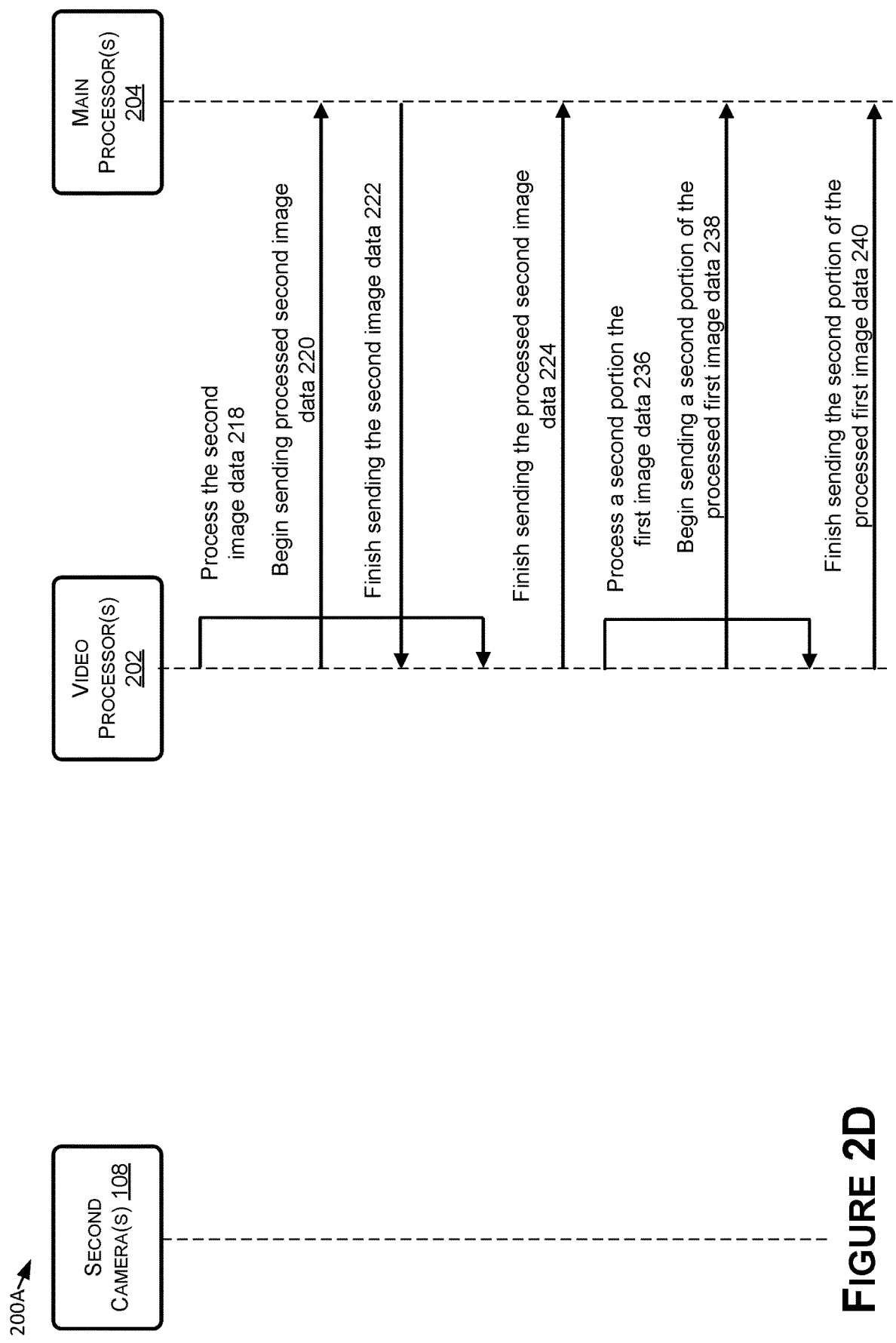

FIGS. 2C-2D are another sequence diagram illustrating an example process 200A for generating and then processing image data, according to various aspects of the present disclosure. As shown, the example of FIGS. 2C-2D is similar to the example of FIGS. 2A-2B, however, at 232, the video processor(s) 202 may process a first portion of first image data 126 and, at 234, the video processor(s) 202 may send a first portion of first processed image data 132 to the main processor(s) 204. The first portion of the first image data 126 may represent a single frame of video, several frames of video, a second of video, five seconds of video, and/or any other length of video. The video processor(s) 202 may process the first portion of the first image data 126, before processing the second image data 112, so that the client device 214 can use the first portion of the processed first image data 132 for the background of the user interface illustrated in FIG. 4B.

At 236, the video processor(s) 202 may process a second portion of the first image data 126. For instance, after processing the second image data 112, the video processor(s) 202 may begin processing the second portion of the first image data 126. Additionally, at 238, the video processor(s) 202 may begin sending a second portion of the processed first image data 132 to the main processor(s) 204 and, at 240, the video processor(s) 202 may finish sending the second portion of the processed first image data 132 to the main processor(s) 204.

Figure 3A:
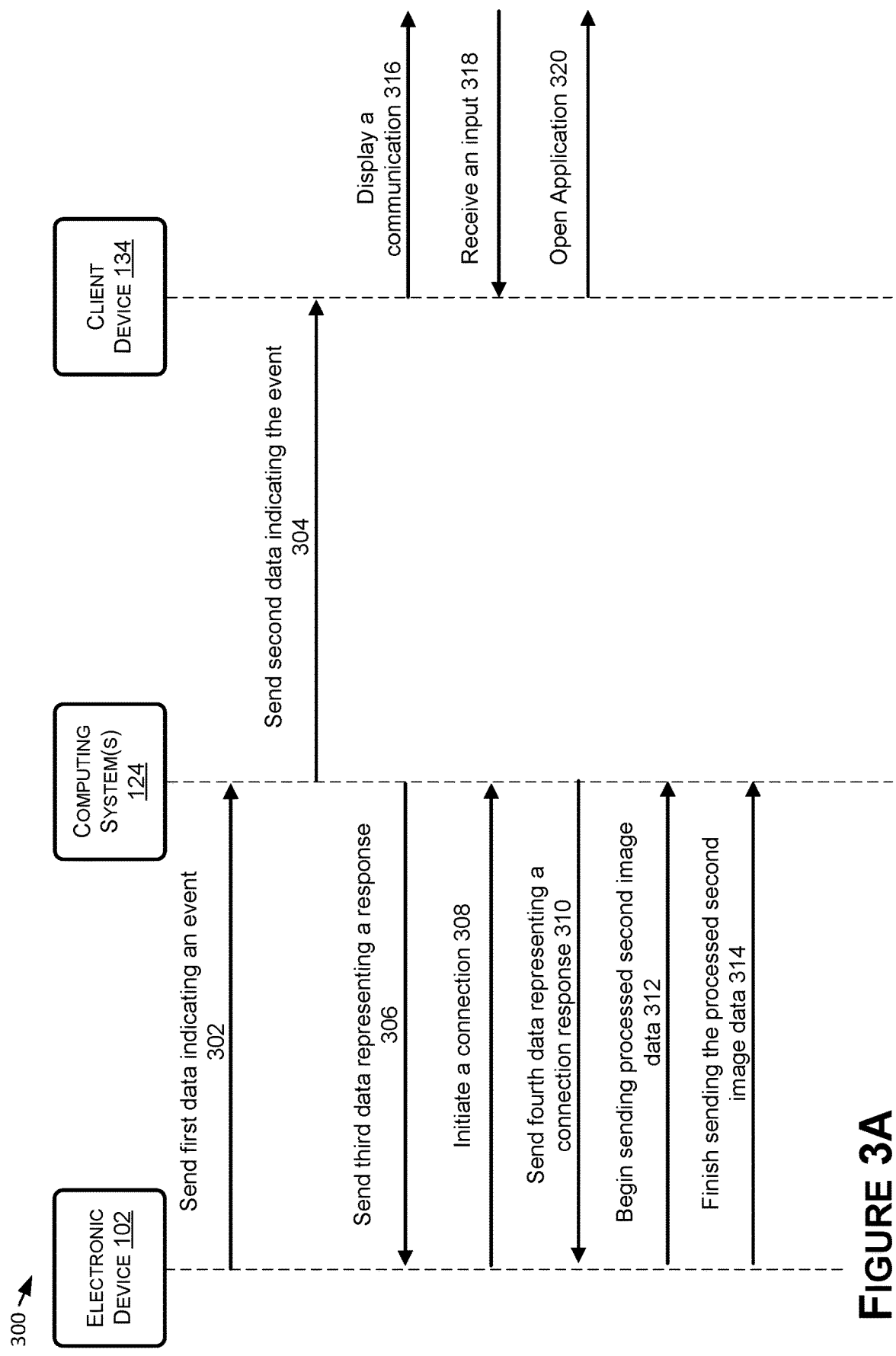
FIGS. 3A-3B are a sequence diagram illustrating an example process for an electronic device sending image data to a computing system, which then sends the image data to a client device, according to various aspects of the present disclosure.
Figure 3B:
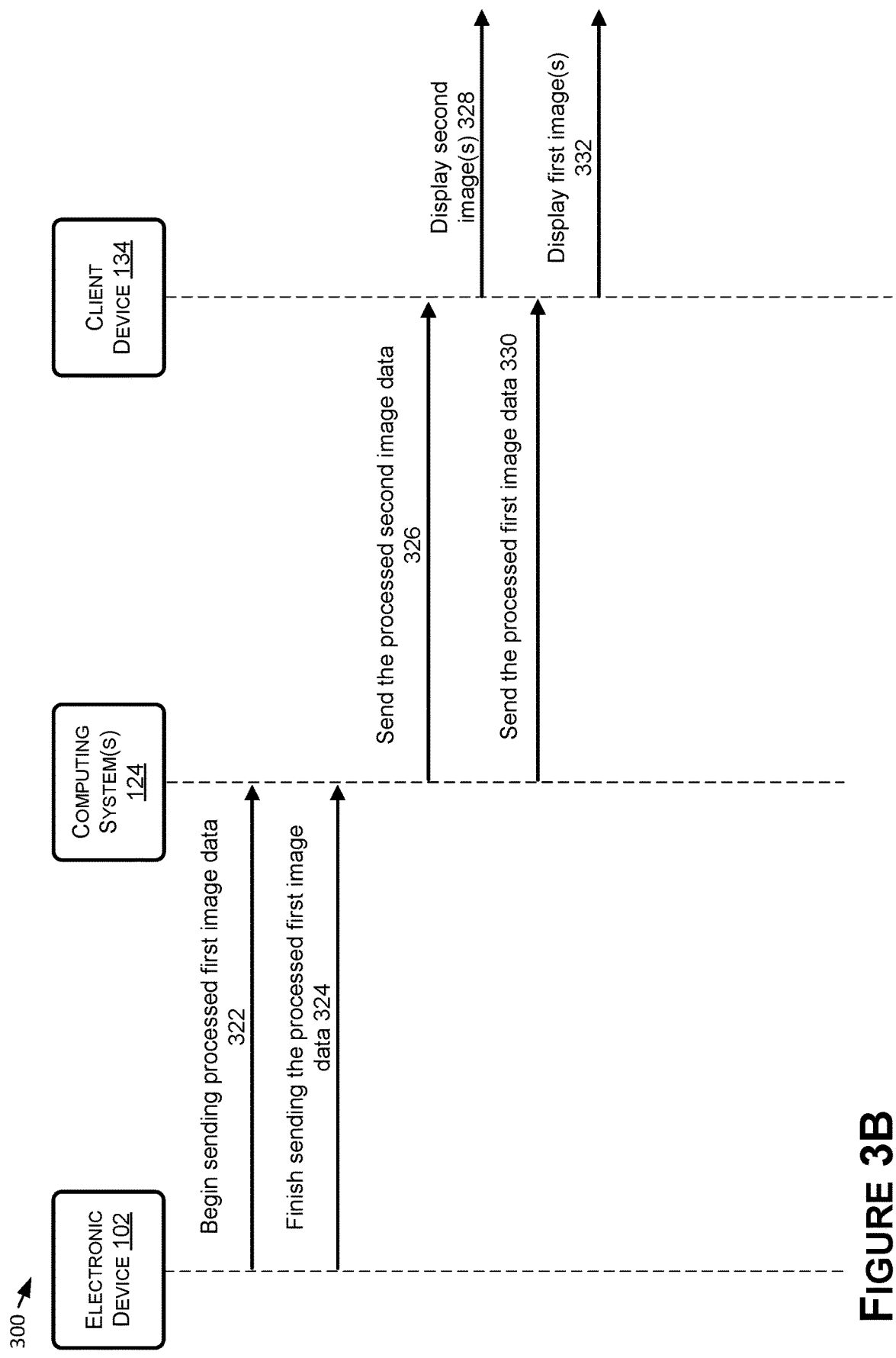

FIGS. 3A-3B are a sequence diagram illustrating an example process 300 for sending image data to the computing system(s) 124, which then sends the image data to the client device 134, according to various aspects of the present disclosure. In some instances, at least some of the processes from the example process 300 of FIGS. 3A-3B may be occurring at the same time as at least some of the processes from the example process 200 of FIGS. 2A-2B. In other instances, the example process 300 of FIGS. 3A-3B may occur after the example process 200 of FIGS. 2A-2B has completed. In some instances, the main processor(s) 204 may cause the electronic device 102 to perform at least some parts of the processes 200, 300.

At 302, the electronic device 102 may send first data indicating an event to the computing system(s) 124 and, at 304, the computing system(s) 124 may send second data indicating the event to the client device 134. For instance, after detecting the event, the electronic device 102 may send the event data 122 indicating that the event was detected and/or the type of event that was detected to the computing system(s) 124. The computing system(s) 124 may then send communication data to the client device 134, where the communication data represents a communication indicating that the event was detected and/or the type of event that was detected.

At 306, the computing system(s) 124 may send third data representing a response to the electronic device 102. For instance, the computing system(s) 124 may send the third data indicating that the computing system(s) 124 received the event data 122 from the electronic device 102.

At 308, the electronic device 102 may initiate a connection with the computing system(s) 124 and, at 310, the computing system(s) 124 may send fourth data representing a connection response to the electronic device 102. For instance, the electronic device 102 may initiate the connection by sending data to the computing system(s) 124, where the data represents a request to establish the connection. Based on the data, the computing system(s) 124 may establish the connection with the electronic device 102 and send the fourth data in response.

At 312, the electronic device 102 may begin sending processed second image data 130 to the computing system(s) 124 and, at 314, the electronic device 102 may finish sending the processed second image data 130 to the computing system(s) 124. For instance, the electronic device 102 may begin sending the processed second image data 130 as the electronic device 102 is still processing the second image data 112. The electronic device 102 may then finish sending the processed second image data 130 after the electronic device 102 finishes processing all of the second image data 112. In some instances, the computing system(s) 124 may then generate the association data 136 that associates the processed second image data 130 with the information for the event.

At 316, the client device 134 may display a communication, at 318, the client device 134 may receive an input, and, at 320, the client device 134 may open an application. For instance, after receiving the communication data, the client device 134 may display the communication indicating that the event occurred and/or the type of event that occurred. The client device 134 may then receive an input to open an application associated with the electronic device 102. Based on the input, the client device 134 may open the application. In some instances, the processes 316-320 may be performed while the processes 304-314 are being performed. In other instances, one or more of the processes 316-320 may be performed subsequent to the processes 304-314 completing.

At 322, the electronic device 102 may begin sending processed first image data 132 to the computing system(s) 124 and, at 324, the electronic device 102 may finish sending the processed first image data 132 to the computing system(s) 124. For instance, the electronic device 102 may begin sending the processed first image data 132 as the electronic device 102 is still processing the first image data 126. The electronic device 102 may then finish sending the processed first image data 132 after the electronic device 102 finishes processing all of the first image data 126. In some instances, the computing system(s) 124 may then generate the association data 136 that associates the processed first image data 132 with the information for the event and/or the processed second image data 130.

At 326, the computing system(s) 124 may send the processed second image data 130 to the client device 134 and, at 328, the client device 134 may display second image(s) represented by the processed second image data 130. In some instances, the computing system(s) 124 may begin sending the processed second image data 130 to the client device 134 after the computing system(s) 124 begins receiving the processed second image data 130 from the electronic device 102 (e.g., at 312). In some instances, the computing system(s) 124 may begin sending the processed second image data 130 to the client device 134 after receiving, from the client device 134, a request for the processed second image data 130.

At 330, the computing system(s) 124 may send the processed first image data 132 to the client device 134 and, at 332, the client device 134 may display first image(s) represented by the processed first image data 132. In some instances, the computing system(s) 124 may begin sending the processed first image data 132 to the client device 134 after the computing system(s) 124 begins receiving the processed first image data 132 from the electronic device 102 (e.g., at 324). In some instances, the computing system(s) 124 may begin sending the processed first image data 132 to the client device 134 after receiving, from the client device 134, a request for the processed first image data 132.

In some instances, the computing system(s) 124 may send the processed first image data 132 to the client device 134 (e.g., at 330) before the computing system(s) 124 sends the processed second image data 130 to the client device 134 (e.g., at 326). For instance, the client device 134 may initially display the first image(s) represented by the first processed image data 132. While displaying the first image(s), the client device 134 may receive an input associated with viewing the second image(s). Based on the input, the client device 134 may send, to the computing system(s) 124, data representing a request for the processed second image data 130. The client device 134 may then receive the processed second image data 132 in response.

Figure 3C:
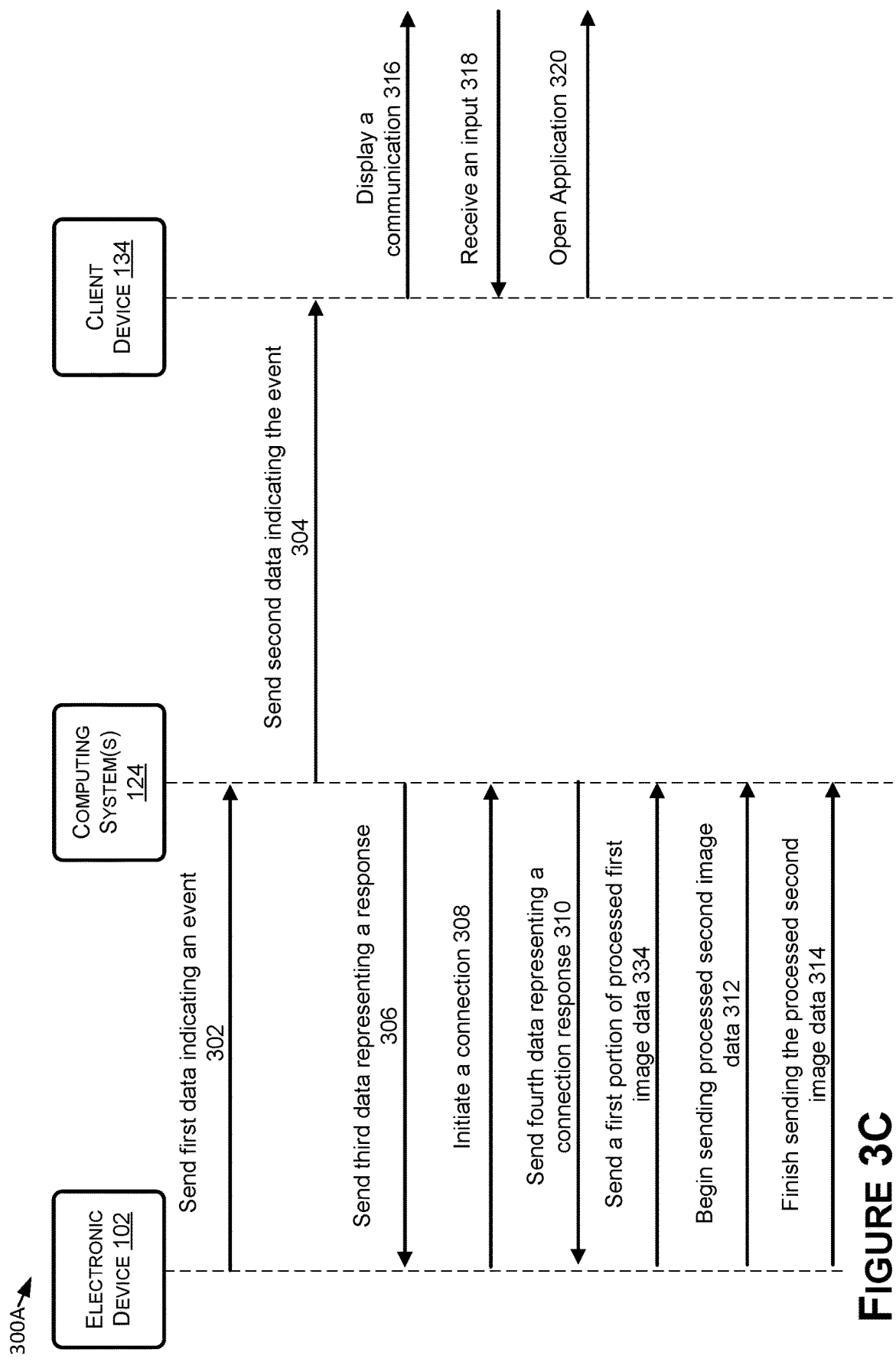
FIGS. 3C-3D are another sequence diagram illustrating an example process for an electronic device sending image data to a computing system, which then sends the image data to a client device, according to various aspects of the present disclosure.
Figure 3D:
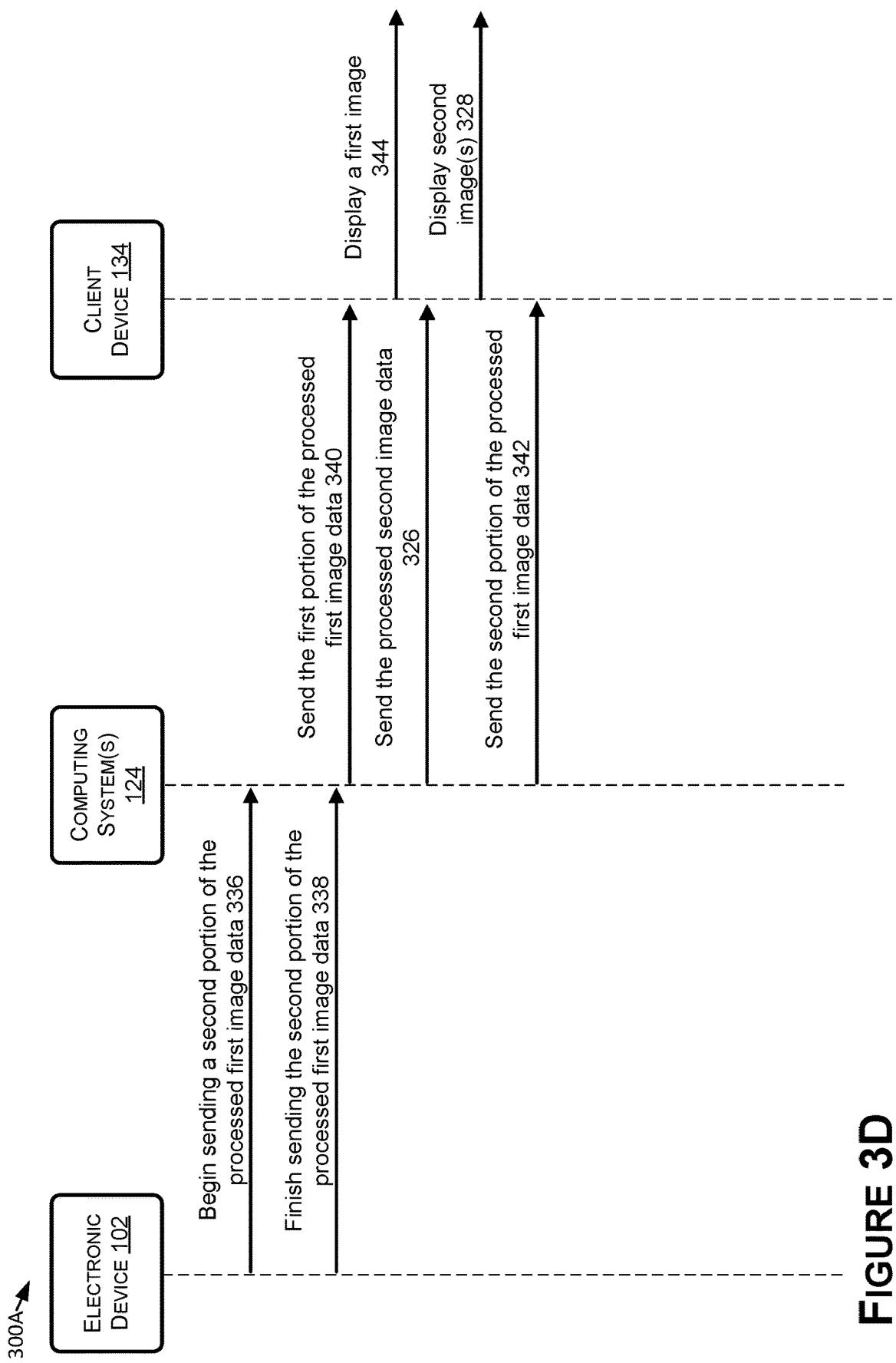

FIGS. 3C-3D are a sequence diagram illustrating an example process 300A for sending image data to the computing system(s) 124, which then sends the image data to the client device 134, according to various aspects of the present disclosure. As shown, the example of FIGS. 3C-3D is similar to the example of FIGS. 3A-3B, however, at 334, the electronic device 102 may send a first portion of processed first image data 132 to the computing system(s) 124. The first portion of the processed first image data 132 may represent a single frame of video, several frames of video, a second of video, five seconds of video, and/or any other length of video. The electronic device 102 may send the first portion of the processed first image data 132, before sending the processed second image data 130, so that the client device 214 can use the first portion of the processed first image data 132 for the background of the user interface illustrated in FIG. 4B.

At 336, the electronic device 102 may begin sending a second portion of the processed first image data 132 to the computing system(s) 124 and, at 338, the electronic device 102 may finish sending the second portion of the processed first image data 132 to the computing system(s) 124. For instance, the electronic device 102 may begin sending the second portion of the processed first image data 132 as the electronic device 102 is still processing the first image data 126. The electronic device 102 may then finish sending the second portion of the processed first image data 132 after the electronic device 102 finishes processing all of the first image data 126.

Furthermore, at 340, the computing system(s) 124 may send the first portion of the processed first image data 132 to the client device 134 before sending the processed second image data 134. Additionally, at 342, the computing system(s) 124 may send the second portion of the processed first image data 132 to the client device 134 after sending the processed second image data 134. This way, at 344, the client device 134 may display a first image represented by the first portion of the processed first image data 130 as the background image, and the client device 134 may also display the second images.

Figure 4A:
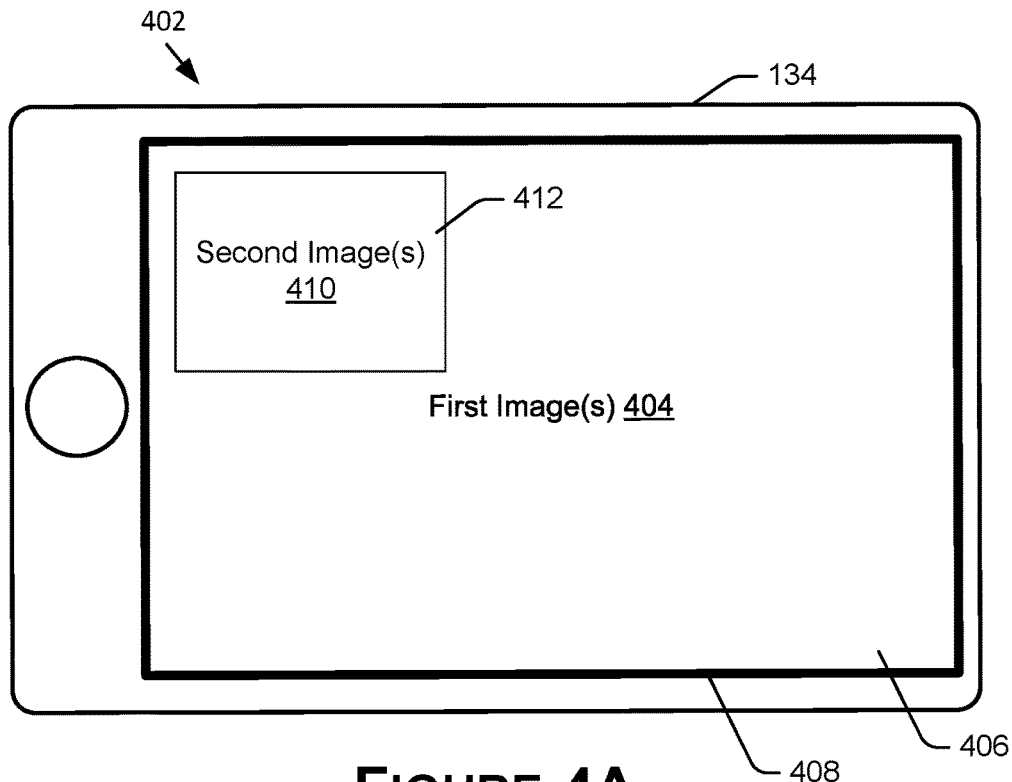
FIGS. 4A-4C are example user interfaces that a client device may use to display images, where the images are represented by image data generated by an electronic device, according to various aspects of the present disclosure.
Figure 4B:
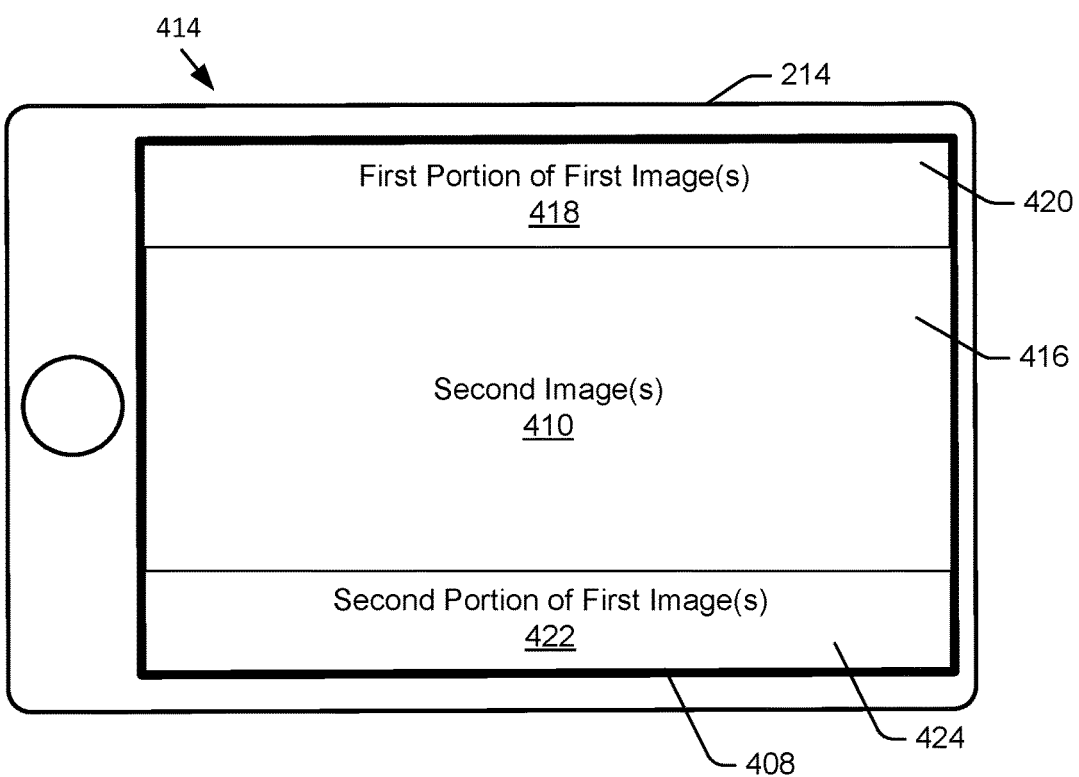
Figure 4C:
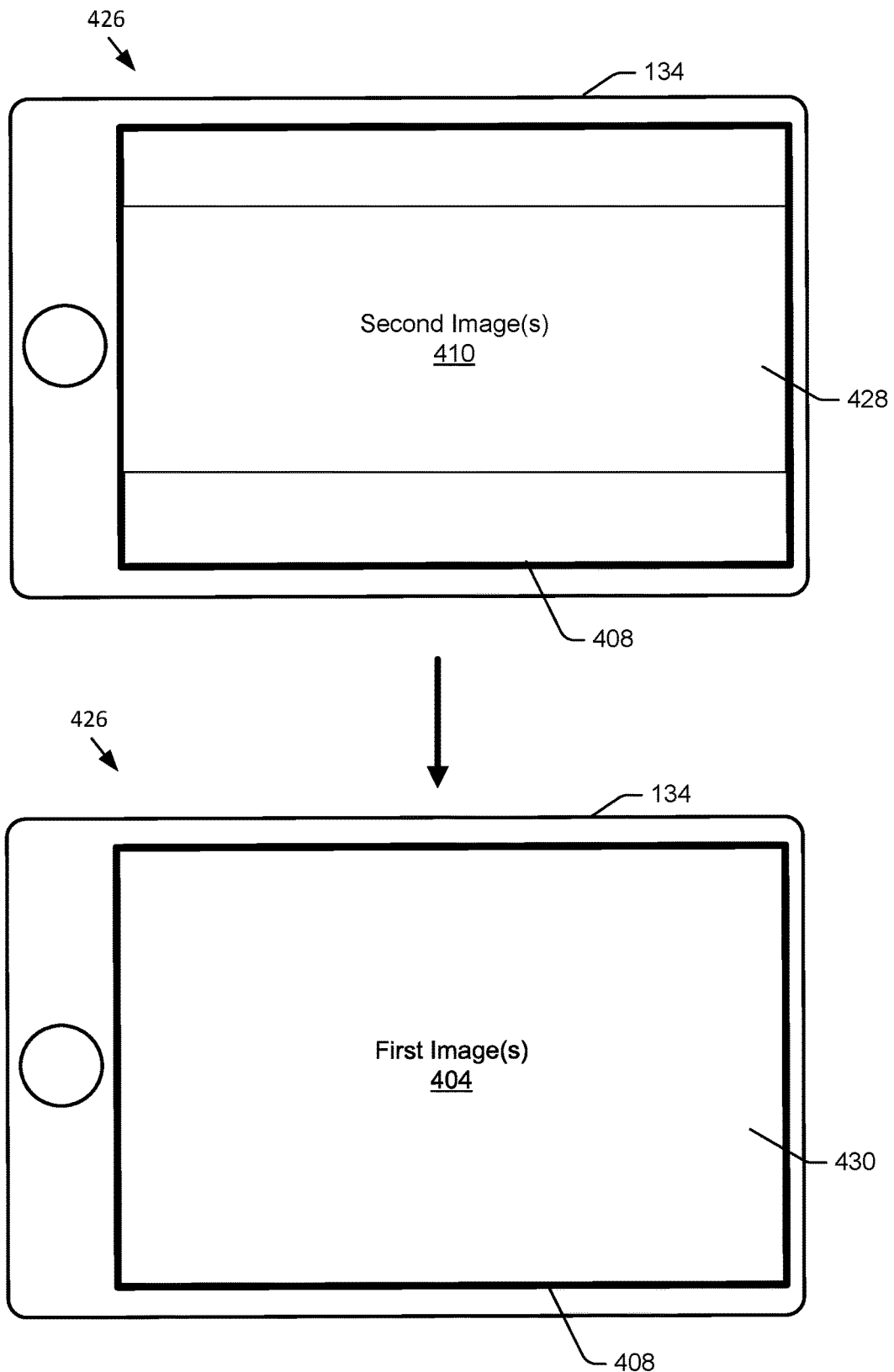

FIGS. 4A-4C are example user interfaces that the client device 134 may use to display images, where the images are represented by the image data (e.g., the second image data 112, the first image data 126, etc.) generated by the electronic device 102, according to various aspects of the present disclosure. For instance, in the example of FIG. 4A, the client device 134 may display a first user interface 402, where the first user interface 402 displays first image(s) 404 represented by the processed first image data 132 at a first portion 406 of a display 408 of the client device 134. The first user interface 402 further displays second image(s) 410 represented by the processed second image data 130 at a second portion 412 of the display 408. In the example of FIG. 4A, the first user interface 402 may be a picture-in-picture user interface, where the second portion 412 overlaps with, or overlies a section of the first portion 406.

In some instances, the client device 134 may continuously repeat, or loop, the displaying of the second image(s) 410. For example, if the processed second image data 130 represents a video, the video may continuously be repeated within the second portion 412 during the time that the first image(s) 404 are being displayed. In some instances, the first image(s) 404 may represent a live view from the first camera 106. For instance, the first camera 106 may still be generating the first image data 126 while the first image(s) 404 are being displayed.

In some instances, the processed first image data 132 is sent to a first computing system 124 (and/or first service) and the processed second image data 130 is sent to a second computing system 124 (and/or second service). The client device 134 then receives the processed second image data 130 from the second computing system 124 and uses the processed second image data 130 to display the second image(s) 410 in the second portion 412 of the display 408. Additionally, the client device 134 receives the processed first image data 132 from the first computing system 124 and uses the processed first image data 132 to display the first image(s). In some instances, the client device 134 receives the processed first image data 132 while receiving the processed second image data 130. In other instances, the client device 134 receives the processed first image data 132 before or after receiving the processed second image data 130. In some instances, the client device 134 receives the processed second image data 130 as a data file, which the client device 134 stores in memory and uses to display the second image(s) 410 in the second portion 412 of the display 408, for example as a repeating loop, and the client device 134 receives the processed first image data 132 as a video stream, which the client device 134 uses to display the first image(s) 404 in the first portion 406 of the display 408. In some embodiments, the first computing system 124 may store the processed first image data 132 and the second computing system 124 may store the processed second image data 130.

In the example of FIG. 4B, the client device 134 may display a second user interface 414, where the second user interface 414 displays the second image(s) 410 at a third portion 416 of the display 408. The second user interface 414 further displays a first portion of the first image(s) 418 at a fourth portion 420 of the display 408 and a second portion of the first image(s) 422 at a fifth portion 424 of the display 408, where the fourth portion 420 of the display 408 is above the third portion 416 and the fifth portion 424 of the display 408 is below the third portion 416. In some instances, the client device 134 may use the second user interface 414 when the vertical FOV of the second camera(s) 108 is less than the vertical FOV of the first camera 106. As such, the first portion of the first image(s) 418 and the second portion of the first image(s) 422 may increase the vertical FOV being displayed by the second user interface 414 to include the vertical FOV of the first camera 106, even when the second user interface 414 is displaying the second image(s) 410. In some instances, the first portion of the first image(s) 418 and/or the second portion of the first image(s) 422 may be blurred.

In some instances, the first portion of the first image(s) 418 and/or the second portion of the first image(s) 422 may be blurred using one or more filters, such as, but not limited to, a mean filter, a weighted average filter, a Gaussian filter, and/or one or more other filters. The mean filter may include a mask with an odd ordered list of elements, where the sum of the elements is one, and the elements are all the same. The mask is then applied to the first image data 126 to blur the first image(s) 418. The weighted average filter gives more weight to the center elements of the mask, with the sum of the elements again including one. The mask is then applied to the first image data 126 to blur the first image(s) 418. While these are just some examples of filters that may be used to blur the first image(s) 418, in other examples, one or more additional and/or alternative filters may be used.

In the example of FIG. 4C, the client device 134 may display a third user interface 426, where the third user interface 426 displays the second image(s) 410 at a sixth portion 428 of the display 408 followed by displaying the first image(s) 404 at a seventh portion 430 of the display 408. In some instances, the sixth portion 428 may occupy less of the vertical extent of the display 408 than the seventh portion 430, since the vertical FOV of the second camera(s) 108 may be less than the vertical FOV of the first camera 106. In some instances, the third user interface 426 displays the second image(s) 410 using a first playback rate and displays the first image(s) 404 using a second, different playback rate. For instance, the first playback rate may be greater than the second playback rate. As described herein, a playback rate may include, but is not limited to, 15 frames per second, 30 frames per second, 60 frames per second, and the like.

In some instances, the client device 134 may read the processed second image data 130 using a first read rate in order to display the second image(s) 410 and then read the processed first image data 132 using a second read rate in order to display the first image(s) 404. The first read rate may be a multiple of the second read rate. For examples, the first read rate may be 1.1, 1.2, 1.3, 1.4, 1.5, 2, 2.5, or 3 times the second read rate. As such, the second image(s) 410 will be displayed using the first playback rate, which may appear to the user that the video is being fast forwarded (proceeding at a rate that is faster than the rate at which the actual event occurred). After displaying the second image(s) 410, the first image(s) 404 will be displayed using the second playback rate, which may include a normal speed (a rate that corresponds to the rate at which the actual event occurred).

Figures 5A, 5B, 5C:
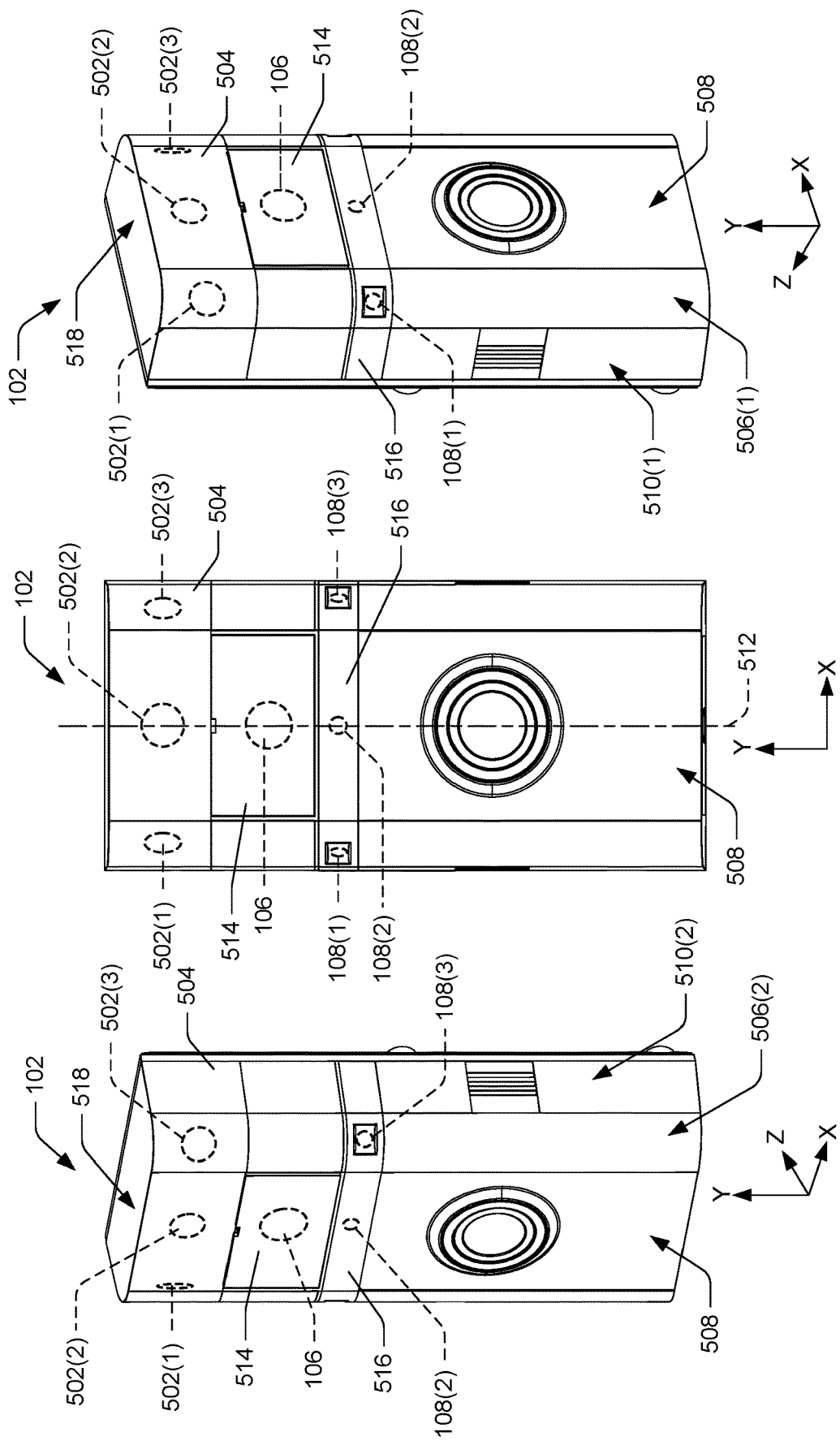
FIG. 5A illustrates a first side view of an electronic device, showing example components within the electronic device, according to various aspects of the present disclosure.
FIG. 5B illustrates a front view of the electronic device, showing example components within the electronic device, according to various aspects of the present disclosure.
FIG. 5C illustrates a second side view of the electronic device, showing example components within the electronic device, according to various aspects of the present disclosure.

FIGS. 5A-5C illustrate the electronic device 102 and show various components of the electronic device 102 in dashed lines to illustrate their position, or orientation, within the electronic device 102. In the example of FIGS. 5A-5C, the electronic device 102 may include PIR sensors 502(1)-(3) (which may represent, and/or include, the sensors 110) disposed behind a first cover 504 of the electronic device 102. For example, the PIR sensors 502(1)-(3) may be disposed behind (Z-direction) the first cover 504. In some instances, the PIR sensors 502(1)-(3) may be horizontally distributed across the electronic device 102 (X-direction). In some instances, the PIR sensors 502(1)-(3) may be equally spaced apart across a width of the electronic device 102

(X-direction). Further, in some instances, the PIR sensors 502(1)-(3) may be horizontally aligned (X-direction).

In some instances, the electronic device 102 may include three PIR sensors 502(1)-(3), such as a first PIR sensor 502(1), a second PIR sensor 502(2), and/or a third PIR sensor 502(3). In some instances, the first PIR sensor 502(1) may be disposed at, or proximate to, a first corner 506(1) of the electronic device 102, between a front 508 and a first side 510(1) of the electronic device 102. The second PIR sensor 502(2) may be disposed at, or proximate to, the front 508 of the electronic device 102. In some instances, the second PIR sensor 502(2) may be aligned with a longitudinal axis 512 of the electronic device 102 in the front view of FIG. 5B. The second PIR sensor 502(2) may therefore be centered (X-direction) on the electronic device 102, between the first side 510(1) and a second side 510(2). The third PIR sensor 502(3) may be disposed at, or proximate to, a second corner 506(2) of the electronic device 102, between the front 508 and the second side 510(2) of the electronic device 102.

Furthermore, the electronic device 102 may include the first camera 106 disposed behind a second cover 514 and the second cameras 108 disposed behind a third cover 516 of the electronic device 102. In some instances, the second cameras 108 may include three cameras, such as a second camera 108(1), a third camera 108(2), and a fourth camera 108(3). The first camera 106 may be disposed behind the second cover 514 (Z-direction), while the second camera 108(1), the third camera 108(2), and/or the fourth camera 108(3) may be disposed behind the third cover 516 (Z-direction). In some instances, the second cameras 108 may be horizontally distributed across the electronic device 102 and/or equally spaced apart across the width of the electronic device 102.

In some instances, the first camera 106 may be aligned along the longitudinal axis 512 in the front view of FIG. 5B, below the PIR sensors 502(1)-(3) (Y-direction). The first camera 106 may therefore be centered (X-direction) on the electronic device 102, between the left side 510(1) and the right side 510(2). The second camera 108(1) may be disposed at, or proximate to, the first corner 506(1) and the fourth camera 108(3) may be disposed at, or proximate to, the second corner 506(2). The third camera 108(2) may be disposed between (X-direction) the second camera 1081(1) and the fourth camera 108(3). In some instances, the third camera 108(2) may be aligned with the longitudinal axis 512 of the electronic device 102 in the front view of FIG. 5B. Accordingly, in some instances, the second PIR sensor 502(2), the first camera 106, and/or the third camera 108(2) may vertically aligned with one another (Y-direction). The first camera 106 may also be equally spaced, vertically (Y-direction), between the second PIR sensor 502(2) and the third camera 108(2).

As illustrated in FIGS. 5A-5C, the PIR sensors 502(1)-(3) may be arranged closer to a top 518 of the electronic device 102 than the first camera 106 and the second cameras 108. Further, in some instances, the first camera 106 may be arranged closer to the top 518 of the electronic device 102 than the second cameras 108.

Figure 6:
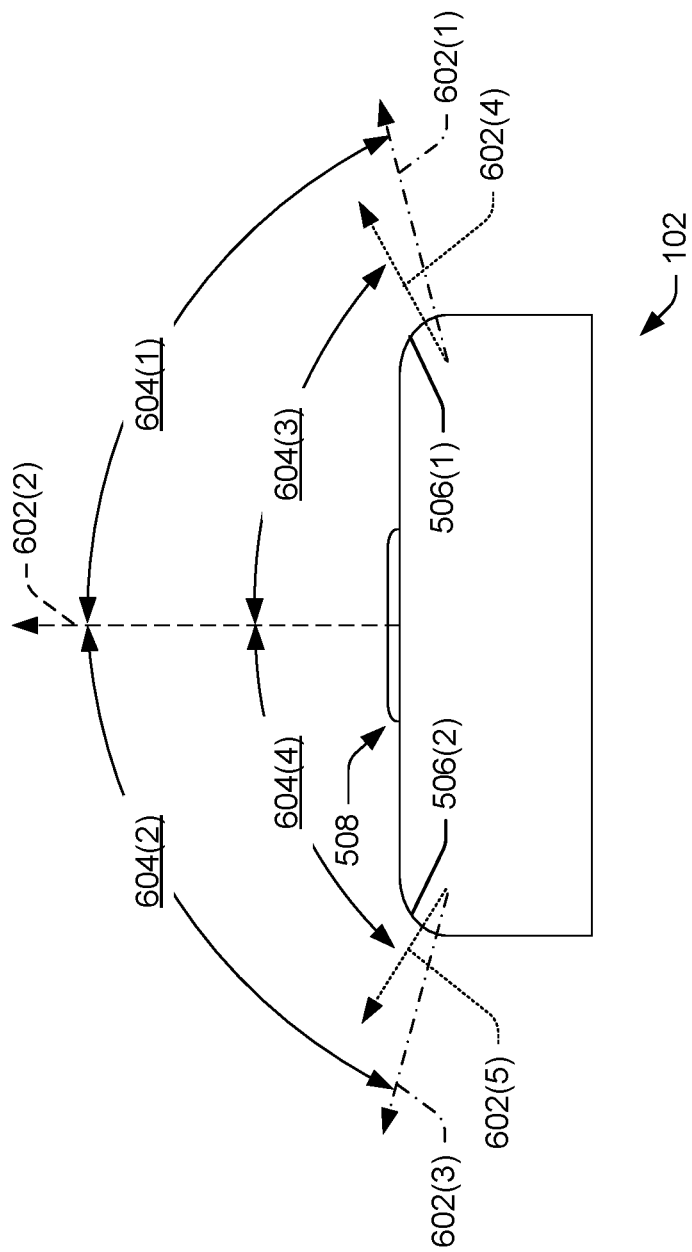
FIG. 6 illustrates a top view of an electronic device, showing example fields of view of example components of the electronic device, according to an aspect of the present disclosure.

FIG. 6 illustrates example orientations of the PIR sensors 502 and the cameras 106, 108 within the electronic device 102. With reference to FIGS. 5A-5C and 6, the first PIR sensor 502(1) may be disposed at, or proximate to, the first corner 506(1) of the electronic device 102 and oriented in a first direction 602(1). In some instances, the first direction 602(1) may be disposed at an angle 604(1) relative to a second direction 602(2) that is perpendicular to the longitudinal axis 512 and parallel to the Z-axis. In some instances, the angle 604(1) may comprise 45 degrees, 50 degrees, 55 degrees, 60 degrees, or any other angle. The first direction 602(1) may be oriented orthogonal to a front surface of the first PIR sensor 502(1), and may bisect a horizontal FOV of the first PIR sensor 502(1). As such, the first PIR sensor 502(1) may be oriented to capture motion in front of and/or to the first side 506(1) of the electronic device 102.

The second PIR sensor 502(2) may be disposed along the longitudinal axis 512 (or another axis that is parallel to the longitudinal axis 512) so as to be horizontally centered on the electronic device 102. The second PIR sensor 502(2) may be oriented in the second direction 602(2), which is perpendicular to the longitudinal axis 512 and parallel to the Z-axis. The second direction 602(2) may be oriented orthogonal to a front surface of the second PIR sensor 502(2), and may bisect a horizontal FOV of the second PIR sensor 502(2). As such, the second PIR sensor 502(2) may be oriented to capture motion in front of and/or to the sides of the electronic device 102.

The third PIR sensor 502(3) may be disposed at, or proximate to, the second corner 506(2) of the electronic device 102 and oriented in a third direction 602(3). In some instances, the third direction 602(3) may be disposed at an angle 604(2) relative to the second direction 602(2). In some instances, the angle 604(2) may be the same as or similar to the angle 402(1). The third direction 602(3) may be oriented orthogonal to a front surface of the third PIR sensor 502(3), and may bisect a horizontal FOV of the third PIR sensor 502(3). As such, the third PIR sensor 502(3) may be oriented to capture motion in front of and/or to the side of the electronic device 102.

As the first PIR sensor 502(1) and the third PIR sensor 502(3) are angled or oriented away from the second direction 602(2), the first PIR sensor 502(1) and the third PIR sensor 502(3) may expand a collective horizontal FOV of the PIR sensors 502. For example, each of the PIR sensors 502 may include a respective horizontal FOV, and in some instances the horizontal FOVs of the PIR sensors 502 may overlap. For example, the horizontal FOV of the second PIR sensor 502(2) may overlap the horizontal FOV of the first PIR sensor 502(1) by between 10 degrees and 20 degrees, and may overlap the horizontal FOV of the third PIR sensor 502(3) by between 10 degrees and 20 degrees. The PIR sensors 502 may thus provide a collective horizontal FOV of approximately or substantially between 160 degrees and 180 degrees, such as about 170 degrees. In some examples, a vertical FOV of the PIR sensors 502 may be between 30 degrees and 60 degrees, such as about 45 degrees. However, in other examples, the horizontal FOV and/or the vertical FOV of the PIR sensors 502 may include any other angle.

The first camera 106 may be disposed along the longitudinal axis 512 (or another axis that is parallel to the longitudinal axis 512) so as to be horizontally centered on the electronic device 102. The first camera 106 may be oriented such that the axis of the lens of the first camera 106 is parallel to, or coincident with, the second direction 602(2), which is perpendicular to the longitudinal axis 512 and parallel to the Z-axis. As such, in some instances, the first camera 106 may be oriented to record images and/or videos in front of and/or to the sides of the electronic device 102. In some examples, the first camera 106 may include a horizontal FOV of approximately or substantially between 150 degrees and 180 degrees, such as about 165 degrees, and/or a vertical FOV of approximately or substantially between 50 degrees and 80 degrees, such as about 65 degrees. In other examples, the first camera 106 may include a horizontal FOV and/or vertical FOV that includes any other angle.

The second camera 108(1) may be disposed at, or proximate to, the first corner 506(1) of the electronic device 102 and oriented in a fourth direction 602(4). In some instances, the fourth direction 602(4) may be disposed at an angle 604(3) relative to the second direction 602(2). In some instances, the angle 604(3) may include angles such as 30 degrees, 35 degrees, 40 degrees, 45 degrees, and/or any other angle. The fourth direction 602(4) may be parallel to, or coincident with, an axis of a lens of the second camera 108(1), and may bisect a horizontal FOV of the second camera 108(1). As such, the second camera 108(1) may be oriented to record images/video in front of and/or to the first side 508 of the electronic device 102.

The third camera 108(2) may be disposed along the longitudinal axis 512 (or another axis that is parallel to the longitudinal axis 512) so as to be horizontally centered on the electronic device 102. The third camera 108(2) may be oriented such that the axis of the lens of the third camera 108(2) is parallel to, or coincident with, the second direction 602(2), which is perpendicular to the longitudinal axis 512 and parallel to the Z-axis. As such, in some instances, the third camera 108(2) may be oriented to record images/video in front of and/or to the sides the electronic device 102.

The fourth camera 108(3) may be disposed at, or proximate to, the second corner 506(2) of the electronic device 102 and oriented in a fifth direction 602(5). In some instances, the fifth direction 602(5) may be disposed at an angle 604(4) relative to the second direction 602(2). In some instances, the angle 604(4) may be the same as or similar to the angle 604(3). The fifth direction 602(5) may be parallel to, or coincident with, an axis of a lens of the fourth camera 108(3), and may bisect a horizontal FOV of the fourth camera 108(3). As such, the fourth camera 108(3) may be oriented to record images/video in front and/or to the second side of the electronic device 102.

As the second camera 108(1) and the fourth camera 108(3) are angled or oriented away from the second direction 602(2), the second camera 108(1) and the fourth camera 108(3) may expand a collective horizontal FOV of the second cameras 108. For example, each of the second cameras 108 may include a respective horizontal FOV, and in some instances the horizontal FOVs of the second cameras 108 may overlap. For example, the horizontal FOV of the third camera 108(2) may overlap the horizontal FOV of the second camera 108(1) by between 10 degrees and 20 degrees, and may overlap the horizontal FOV of the fourth camera 108(3) by between 10 degrees and 20 degrees. The image data and/or video data recorded by the second cameras 108 may be stitched together or otherwise combined to produce a collective FOV for the second cameras 108, and in some examples the horizontal FOV of the second cameras 108 may be approximately or substantially between 150 degrees and 180 degrees, such as about 165 degrees. In some examples, a vertical FOV of the second cameras 108 may be approximately or substantially between 35 degrees and 65 degrees, such as about 50 degrees. However, in other examples, the horizontal FOV and/or the vertical FOV of the second cameras 108 may include any other angle.

In some instances, the horizontal FOV and/or the vertical FOV of the PIR sensors 502 may be greater than the horizontal FOV and/or the vertical FOV of the first camera 106 and/or the second cameras 108. That is, in some instances, the angle 604(3) and the angle 604(4) may be smaller than the angle 604(1) and the angle 604(2), respectively.

Although FIG. 6 illustrates that the first direction 602(1) is not aligned with the fourth direction 602(4), and the third direction 602(3) is not aligned with the fifth direction 602(5), in some embodiments the first direction 602(1) may be aligned with the fourth direction 602(4), and/or the third direction 602(3) may be aligned with the fifth direction 602(5). In such embodiments, the first PIR sensor 502(1) would be aligned with the second camera 108(1), and/or the third PIR sensor 502(3) would be aligned with the fourth camera 108(3).

Figure 7:
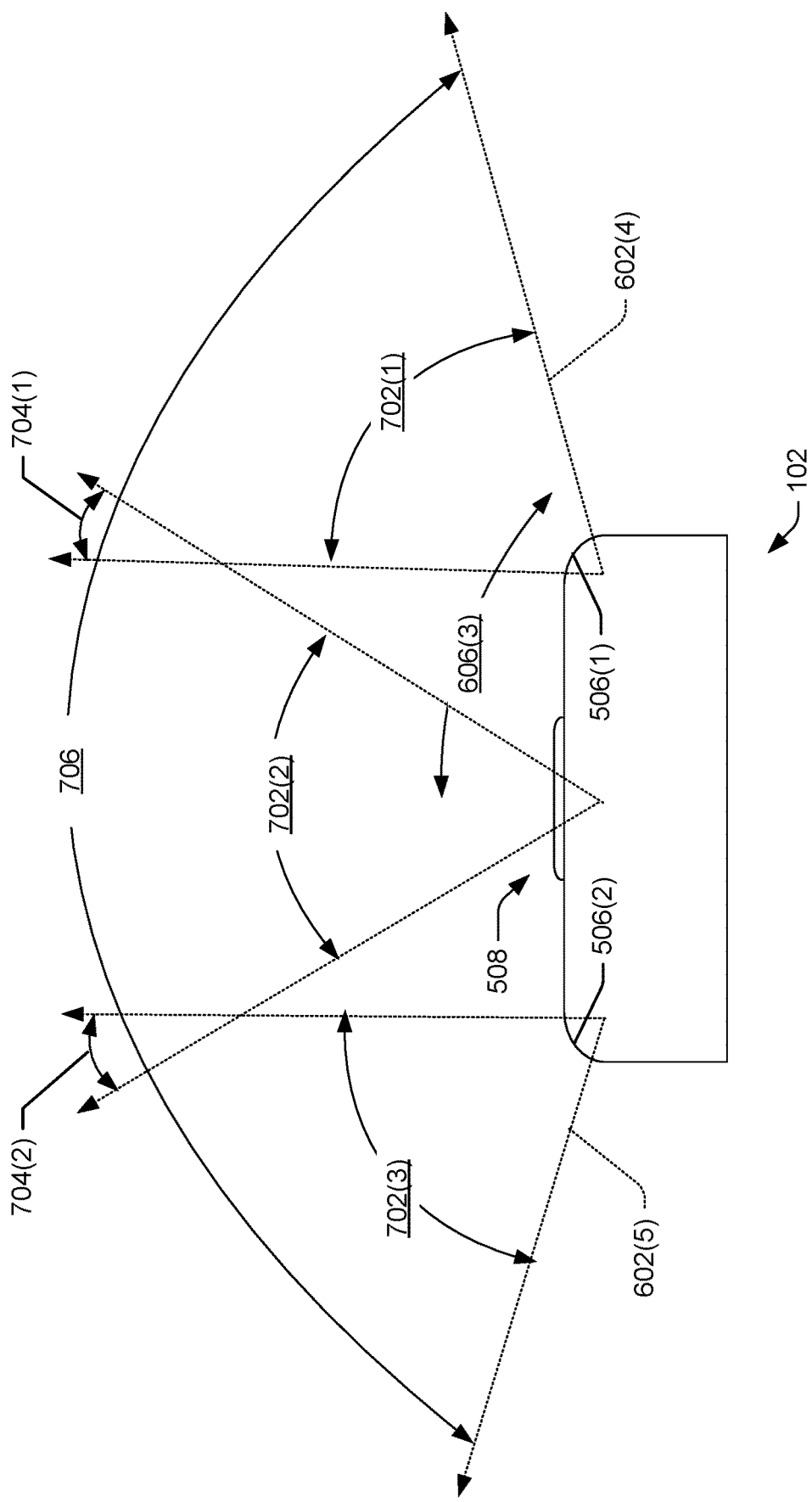
FIG. 7 illustrates a top view of an electronic device, showing example fields of view of cameras of the electronic device, according to an aspect of the present disclosure.

FIG. 7 illustrates a top view of the electronic device 102, showing example fields of view of the second cameras 108 of the electronic device 102, according to various aspects of the present disclosure. In the example of FIG. 7, the second camera 108(1), located at the first corner 506(1), may have a first horizontal FOV 702(1), the third camera 108(2), located at the front 508, may have a second horizontal FOV 702(2), and the fourth camera 108(3), located at the second corner 506(2), may have a third horizontal FOV 702(3). In some instances, each of the first horizontal FOV 702(1), the second horizontal FOV 702(2), and the third horizontal FOV 702(3) may all subtend the same angle. For example, each of the first horizontal FOV 702(1), the second horizontal FOV 702(2), and the third horizontal FOV 702(3) may be 50 degrees, 72 degrees, 90 degrees, and/or any other angle. In other instances, the first horizontal FOV 702(1), the second horizontal FOV 702(2), and/or the third horizontal FOV 702(3) may subtend different angles from one another.

Additionally, the first horizontal FOV 702(1) may at least partially overlap with the second horizontal FOV 702(2) by a first angle 704(1), and the third horizontal FOV 702(3) may at least partially overlap with the second horizontal FOV 702(2) by a second angle 704(2). In some instances, the first angle 704(1) may be the same as the second angle 704(2). For example, each of the first angle 704(1) and the second angle 704(2) may be 10 degrees, 20 degrees, 23 degrees, and/or any other angle. In other instances, the first angle 704(1) may be different than the second angle 704(2).

As further illustrated in the example of FIG. 7, the second cameras 108 include a combined horizontal FOV 706 that includes the first horizontal FOV 702(1), the second horizontal FOV 702(2), and the third horizontal FOV 702(3). The combined horizontal FOV 706 may subtend an angle of 150 degrees, 170 degrees, 180 degrees, and/or any other angle. In some instances, the angle of the combined horizontal FOV 706 of the second cameras 108 may be the same as the angle of the horizontal FOV of the first camera 106. In other instances, the angle of the combined horizontal FOV 706 of the second cameras 108 may be different than the angle of the horizontal FOV of the first camera 106.

FIG. 8 illustrates a component diagram of an electronic device 102A, according to various aspects of the present disclosure. The electronic device 102A may be a variation of the electronic device 102. In some instances, the electronic device 102A may include processor(s) 138, camera(s) 802, motion sensor(s) 804, a computer vision component 806, a light sensor 808, a Codec (coder-decoder) 810, button(s) 812 (which may represent, and/or include, the input device(s) 118), network interface(s) 140, volatile memory 814, non-volatile memory 816, loudspeaker(s) 818, and/or microphone(s) 820.

The processor(s) 138 (alternatively referred to herein as a "CPU," a "controller," and/or a "microcontroller") may comprise an integrated circuit including a processor core, memory, and programmable input/output peripherals. The processor(s) 138 may receive input signals, such as data, from the camera(s) 802, the motion sensor(s) 804, the light sensor 808, the loudspeaker(s) 818, the microphone(s) 820, and/or the network interface(s) 140 to perform various functions. In various instances, when the processor(s) 138 is triggered by the camera(s) 802, the motion sensor(s) 804, the button(s) 812, the network interface(s) 140, the loudspeaker(s) 818, the microphone(s) 820, and/or other components, the processor(s) 138 may perform one or more processes and/or functions. The processor(s) 138 may also provide data communication between various components such as between the network interface(s) 140 and the camera(s) 802.

As discussed above, the electronic device 102A may include the first camera 106 and the second camera(s) 108. In some instances, the cameras 802 may include separate camera processor(s) or the processor(s) 138 may perform the camera processing functionality. The processor(s) 138 (and/or the camera processor(s)) may process video recorded by the camera(s) 802 and may transform this data into a form suitable for transfer by the network interface(s) 140. In some instances, the cameras 802 may include separate buffers for storing data. In some examples, the camera(s) 802 may be used for iris recognition and/or facial recognition of users within a FOV of the camera(s) 802. In some examples, the camera(s) 802 may also include a retinal scanner for performing retinal scans of users within the FOV.

The electronic device 102A include(s) one or more motion sensors 804. In some instances, the motion sensor(s) 804 may represent, or include to the PIR sensors 502(1)-(3). The motion sensor(s) 804 may be any type of sensor capable of detecting and communicating the presence of an entity within their FOV. As such, the motion sensor(s) 804 may include one or more (alone or in combination) different types of motion sensors. For example, in some embodiments, the motion sensor(s) 804 may comprise PIR sensors, which may be secured on or within a PIR sensor holder that may reside behind a lens (e.g., a Fresnel lens) and/or cover(s) of the electronic device 102A. In such examples, the PIR sensors may detect IR radiation in a FOV, and produce an output signal (e.g., voltage) that changes as the amount of IR radiation in the FOV changes. The amount of voltage in the output signal may be compared, by the processor(s) 138, for example, to one or more threshold voltage values to determine if the amount of voltage in the output signal is indicative of motion, and/or if the amount of voltage in the output signal is indicative of motion of an entity that is to be captured by the camera(s) 802. In some instances, the motion sensor(s) 804 may detect the motion for activating the camera(s) 802 and/or the microphone(s) 820 to begin recording image data and/or audio data, respectively.

Although the discussion herein primarily relates to PIR sensors, depending on the embodiment, the motion sensor(s) 804 may include additional and/or alternate sensor types that produce output signals including alternative data types. For example, and without limitation, the output signal may include an amount of voltage change based on the presence of infrared radiation in a FOV of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 804 of the electronic device 102A.

The electronic device 102A may include the computer vision component (CVC) 806 may be as the motion sensor(s) 804, in addition to, or alternatively from, other motion sensor(s) 804. For example, the CVC 806 may be a low-power CVC that, by operating at low power (e.g., less than 2 mW of end-to-end power), is capable of providing computer vision capabilities and functionality for battery powered devices. The low-power CVC may include a lens, a CMOS image sensor, and a digital processor that may perform embedded processing within the low-power CVC itself, such that the low-power CVC may output post-processed computer vision metadata to the processor(s) 138. As such, the low-power CVC may be considered to be one or more of the motion sensor(s) 804, and the data type output in the output signal may be the post-processed computer vision metadata. The metadata may include information such as the presence of a particular type of entity (e.g., person, animal, vehicle, parcel, etc.), a direction of movement of the entity, a distance of the entity from the electronic device 102A, etc. As a result of including the CVC 806, some aspects of the present embodiments may leverage the CVC 806 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. One aspect of computer vision comprises determining whether or not the image data contains some specific object, feature, or activity. Different varieties of computer vision recognition include, without limitation, object recognition (e.g., pre-specified or learned objects or object classes can be recognized, usually together with their 2D positions in the image or 3D poses), identification (e.g., individual instance of an object is recognized, such as a user's face or fingerprint, identification of handwritten digits, or identification of a specific vehicle), detection (e.g., image data is scanned for a specific condition). Additionally, several specialized tasks based on computer vision recognition exist, such as optical character recognition (OCR) (e.g., identifying characters in images of printed or handwritten text, usually with a view to encoding the text in a format more amenable to editing or indexing (e.g., ASCII), 2D Code Reading (e.g., reading of 2D codes such as data matrix and QR codes), facial recognition, and/or shape recognition technology (SRT) (e.g., differentiating human beings such as head and shoulder patterns from objects).

In some instances, face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

In some instances, the CVC 806 may use one or more object recognition techniques when analyzing image data. The one or more object recognition techniques may include, but are not limited to, appearance-based methods (e.g., edge matching, divide-and-conquer search, greyscale matching, gradient matching, histograms of receptive field responses, large modelbases, etc.), feature-based techniques (e.g., interpolation trees, hypothesize and test, pose consistency, etc.), and/or any other object recognition techniques. Appearance-based techniques may use similar images of objects to perform the object recognition. For example, the CVC 806 may compare image(s) represented by the image data to template images of various objects in order to identify similarities between the object(s) depicted by the image(s) represented by the image data and the objects depicted by the template images. Based on the similarities, the CVC 806 may determine that the image(s) depict one or more objects and/or the type(s) of object(s). Feature-based techniques may perform a search to find feasible matches between object features depicted by the image(s) represented by the image data and image features. Based on the matches, the CVC 806 may determine that the image(s) depict one or more objects and/or the type(s) of object(s)

The button(s) 812 may include any touch surface capable of detecting and receiving touch input(s). For example, the button(s) 812 may include a capacitive touch sensor, a resistive touch sensor, a mechanical switch, sensor pads, track pads, surface acoustic waves (SAW), an IR sensor, an optical imaging sensor, an acoustic pulse recognition sensor, a sensor that implements a low-power CVC for the detection of a person (e.g., a finger, hand, etc.,), or any other type of button/sensor capable of receiving touch input. When embodied as a capacitive touch sensor, the button(s) 812 may include a dielectric layer disposed between electrodes of the capacitive touch sensor such that the dielectric layer senses when force (e.g., touch input) is applied to the button(s) 812. Depending on the implementation, the dielectric layer may include deformable or non-deformable dielectric materials. For example, the capacitive touch sensor may operate by detecting changes in capacitance between the electrodes due to the deforming of the deformable dielectric layer as the distance between the electrodes vary. The electrodes of the two layers may be arranged to intersect in the plane of the capacitive touch sensor (e.g., the layers of electrodes may be situated such that the electrodes of the layers are parallel within the individual layers but not parallel to electrodes in the other layer). The dielectric layer between the layers of electrodes provides a vertical separation to prevent contact between electrodes of the different layers. Accordingly, each application of touch input on the button(s) 812 may create a contact point on the capacitive touch sensor. In some examples, the contact point may be characterized by the location of the contact point on the button(s) 812 (or the touch surface(s) of the button(s) 812) and represented by X and Y coordinates. In some examples, a center of the contact point may define the location of the contact or the contact point may also be characterized by the area of the contact. Moreover, in some examples, the capacitive touch sensor may detect a magnitude of the contact point (i.e., how hard an object is pressing). In some examples, the button(s) 812 may also include a fingerprint scanner/reader for performing fingerprint recognition.

When the button(s) 812 is pressed, touched, and/or otherwise triggered, the processor(s) 138 may receive an output signal that may activate one or more functions of the electronic device (e.g., record image data, record audio, etc.).

The electronic device 102A may include the light ring 822 for backlighting or illuminating a perimeter of the button(s) 812.

The light sensor 808 may include one or more sensors capable of detecting the level of ambient light of the surrounding environment in which the electronic device 102A resides.

The electronic device 102A may further include one or more loudspeaker(s) 818 and/or one or more microphone(s) 820. The loudspeaker(s) 818 may be any electromechanical device capable of producing sound in response to an electrical signal input. The microphone(s) 820 may be an acoustic-to-electric transducer or sensor capable of converting sound waves into an electrical signal. In some instances, the electronic device 102A may include a single microphone 820. In other instances, the electronic device 102A may include two or more microphone(s) 820 spaced from one another (e.g., located on different sides of the electronic device 102A) to provide noise cancelling and/or echo cancelling for clearer audio.

The loudspeaker(s) 818 and/or microphone(s) 820 may be coupled to the Codec 810 to enable digital audio to be decompressed and output by the loudspeaker(s) 818 and/or to enable audio data recorded by the microphone(s) 820 to be compressed into digital audio data. The digital audio data may be received from and transmitted to remote device(s) 824 (e.g., the computing system(s) 124, the client device 134, etc.) using the network interface(s) 140 and/or one or more components of the network. For example, when a user within an area of the electronic device 102A speaks, sound from the user is received by the microphone(s) 820 and compressed by the Codec 810. Digital audio data is then sent through the network interface(s) 140 and delivered to the remote device(s) 824. In some examples, the speech recorded by the microphone(s) 820 may be used for voice recognition and authentication.

In some instances, the electronic device 102A may be battery powered using a battery 826 and/or may be powered using a source of external AC (alternating-current) power, such as mains power. When the battery 826 is depleted of its charge, the battery 826 may be recharged by connecting a power source to the battery 826 (e.g., using a USB connector).

The network interface(s) 140 may comprise an integrated circuit including a processor core, memory, and programmable input/output peripherals. The network interface(s) 140 may be operatively or communicatively connected to the processor(s) 138 to handle communication links between the electronic device 102A and other, external devices, external receivers, external transmitters, and/or external transceivers, and to route incoming/outgoing data appropriately. In some instances, the network interface(s) 140 may include wireless 140(*a*) and wired 140(*b*) adapters. For example, the network interface(s) 140 may include one or more wireless network interfaces, radios, receivers, transmitters, and/or transceivers configured to communicate across one or more wireless networks, such as, without limitation, Wi-Fi, cellular, Bluetooth, Z-Wave, ZigBee, LPWAN(s), and/or satellite networks.

In some instances, inbound data from may be routed through the network interface(s) 140 before being directed to the processor(s) 138, and outbound data from the processor(s) 138 may be routed through the network interface(s) 140. The network interface(s) 140 may therefore receive inputs, such as power and/or data, from the processor(s) 138, the camera(s) 802, the motion sensor(s) 804, the button(s) 812, and/or the non-volatile memory 816. For example, when the button(s) 812 receives touch input, the network interface(s) 140 may perform one or more functions, such as to transmit a signal over the wireless 140(A) connection and/or the wired 140(B) connection to the remote device(s) 824 (e.g., the computing system(s) 124, the client device 134, etc.). As another example, the network interface(s) 140 may be configured to transmit data to and/or receive data from the remote device(s) 824. The network interface(s) 140 may act as a conduit for data communicated between various components and the processor(s) 138.

Discussed above, the electronic device 102A may include the volatile memory 814 and the non-volatile memory 816 (which may represent, and/or include, the memory 142). The volatile memory 814 may comprise, for example, DDR3 SDRAM (double data rate type three synchronous dynamic random-access memory). The non-volatile memory 816 may comprise flash memory configured to store and/or transmit data. For example, in certain embodiments the non-volatile memory 816 may comprise serial peripheral interface (SPI) flash memory. In some embodiments, the non-volatile memory 816 may comprise, for example, NAND or NOR flash memory. Although in FIG. 8, the volatile memory 814 and the non-volatile memory 816 are illustrated being separate from the processor(s) 138, in some instances, the volatile memory 814 and/or the non-volatile memory 816 may be physically incorporated with the processor(s) 138, such as on the same chip (e.g., System on a Chip (SoC)). The volatile memory 814 and/or the non-volatile memory 816, regardless of their physical location, may be shared by one or more other components (in addition to the processor(s) 138) of the electronic device 00.

In some instances, the electronic device 102A may also include lighting element(s) 828 that activate one or more lights. For example, in response to the motion sensor(s) 804 and/or the camera(s) 802 detecting motion, the lighting element(s) 828 may receive an output signal from the processor(s) 138 that causes the lighting element(s) 828 to activate the one or more lights.

Figure 9:
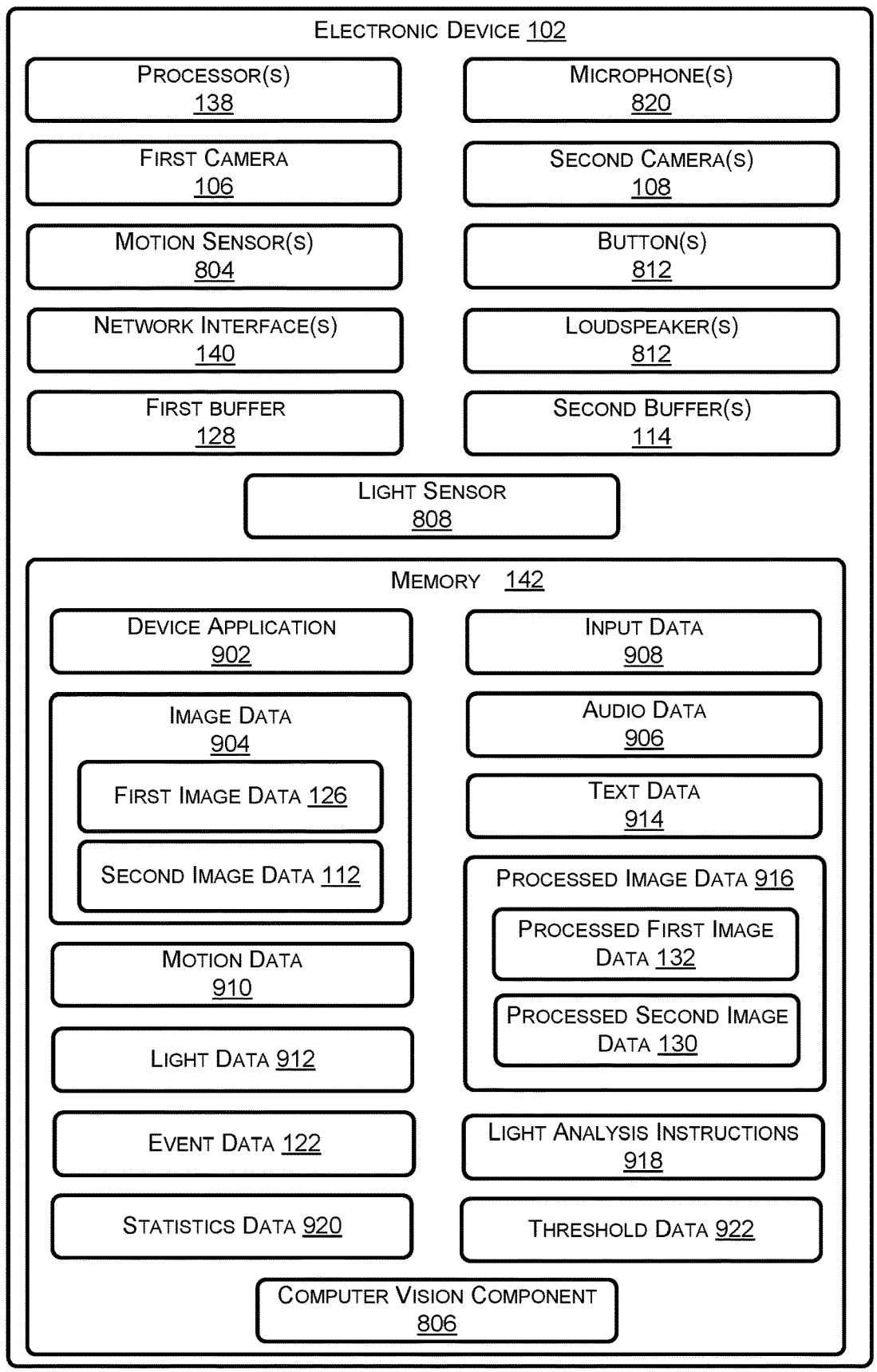
FIG. 9 is a functional block diagram illustrating one example embodiment of an electronic device, according to various aspects of the present disclosure.

FIG. 9 is another functional block diagram illustrating an embodiment of the electronic device 102, according to various aspects of the present disclosure. As shown in FIG. 9, the electronic device 102 includes the memory 142, which may correspond to the volatile memory 814 and/or the non-volatile memory 816. The memory 142 stores a device application 902. In various embodiments, the device application 902 may include instructions that cause the processor(s) 138 to generate image data 904 (e.g., the first image data 126, the second image data 112, etc.) using the first camera 106 and/or the second camera(s) 108, audio data 906 using the microphone(s) 820, input data 908 using the button(s) 812 (and/or the first camera 106, the second camera(s) 108, and/or the motion sensor(s) 804, depending on the embodiment), motion data 910 using the first camera 106, the second camera(s) 108, and/or the motion sensor(s) 804, and light data 912 using the light sensor 808. In some embodiments, the device application 902 may also include instructions that cause the processor(s) 138 to generate text data 914 describing the image data 904, the audio data 906, and/or the input data 908, such as in the form of metadata, for example.

In addition, the device application 902 may include instructions that cause the processor(s) 138, to send, using the network interface(s) 140, the image data 904, the audio data 906, the input data 908, the motion data 910, the light data 912, the text data 914, the event data 122, and/or processed image data 916 (e.g., the first processed image data 132, the second processed image data 130, etc.) to remote device(s), such as the computing system(s) 124 and/or the client device 134.

As further illustrated in the example of FIG. 9, the electronic device 102 may include light analysis instructions 918 that, when executed by the processor(s) 138, cause the processor(s) 138 to analyze the image data 904 and generate statistics data 920. In some instances, the light analysis instructions 918 cause the processor(s) 138 to generate the statistics data 920 by determining intensities of the pixels represented by the image data. The processor(s) 138 then determine one or more groups for placing the pixels in based on the pixel intensities. For example, the statistics data 920 may represent a number of black pixels represented by the image data 904, a number of dark pixels represented by the image data 904, a number of bright pixels represented by the image data 904, a number of saturated pixels represented by the image data 904, and/or one or more other statistics. In some instances, the electronic device 102 may determine that a pixel includes a black pixel when the intensity of the pixel is 0, determine that a pixel is a dark pixel when the intensity of the pixel is between 0 and a first threshold (e.g., 120, 128, 140, etc.), determine that a pixel is a bright pixel when the intensity of the pixel is between the first threshold and a second threshold (e.g., 200, 210, 230, etc.), and determine that a pixel is a saturated pixel when the intensity of the pixel is greater than the second threshold.

The light analysis instructions 918 may further cause the processor(s) 138 to perform the techniques described herein to analyze the light data 912 and/or the statistics data 918 in order to determine if an amount of light satisfies (e.g., is equal to or greater than) a light threshold, which is represented by the threshold data 922. In some instances, based on determining that the amount of light satisfies the light threshold, the electronic device 102 may cause the second camera(s) 108 to activate and/or generate the image data 904. In some instances, based on determining that the amount of light does not satisfy the light threshold, the electronic device 102 may cause the second camera(s) 108 to deactivate and/or cease generating the image data 904. As described herein, the light analysis instructions 918 may cause the processor(s) 138 to analyze the light data 912 and/or the statistics data 920 every minute, five minutes, ten minutes, and/or at any other time interval.

Figure 10:
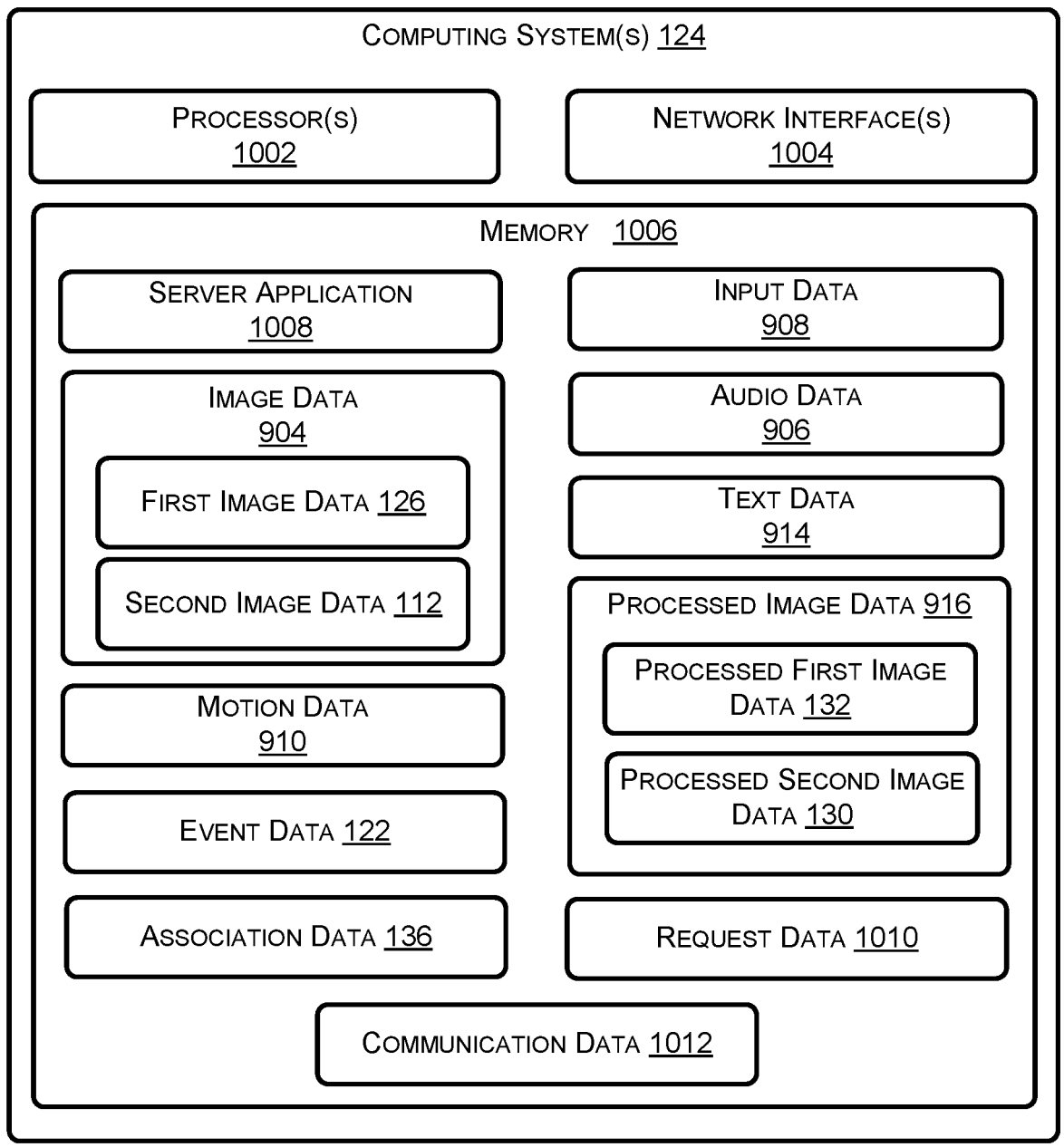
FIG. 10 is a functional block diagram illustrating one example embodiment of a computing system, according to various aspects of the present disclosure.

FIG. 10 is a functional block diagram illustrating one embodiment of the computing system(s) 124, according to various aspects of the present disclosure. The computing system(s) 124 may comprise processor(s) 1002, network interface(s) 1004, and memory 1006. The network interface(s) 1004 may allow the computing system(s) 124 to access and communicate with other network devices, such as the electronic device 102, the client device 134, and/or any other device.

The memory 1006 may include a server application 1008. The server application 1008 may include instructions that cause the processor(s) 1002 to receive, using the network interface(s) 1004, the audio data 906, the text data 914, the input data 908, the image data 904, the motion data 910, the processed image data 916, and/or the event data 122 from the electronic device 102 (which may be via one or more other network connected devices). The server application 1008 may also include instructions that cause the processor(s) 1002 to send, using the network interface(s) 1004, the audio data 906, the text data 914, the input data 908, the image data 904, the motion data 910, the processed image data 916, and/or the event data 122 to the client device 134.

As described herein, at least some of the processes described above as being performed by the electronic device 102 may instead be executed by the computing system(s) 124, or by a combination thereof. For example, if the computing system(s) 124 receives the image data 904 from the electronic device 102, the computing system(s) 124 may processes the image data 904 using one or more of the image and/or video processing techniques described herein to generate the processed image data 916. In other words, in some examples, the electronic device 102 may not process the image data 904 before sending the image data 904 to the computing system(s) 124. Rather, the computing system(s) 124 may process the image data 904 after receiving the image data 904 from the electronic device 102.

The computing system(s) 124 may further receive, using the network interface(s) 1004, request data 1010 from the client device 134. The request data 1010 may include a request for the image data 904 (e.g., the first image data 126, the second image data 112, etc.), the processed image data 916 (e.g., the processed first image data 132, the processed second image data 130, etc.), and/or other data associated with an event. In some instances, the request data 1010 may indicate the event for which the data is being requested. For a first example, the request data 1010 may represent a request for data associated a motion event that occurred at a specific time. For a second example, the request data 1010 may represent a request for data associated with an input event that occurred at a specific time.

As further illustrated in FIG. 10, the computing system(s) 124 may generate communication data 1012. The communication data 1012 may represent messages, notifications, alerts, requests, and/or any other type of communication that the computing system(s) 124 may send to other devices, such as the client device 134. For example, when receiving the event data 122 indicating that the electronic device 102 detected an event, the computing system(s) 124 may generate communication data 1012 representing a communication associated with the event. For instance, the communication may include a notification indicating that the event was detected by the electronic device 102, the type of event detected by the electronic device 102, the time that the event was detected by the electronic device 102, and/or any other information associated with the event. The computing system(s) 124 may then send the communication data 1012 to the client device 134.

Figure 11:
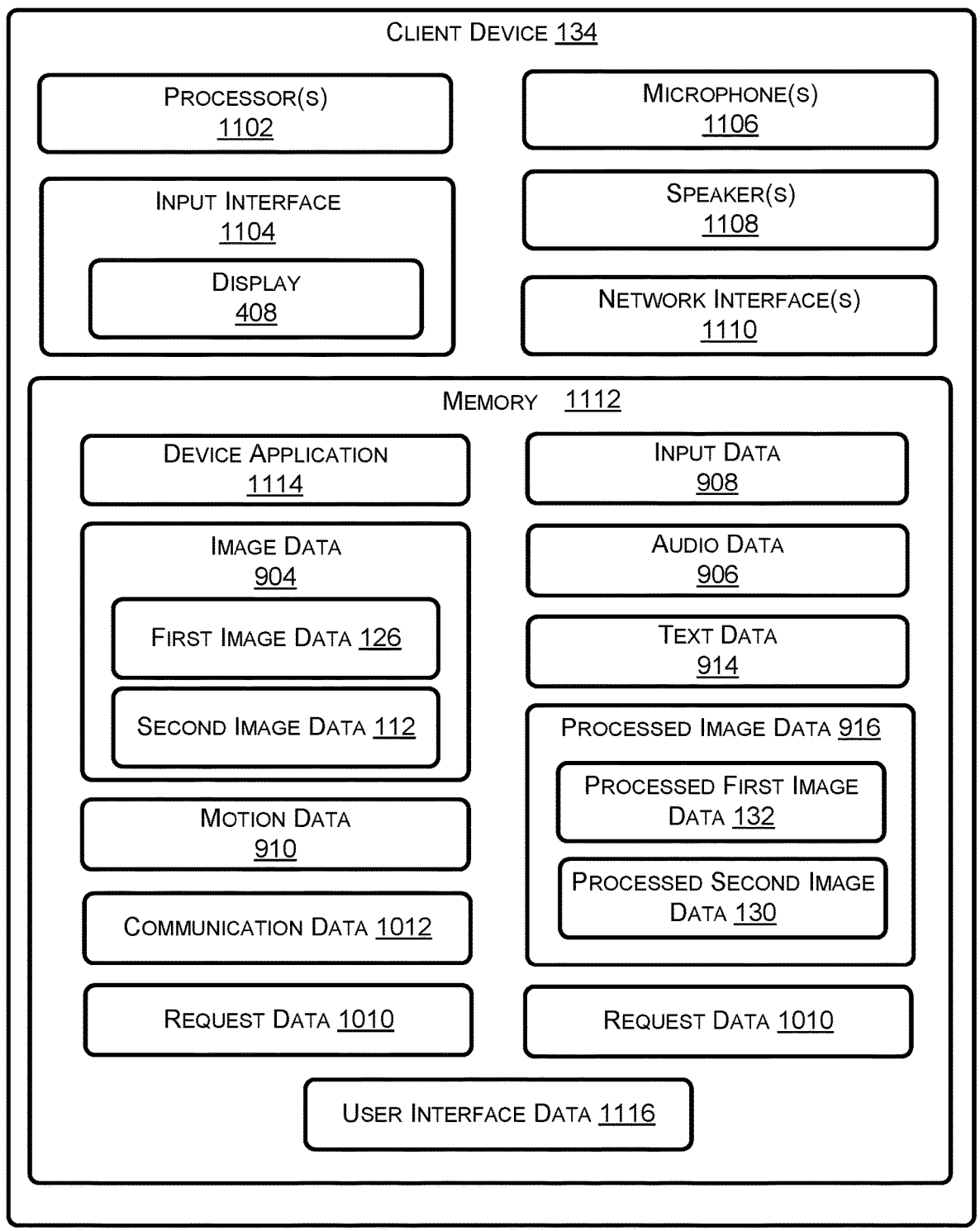
FIG. 11 is a functional block diagram illustrating one example embodiment of a client device, according to various aspects of the present disclosure.

Now referring to FIG. 11, FIG. 11 is a functional block diagram illustrating one embodiment of the client device 134, according to various aspects of the present disclosure. The client device 134 may comprise processor(s) 1102 that are operatively connected to an input interface 1104, microphone(s) 1106, speaker(s) 1108, network interface(s) 1110, and memory 1112. The client device 134 may further comprise a camera (not shown) operatively connected to the processor(s) 1102.

The memory 1112 may store a device application 1114. In various embodiments, the device application 1114 may include instructions that cause the processor(s) 1102 to receive input(s) to the input interface 1104 (e.g., input(s) to request data associated with events). In addition, the device application 1114 may include instructions that cause the processor(s) 1102 to receive, using the network interface(s) 1110, the input data 908, the image data 904, the audio data 906, the text data 914, the processed image data 916, and/or the communication data 1012 from one or more of the electronic device 102, the computing system(s) 124, and/or any other device.

With further reference to FIG. 11, the input interface 1104 may include the display 408. The display 408 may include a touchscreen, such that the user of the client device 134 may provide inputs directly to the display 408 (e.g., input(s) to request data associated with an event). In some embodiments, the client device 134 may not include a touchscreen. In such embodiments, and in embodiments where the client device 134 includes the touchscreen, the user may provide an input using any input device, such as, without limitation, a mouse, a trackball, a touchpad, a joystick, a pointing stick, a stylus, etc.

In some of the present embodiments, in response to receiving communication data 1012, the device application 1114 may include instructions that cause the processor(s) 1102 to display, using the display 408, the communication represented by the communication data 1012. The communication may indicate that the event was detected by the electronic device 102, the type of event detected by the electronic device 102, the time that the event was detected by the electronic device 102, and/or any other information associated with the event. While displaying the communication, the input interface 1104 may receive input from the user, such as an input associated with accessing the electronic device 102 and/or receiving data associated with the event. In response, the device application 1114 may include instructions that cause the processor(s) 1102 to send, using the network interface(s) 1110, request data 1010 to the computing system 124, where the request data 1010 includes the request for the data associated with the event.

As further illustrated in FIG. 11, the client device 134 may store user interface data 1116 representing one or more user interfaces that the client device 134 uses to provide the data associated with the events. For example, the user interface data 1116 may represent the user interface 402, the user interface 414, the user interface 426, and/or any other user interface.

FIGS. 12A-15 illustrate processes for detecting events, and recording and transmitting images of the events, according to various aspects of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 12A:
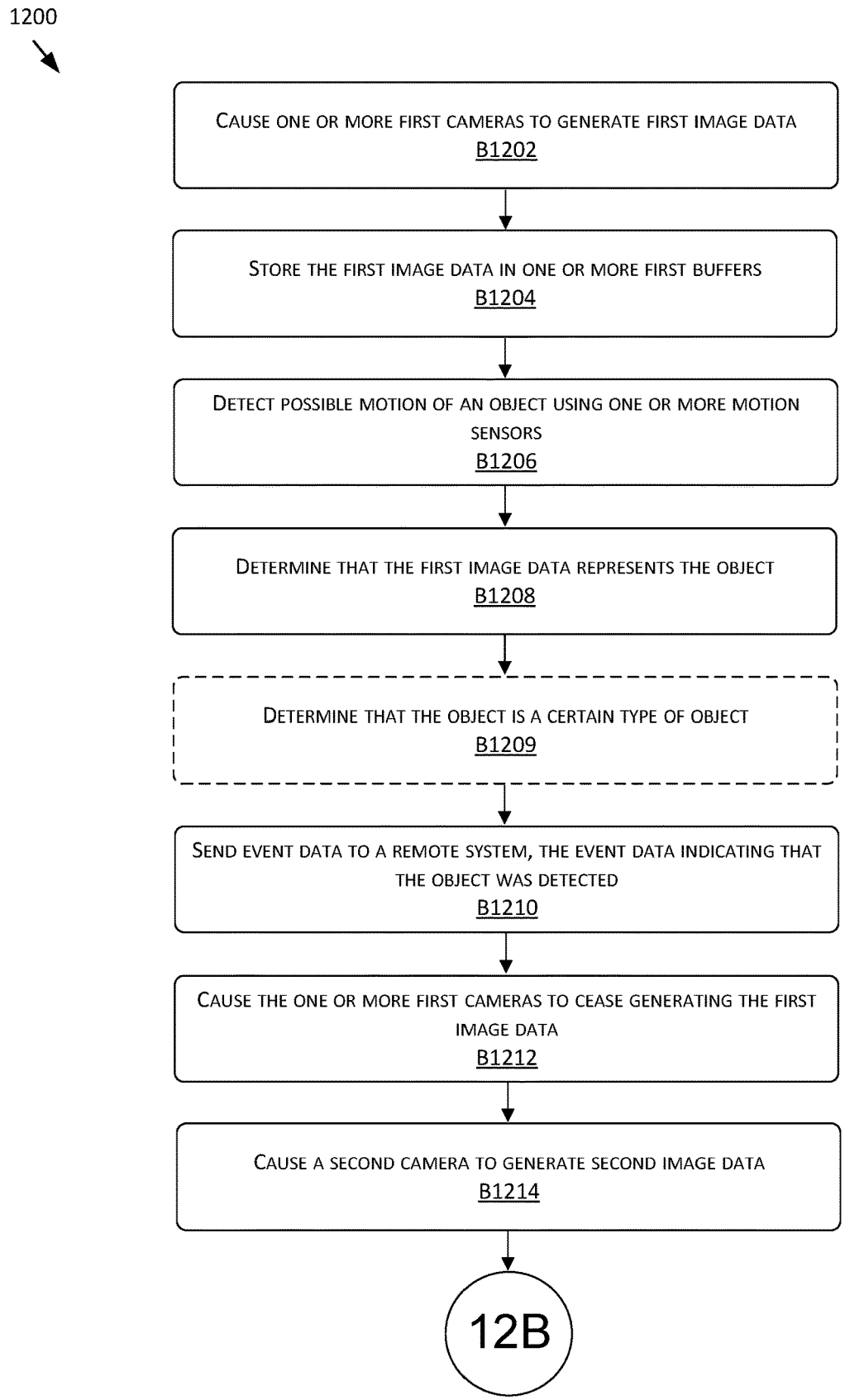
FIGS. 12A-12B are a flowchart illustrating an example process for using multiple cameras to generate image data associated with an event, according to various aspects of the present disclosure.
Figure 12B:
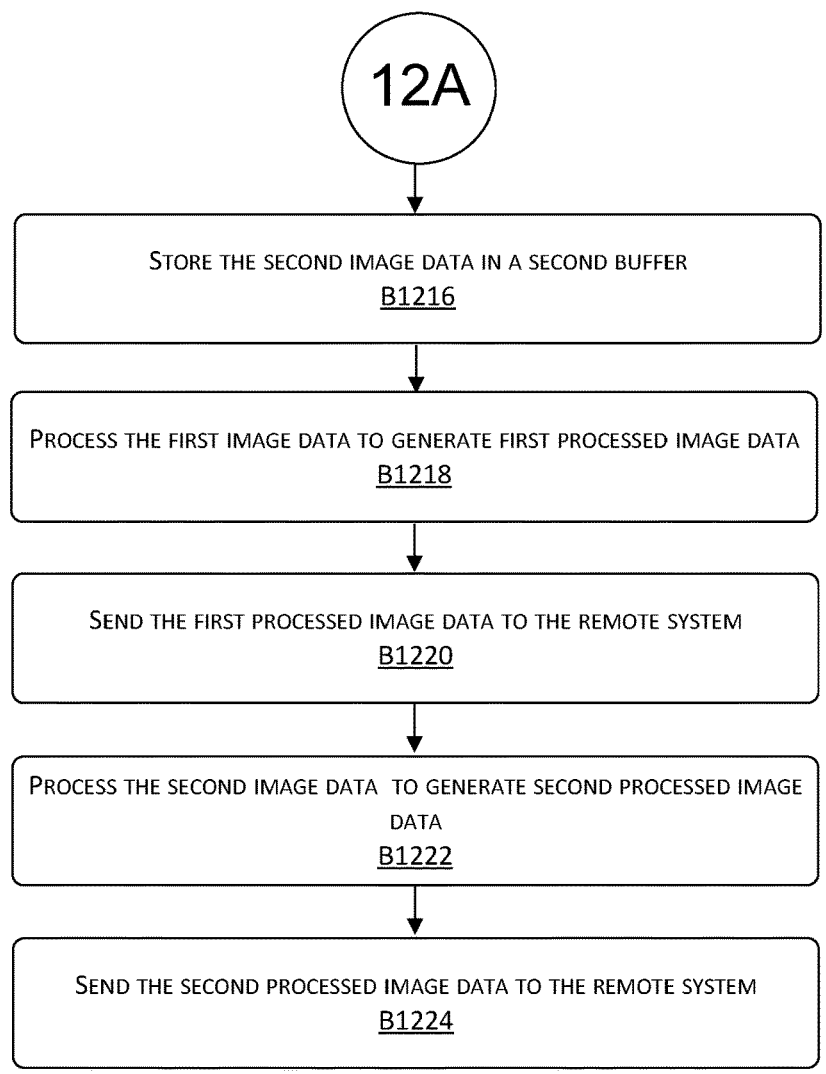

FIGS. 12A-12B are a flowchart illustrating an example process 1200 for using multiple cameras to generate image data associated with an event, according to various aspects of the present disclosure. At block B1202, the process 1200 may include causing one or more first cameras to generate first image data and, at block B1204, the process 1200 may include storing the first image data in one or more first buffers. For instance, the electronic device 102 may activate the second camera(s) 108 (which correspond to the one or more first cameras in the example process 1200) in order to generate the second image data 112 (which corresponds to the first image data in the example process 1200). In some instances, the electronic device 102 activates the second camera(s) 108 based at least in part on an amount of light satisfying a light threshold. The second camera(s) 108 may then store the second image data 112 in the second buffer(s) 114 (which may correspond to the one or more first buffers in the example process 1200).

At block B1206, the process 1200 may include detecting possible motion of an object using one or more motion sensors. For instance, the electronic device 102 may use the motion sensor(s) 804 to detect the possible motion of the object, such as the object 116. In some instances, the motion sensor(s) 804 may include PIR sensors. In some instances, the electronic device 102 may include three motion sensors 804, however, in other instances, the electronic device 102 may include any number of motion sensors 804. At block B1208, the process 1200 may include determining that the first image data represents the object. For instance, based on detecting the possible motion, the electronic device 102 may analyze the second image data 112 in order to determine that the second image data 112 represents image(s) of the object. In some instances, the electronic device 102 analyzes the second image data 112 using one or more of the object recognition techniques described herein in order to determine that the second image data 112 represents the image(s) of the object. In other words, the electronic device 102 may determine that the possible motion detected by the motion sensor(s) 804 includes actual motion of an object and/or of a certain type of object.

At block B1209, the process 1200 may include determining that the object is a certain type of object. For instance, after the electronic device 102 determines that the second image data 112 represents the image(s) of the object, the electronic device 102 may further analyze the second image data 112 to determine that the image(s) represent the certain type of object, such as a person. In some instances, the electronic device 102 analyzes the second image data using one or more of the object recognition techniques described herein in order to determine that the second image data 112 represents the image(s) of the certain type of object. However, in some embodiments, the electronic device 102 may not perform block B1209.

At block B1210, the process 1200 may include sending event data to a computing system, the event data indicating that the object was detected. For instance, based on determining that the second image data 112 represents the object, the electronic device 102 may generate the event data 122. The event data 122 may indicate that the electronic device 102 detected the object, a time that the electronic device 102 detected the object, and/or other information associated with the event. The electronic device 102 may then send the event data 122 to the computing system(s) 124.

At block B1212, the process 1200 may include causing the one or more first cameras to cease generating the first image data. For instance, based on determining that the second image data 112 represents the object, the electronic device 102 may cause the second camera(s) 108 to cease generating the second image data 112. In some instances, the electronic device 102 causes the second camera(s) 108 to cease generating the second image data 112 so that the second camera(s) 108 do not overwrite the second image data 112 that is already stored in the second buffer(s) 114, which represents images of the area proximate to the electronic device 102 prior to the detection of the event.

At block B1214, the process 1200 may include causing a second camera to generate second image data and, at block B1216, the process 1200 may include storing the second image data in a second buffer. For instance, the electronic device 102 may activate the first camera 106 (which corresponds to the second camera in the example process 1200) in order to generate the first image data 126 (which corresponds to the second image data in the example process 1200). In some instances, the electronic device 102 activates the first camera 106 based at least in part on detecting possible motion of an object (block B1206) and/or determining that the first image data represents images of the object (block B1208) and/or determining that the object is a certain type of object (block B1209). The first camera 106 may then store the first image data 126 in the first buffer 128 (which may correspond to the second buffer in the example process 1200).

At block B1218, the process 1200 may include processing the first image data to generate first processed image data. For instance, the electronic device 102 may process, using one or more image and/or video processors, and one or more image and/or video processing techniques as described herein, the second image data 112 stored in the second buffer(s) 114. Based on the processing, the electronic device 102 may generate the processed second image data 130 (which corresponds to the first processed image data in the example process 1200). In some instances, the first camera 106 continues generating and then storing the first image data 126 in the first buffer 128 while the electronic device 102 processes the second image data 112.

At block B1220, the process 1200 may include sending the first processed image data to the computing system. For instance, as the electronic device 102 is processing the second image data 112, the electronic device 102 may begin sending the processed second image data 130 to the computing system(s) 124. After finishing the processing of the second image data 112, the electronic device 102 may send the last of the processed second image data 130 to the computing system(s) 124.

At block B1222, the process 1200 may include processing the second image data to generate second processed image data. For instance, the electronic device 102 may process, using one or more image and/or video processors, and one or more image and/or video processing techniques, the first image data 126. Based on the processing, the electronic device 102 may generate the processed first image data 132 (which corresponds to the second processed image data in the example process 1200). In some instances, the electronic device 102 initially processes the first image data 126 stored in the first buffer 128. After processing all the first image data 126 stored in the first buffer 128, the electronic device 102 processes the first image data 126 that is currently being generated by the first camera 106 until the first camera 106 ceases generating the first image data 126.

At block B1224, the process 1200 may include sending the second processed image data to the computing system. For instance, as the electronic device 102 is processing the first image data 126, the electronic device 102 may begin sending the processed first image data 132 to the computing system(s) 124. After finishing the processing of the first image data 126, the electronic device 102 may send the last of the processed first image data 132 to the computing system(s) 124.

Figure 13:
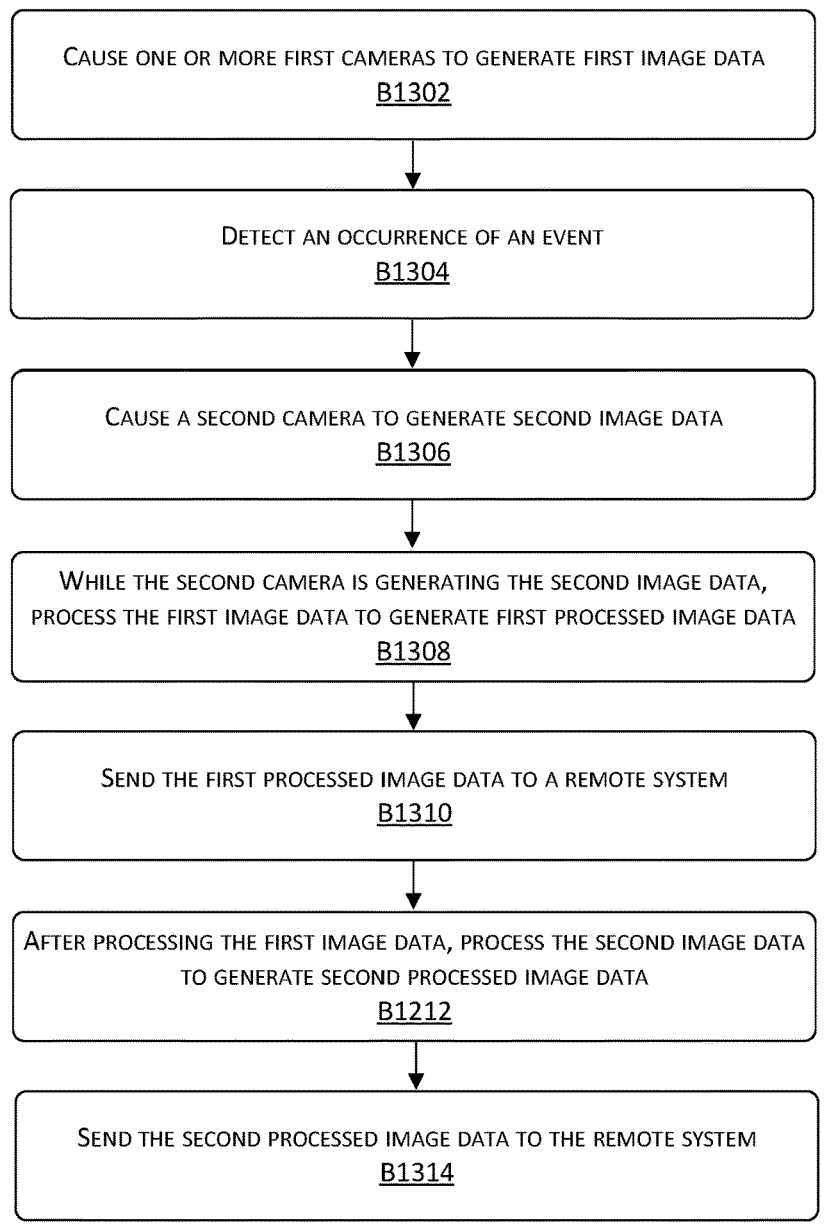
FIG. 13 is a flowchart illustrating an example process for generating and then sending data associated with an event, according to various aspects of the present disclosure.

FIG. 13 is a flowchart illustrating an example process 1300 for generating and then sending data associated with an event, according to various aspects of the present disclosure. At block B1302, the process 1300 may include causing one or more first cameras to generate first image data. For instance, the electronic device 102 may activate the second camera(s) 108 (which correspond to the one or more first cameras in the example process 1300) in order to generate the second image data 112 (which corresponds to the first image data in the example process 1300). The second camera(s) 108 may then store the second image data 112 in the second buffer(s) 114.

At block B1304, the process 1300 may include detecting an event. For instance, the electronic device 102 may detect the event. In some instances, the electronic device 102 detects the event by detecting, using the motion sensor(s) 804 and/or the second camera(s) 108, an object (and/or a certain type of object) located within a FOV of the motion sensor(s) 804 and/or within a FOV of the second camera(s) 108. In some instances, the electronic device 102 detects the event by receiving an input using the button(s) 812. Still, in some instances, the electronic device 102 detects the event by receiving request data 1010 representing a request for image data generated by the electronic device 102.

At block B1306, the process 1300 may include causing a second camera to generate second image data. For instance, based on detecting the event, the electronic device 102 may activate the first camera 106 (which corresponds to the second camera in the example process 1300) in order to generate the first image data 126 (which corresponds to the second image data in the example process 1300). The first camera 106 may then store the first image data 126 in the first buffer 128.

At block B1308, the process 1300 may include, while the second camera is generating the second image data, processing the first image data in order to generate first processed image data. For instance, the electronic device 102 may process, using one or more image and/or video processing techniques, the second image data 112 stored in the second buffer(s) 114. Based on the processing, the electronic device 102 may generate the processed second image data 130 (which corresponds to the first processed image data in the example process 1300). In some instances, the first camera 106 continues generating and then storing the first image data 126 in the first buffer 128 while the electronic device 102 processes the second image data 112.

At block B1310, the process 1400 may include sending the first processed image data to a computing system. For instance, as the electronic device 102 is processing the second image data 112, the electronic device 102 may begin sending the processed second image data 130 to the computing system(s) 124. After finishing the processing of the second image data 112, the electronic device 102 may send the last of the processed second image data 130 to the computing system(s) 124.

At block B1312, the process 1300 may include, after processing the first image data, processing the second image data in order to generate second processed image data. For instance, the electronic device 102 may process, using one or more image and/or video processors, and one or more image and/or video processing techniques, the first image data 126. Based on the processing, the electronic device 102 may generate the processed first image data 132 (which corresponds to the second processed image data in the example process 1300). In some instances, the electronic device 102 initially processes the first image data 126 stored in the first buffer 128. After processing all the first image data 126 stored in the first buffer 128, the electronic device 102 processes the first image data 126 that is currently being generated by the first camera 106 until the first camera 106 ceases generating the first image data 126.

At block B1314, the process 1300 may include sending the second processed image data to the computing system. For instance, as the electronic device 102 is processing the first image data 126, the electronic device 102 may begin sending the processed first image data 132 to the computing system(s) 124. After finishing the processing of the first image data 126, the electronic device 102 may send the last of the processed first image data 132 to the computing system(s) 124.

Figure 14:
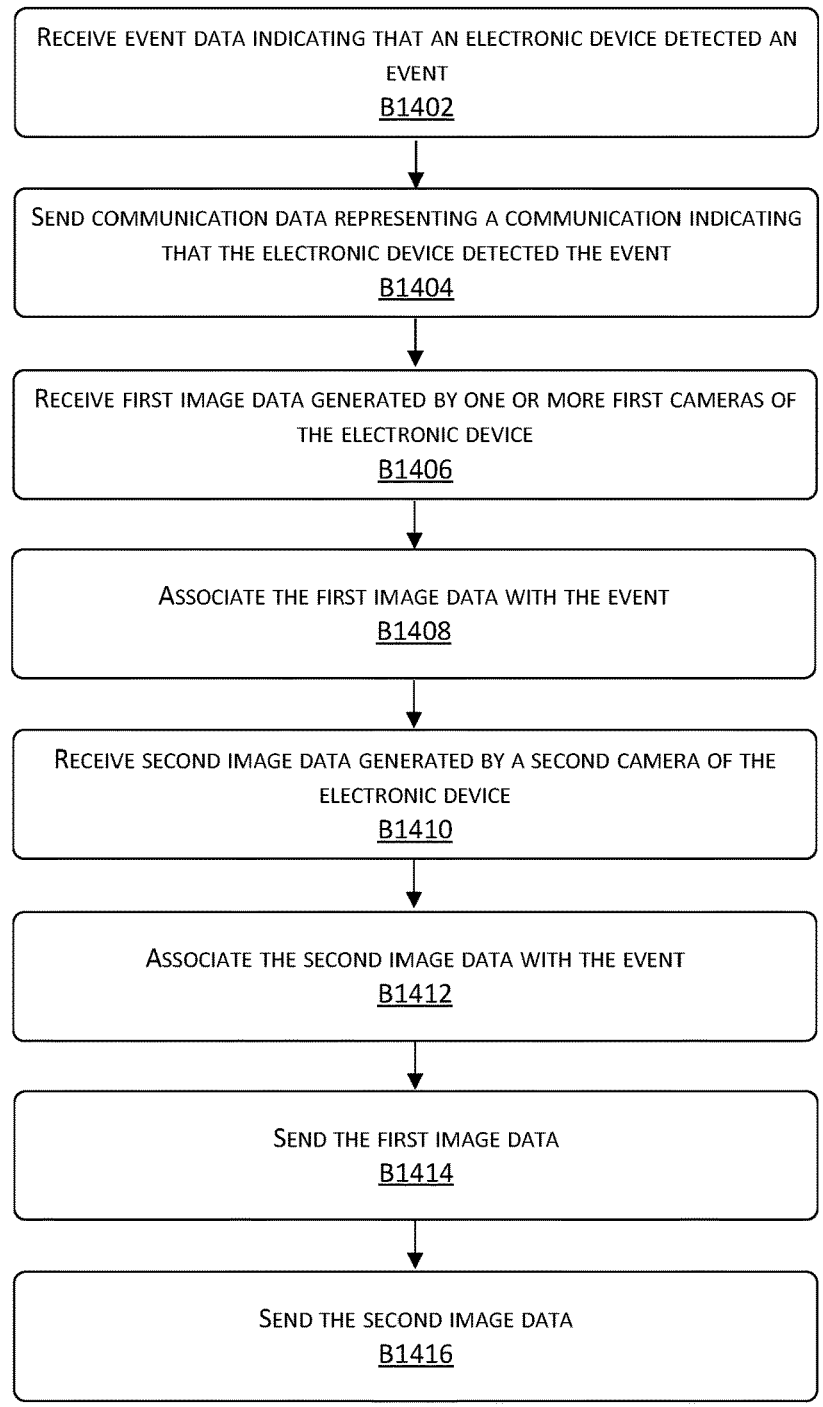
FIG. 14 is a flowchart illustrating an example process for providing data associated with an event to a client device, according to various aspects of the present disclosure.

FIG. 14 is a flowchart illustrating an example process 1400 for providing data associated with an event to a client device, according to various aspects of the present disclosure. At block B1402, the process 1400 may include receiving event data indicating that an electronic device detected an event and, at block B1404, the process 1400 may include sending communication data representing a communication indicating that the electronic device detected the event. For instance, the computing system(s) 124 may receive the event data 122 from the electronic device 102. The event data 122 may indicate that the electronic device 102 detected motion of an object, detected motion of a certain type of object, received an input, and/or the like. The computing system(s) 124 may then send the communication data 1012 to the client device 134.

At block B1406, the process 1400 may include receiving first image data generated by one or more first cameras of the electronic device and, at block B1408, the process 1400 may include associating the first image data with the event. For instance, the computing system(s) 124 may receive the second image data 112 (which corresponds to the first image data in the example process 1400) generated by the second camera(s) 108 (which correspond to the one or more first cameras in the example process 1400). In some instances, the computing system(s) 124 may receive the processed second image data 130. The computing system(s) 124 may then generate association data 136 that associates the second image data 112 (and/or the processed second image data 130) with the event.

At block B1410, the process 1400 may include receiving second image data generated by a second camera of the electronic device and, at block B1412, the process 1400 may include associating the second image data with the event. For instance, the computing system(s) 124 may receive the first image data 126 (which corresponds to the second image data in the example process 1400) generated by the first camera 106 (which correspond to the second camera in the example process 1400). In some instances, the computing system(s) 124 may receive the processed first image data 132. The computing system(s) 124 may then generate association data 136 that associates the first image data 126 (and/or the processed first image data 132) with the event.

At block B1414, the process 1400 may include sending the first image data and, at block B1416, the process 1400 may include sending the second image data. For instance, the computing system(s) 124 may send, to the client device 134, the second image data 112 (and/or the processed second image data 130) and the first image data 126 (and/or the processed first image data 132). In some instances, the computing system(s) 124 sends the second image data 112 (and/or the processed second image data 130) and the first image data 126 (and/or the processed first image data 132) based on receiving, from the client device 134, request data 1010 representing a request for data associated with the event. In some instances, the computing system(s) 124 may initially send the first image data 126 (and/or the processed first image data 132). In such instances, the computing system(s) 124 may then send the second image data 112 (and/or the processed second image data 130) after receiving, from the client device 134, request data 1010 representing a request for the second image data 112.

Figure 15:
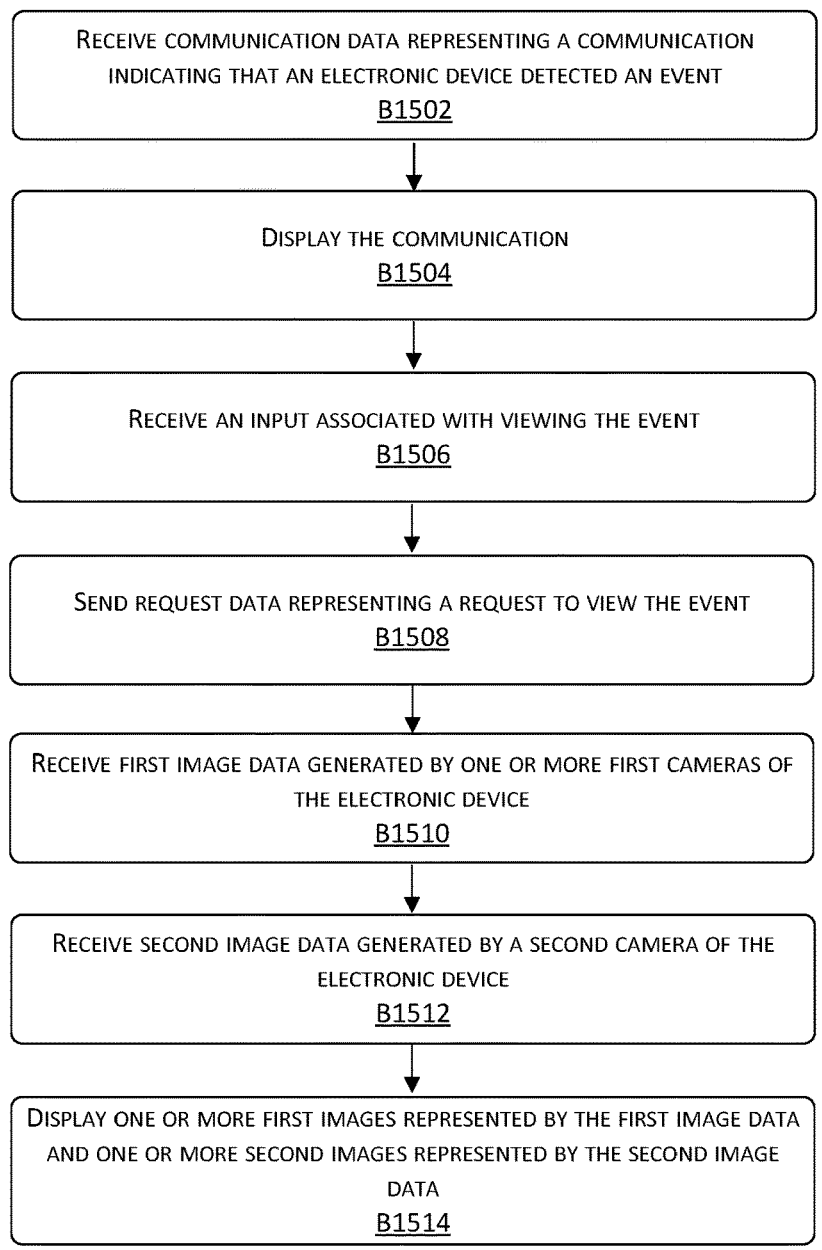
FIG. 15 is a flowchart illustrating an example process for displaying information associated with an event, according to various aspects of the present disclosure.

FIG. 15 is a flowchart illustrating an example process 1500 for providing information associated with an event, according to various aspects of the present disclosure. At block B1502, the process 1500 may include receiving communication data representing a communication indicating that an electronic device detected an event and, at block B1504, the process 1500 may include displaying the communication. For instance, the client device 134 may receive the communication data 1012 from the computing system(s) 124, where the communication data 1012 represents the communication indicating that the electronic device 102 detected the event. The client device 134 may then display the communication using the display 408.

At block B1506, the process 1500 may include receiving an input associated with viewing the event and, at block B1508, the process 1500 may include sending request data representing a request to view the event. For instance, while displaying the communication, the client device 134 may receive, using the input interface 1104, the input associated with viewing the event. Based on the input, the client device 134 may send, to the computing system(s) 124, the request data 1010 representing the request to view the event. In some instances, based on the input, the client device 134 may also cause an application associated with the electronic device 102 to open.

At block B1510, the process 1500 may include receiving first image data generated by one or more first cameras of the electronic device and, at block B1512, the process 1500 may include receiving second image data generated by a second camera of the electronic device. For instance, the client device 134 may receive, from the computing system(s) 124, the second image data 112 (and/or the processed second image data 130) (which corresponds to the first image data in the example process 1500) and the first image data 126 (and/or the processed first image data 132) (which corresponds to the second image data in the example process 1500). The second image data 112 may represent second image(s) depicting the area around the electronic device 102 prior to and/or during detection of the event, and the first image data 126 may represent first image(s) depicting the area around the electronic device 102 after detection of the event.

At block B1514, the process 1500 may include displaying one or more first images represented by the first image data and one or more second images represented by the second image data. For instance, the client device 134 may display the first image(s) and/or the second image(s) using one or more techniques. For a first example, the client device 134 may display the first image(s) using a first portion of the display 408 and the second image(s) using a second portion of the display 408. The second portion of the display 408 may be included within the first portion of the display 408. For a second example, the client device 134 may display the second image(s) using a middle portion of the display 408, display a top portion of the first image(s) using a top portion of the display 408, and display a bottom portion of the first image(s) using a bottom portion of the display 408. Still, for a third example, the client device 134 may display the second image(s) followed by displaying the first image(s).

Figure 16:
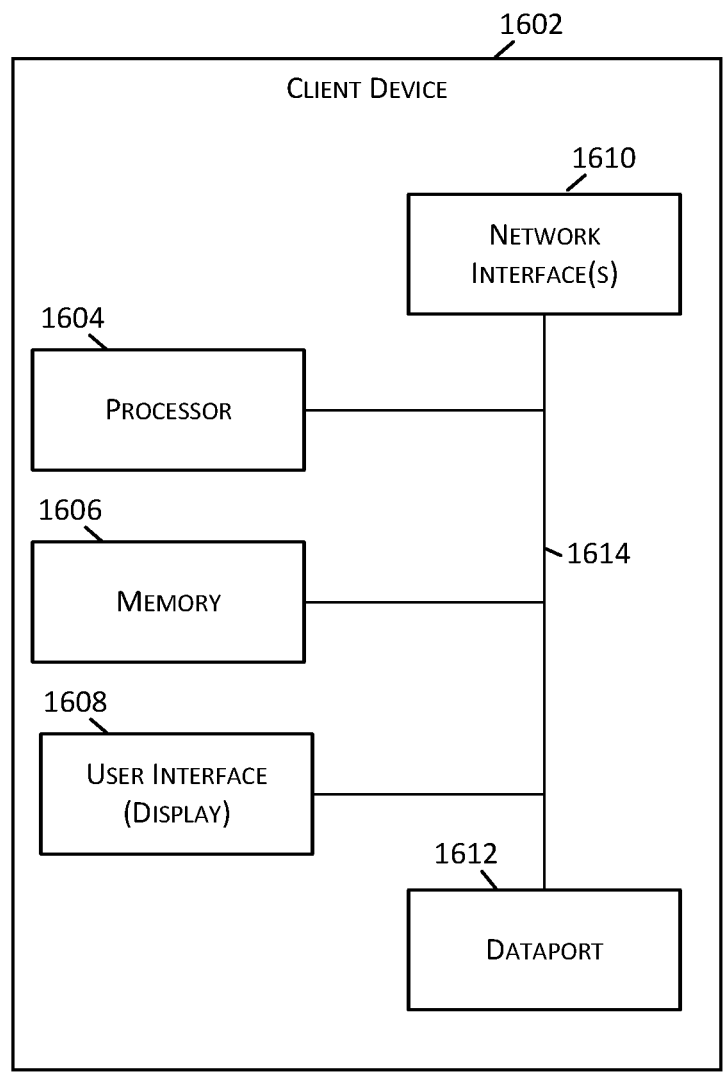
FIG. 16 is a functional block diagram of a client device on which the present embodiments may be implemented, according to various aspects of the present disclosure.

FIG. 16 is a functional block diagram of an electronic device 1602 on which the present embodiments may be implemented according to various aspects of the present disclosure. The client device 134 may include some or all of the components and/or functionality of the electronic device 1602. The electronic device 1602 may comprise, for example, a smartphone.

With reference to FIG. 16, the electronic device 1602 includes a processor 1604, a memory 1606, a user interface 1608, network interface(s) 1610, and a dataport 1612. These components are communicatively coupled together by an interconnect bus 1614. The processor 1604 may include any processor used in smartphones and/or portable computing devices, such as an ARM processor (a processor based at least in part on the RISC (reduced instruction set computer) architecture developed by Advanced RISC Machines (ARM).). In some embodiments, the processor 1604 may include one or more other processors, such as one or more conventional microprocessors, and/or one or more supplementary co-processors, such as math co-processors.

The memory 1606 may include both operating memory, such as random-access memory (RAM), as well as data storage, such as read-only memory (ROM), hard drives, flash memory, or any other suitable memory/storage element. The memory 1606 may include removable memory elements, such as a CompactFlash card, a MultiMediaCard (MMC), and/or a Secure Digital (SD) card. In some embodiments, the memory 1606 may comprise a combination of magnetic, optical, and/or semiconductor memory, and may include, for example, RAM, ROM, flash drive, and/or a hard disk or drive. The processor 1604 and the memory 1606 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1604 may be connected to the memory 1606 via the dataport 1612.

The user interface 1608 may include any user interface or presentation elements suitable for a smartphone and/or a portable computing device, such as a keypad, a display screen, a touchscreen, a microphone, and a speaker. The network interface(s) 1610 are configured to handle communication links between the electronic device 1602 and other, external devices or receivers, and to route incoming/outgoing data appropriately. For example, inbound data from the dataport 1612 may be routed through the network interface(s) 1610 before being directed to the processor 1604, and outbound data from the processor 1604 may be routed through the network interface(s) 1610 before being directed to the dataport 1612. The network interface(s) 1610 may include one or more transceiver components capable of sending and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1612 may be any type of connector used for physically interfacing with a smartphone and/or a portable computing device, such as a mini-USB port or an IPHONE®/IPOD® 30-pin connector or LIGHTNING® connector. In other embodiments, the dataport 1612 may include multiple communication channels for simultaneous communication with, for example, other processors, servers, and/or client terminals.

The memory 1606 may store instructions for communicating with other systems, such as a computer. The memory 1606 may store, for example, a program (e.g., computer program code) adapted to direct the processor 1604 in accordance with the present embodiments. The instructions also may include program elements, such as an operating system. While execution of sequences of instructions in the program causes the processor 1604 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 17:
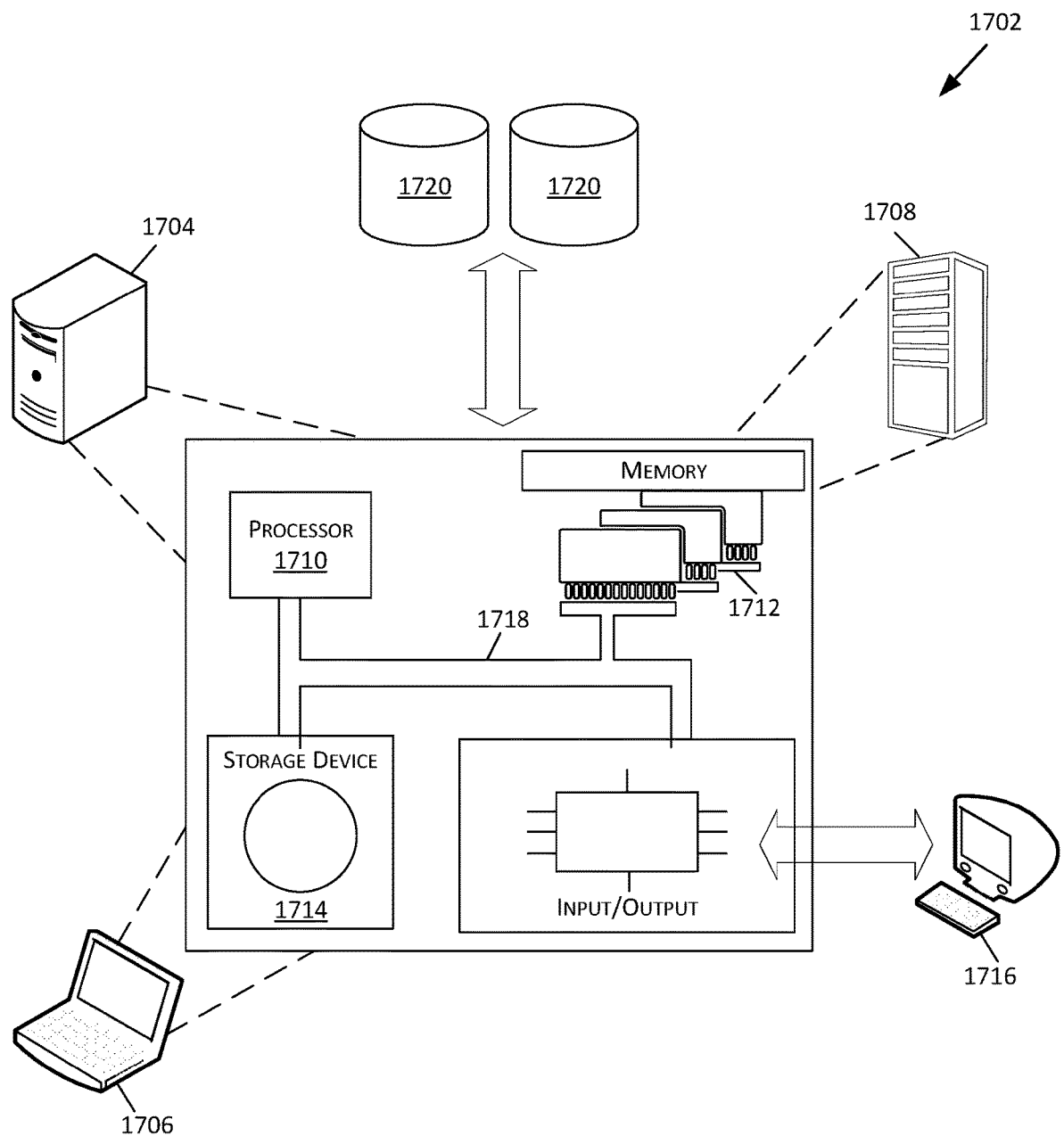
FIG. 17 is a functional block diagram of a general-purpose computing system on which the present embodiments may be implemented, according to various aspects of present disclosure.

FIG. 17 is a functional block diagram of a general-purpose computing system on which the present embodiments may be implemented according to various aspects of the present disclosure. The computer system 1702 may be embodied in at least one of a personal computer (also referred to as a desktop computer) 1704, a portable computer (also referred to as a laptop or notebook computer) 1706, and/or a server 1708 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1702 may execute at least some of the operations described above. The computer system 1702 may include at least one processor 1710, memory 1712, at least one storage device 1714, and input/output (I/O) devices 1716. Some or all of the components 1710, 17 12, 1714, 1716 may be interconnected via a system bus 1718. The processor 1710 may be single- or multi-threaded and may have one or more cores. The processor 1710 execute instructions, such as those stored in the memory 1712 and/or in the storage device 1714. Information may be received and output using one or more I/O devices 1716.

The memory 1712 may store information, and may be a computer-readable medium, such as volatile or non-volatile memory. The storage device(s) 1714 may provide storage for the system 1702 and, in some embodiments, may be a computer-readable medium. In various aspects, the storage device(s) 1714 may be a flash memory device, a hard disk device, an optical disk device, a tape device, or any other type of storage device.

The I/O devices 1716 may provide input/output operations for the system 1702.

The I/O devices 1716 may include a keyboard, a pointing device, and/or a microphone. The I/O devices 1716 may further include a display unit for displaying graphical user interfaces, a speaker, and/or a printer. External data may be stored in one or more accessible external databases 1720.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a component, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

Example Clauses

In a first aspect, a video doorbell comprises: one or more network interfaces; one or more passive infrared (PIR) sensors; a first camera having a first resolution; one or more second cameras having a second resolution, the second resolution being less than the first resolution; a first buffer associated with the first camera; one or more second buffers associated with the one or more second cameras; one or more processors; and one or more computer-readable media storing computer-executable instructions that, when executed by the one or more processors, cause the one or more processors to perform operations comprising: causing the one or more second cameras to generate first image data; storing the first image data in the one or more first buffers; detecting possible motion of an object using the one or more PIR sensors; after detecting the possible motion of the object, analyzing the first image data to determine that the first image data represents the object; sending, using the one or more network interfaces, event data to a computing system, the event data indicating that the object was detected; causing the one or more second cameras to cease generating the first image data; causing the first camera to generate second image data; storing the second image data in the second buffer; while storing the second image data in the second buffer, processing the first image data stored in one or more first buffers to generate first processed image data; sending, using the one or more network interfaces, the first processed image data to the computing system; after processing the first image data, processing the second image data stored in the second buffer to generate second processed image data; and sending, using the one or more network interfaces, the second processed image data to the computing system.

In an embodiment of the first aspect, wherein: the one or more second cameras include at least a third camera having a first field of view (FOV), a fourth camera having a second FOV, and a fifth camera having a third FOV; the first image data includes at least third image data generated by the third camera, fourth image data generated by the fourth camera, and fifth image data generated by the fifth camera; and processing the first image data to generate the first processed image data comprises at least: combining the third image data, the fourth image data, and the fifth image data to generate sixth image data, the sixth image data representing one or more images depicting at least a portion of the first FOV, at least a portion of the second FOV, and at least a portion of the third FOV; and encoding the sixth image data to generate the first processed image data.

In another embodiment of the first aspect, the second image data is processed at a first processing rate, and the one or more computer-readable media store further instructions that, when executed by the one or more processors, cause the one or more processors to perform further operations comprising: causing the first camera to generate third image data; after processing the second image data stored in the second buffer, processing, at a second processing rate, the third image data to generate third processed image data, the first processing rate is faster than the second processing rate; and sending, using the one or more network interfaces, the third processed image data to the computing system.

In a second aspect, a method comprises: causing one or more second cameras of an electronic device to generate first image data, the one or more second cameras including a first type of camera; detecting an event; after detecting the event, causing a first camera of the electronic device to begin generating second image data, the first camera including a second type of camera that is different than the first type of camera; while the first camera is generating the second image data, processing the first image data to generate first processed image data, the first processed image data being associated with a first time period prior to the event; sending the first processed image data to a computing system; and after sending the first processed image data to the computing system, sending the second image data to the computing system, the second image data being associated with a second time period after detecting the event.

In an embodiment of the second aspect, the method further comprising: prior to detecting the event, storing the first image data in one or more buffers; and after detecting the event, causing the one or more second cameras to cease generating the first image data.

In another embodiment of the second aspect, the method further comprising: while processing the first image data, storing the second image data in a buffer; and after processing the first image data, processing the second image data stored in the buffer to generate second processed image data, sending the second image data to the computing system comprises sending the second processed image data to the computing system.

In another embodiment of the second aspect, the second image data is processed at a first processing rate, and the method further comprises: after processing the second image data stored in the buffer, processing, at a second processing rate, third image data generated by the first camera to generate third processed image data, the first processing rate being faster than the second processing rate; and sending the third processed image data to the computing system.

In another embodiment of the second aspect, wherein: causing the one or more second cameras to generate the first image data comprises: causing a third camera of the one or more first cameras to generate third image data; causing a fourth camera of the one or more first cameras to generate fourth image data; and causing a fifth camera of the one or more first cameras to generate fifth image data; and processing the first image data to generate the first processed image data comprises combining at least a portion of the third image data, at least a portion of the fourth image data, and at least a portion of the fifth image data.

In another embodiment of the second aspect, wherein: the third image data represents a first image depicting a first field of view (FOV) of the third camera; the fourth image data represents a second image depicting a second FOV of the fourth camera; the fifth image data represents a third image depicting a third FOV of the fifth camera; the first processed image data represents a fourth image depicting a fourth FOV that includes at least a portion of the first FOV, at least a portion of the second FOV, and at least a portion of the third FOV; and causing the first camera to generate the second image data comprises causing the first camera to generate the second image data representing a fifth image depicting a fifth FOV of the first camera, a horizontal angle of the fifth FOV being equal to a horizontal angle of the fourth FOV, and a vertical angle of the fifth FOV being different than a vertical angle of the fourth FOV.

In another embodiment of the second aspect, detecting the event comprises detecting, using one or more motion sensors of the electronic device, possible motion of an object, and the method further comprises: determining that the first image data represents the object; and sending event data to the computing system, the event data indicating that the electronic device detected the object.

In another embodiment of the second aspect, the method further comprising: analyzing third image data generated by the one or more second cameras to determine: a number of black pixels represented by the third image data; a number of dark pixels represented by the third image data; a number of bright pixels represented by the third image data; and a number of saturated pixels represented by the third image data; and determining that an amount of light satisfies a light threshold based at least in part on the number of black pixels, the number of dark pixels, the number of bright pixels, and the number of saturated pixels, causing the one or more second cameras to generate the first image data occurs after determining that the amount of light satisfies the light threshold.

In another embodiment of the second aspect, the method further comprising: causing the one or more second cameras to operate in a first mode; determining that a period of time has elapsed, analyzing the third image data occurs after determining that the period of time has elapsed; and causing the one or more second cameras to operate in a second mode after determining that the amount of light satisfies the light threshold, the one or more second cameras use more power when operating in the second mode than when operating in the first mode.

In another embodiment of the second aspect, the method further comprising: analyzing fourth image data generated by the one or more first cameras to determine: an additional number of black pixels represented by the fourth image data; an additional number of dark pixels represented by the fourth image data; an additional number of bright pixels represented by the fourth image data; and an additional number of saturated pixels represented by the fourth image data; and determining that an additional amount of light does not satisfy the light threshold based at least in part on the additional number of black pixels, the additional number of dark pixels, the additional number of bright pixels, and the additional number of saturated pixels, causing the one or more second cameras to operate in the first mode occurs after determining that the additional amount of light does not satisfy the light threshold.

In another embodiment of the second aspect, wherein: the first image data includes a first image data format; the second image data includes a second image data format; and processing the first image data to generate the first processed image data comprises at least encoding the first image data to generate the first processed image data, the first processed image data including the second image data format.

In another embodiment of the second aspect, the method further comprising: determining that a time period has elapsed since detecting the event; after determining that the time period has elapsed since detecting the event, causing the one or more second cameras to generate third image data; and causing the first camera to cease generating the second image data.

In another embodiment of the second aspect, wherein: the second type of camera includes a first resolution; the first type of camera includes a second resolution; and the second resolution is greater than the first resolution.

In another embodiment of the second aspect, wherein: the second type of camera includes a camera having a color image sensor; and the first type of camera includes a camera having a monochromatic image sensor.

In a third aspect, an electronic device comprises: a first camera, the first camera including a first resolution; one or more second cameras, the one or more second cameras including a second resolution that is less than the first resolution; one or more network interfaces; one or more first processors; and one or more computer-readable media storing instructions that, when executed by the one or more processors, cause the one or more processor to perform operations comprising: causing the one or more second cameras to generate first image data; detecting an event; after detecting the event, causing the first camera to begin generating second image data; processing the first image data to generate first processed image data, the first processed image data being associated with a first time period prior to the event; sending, using the one or more network interfaces, the first processed image data to a computing system; and after sending the first processed image data to the computing system, sending, using the one or more network interfaces, the second image data to the computing system.

In an embodiment of the third aspect, the one or more computer-readable media storing further instructions that, when executed by the one or more processors, cause the one or more processors to perform further operations comprising: while processing the first image data, storing the second image data in a buffer; and after processing the first image data, processing the second image data stored in the buffer to generate second processed image data, wherein sending the second image data to the computing system comprises sending, using the one or more network interfaces, the second processed image data to the computing system.

In another embodiment of the third aspect, wherein: causing the one or more second cameras to generate the first image data comprises: causing a third camera of the one or more second cameras to generate third image data; causing a fourth camera of the one or more second cameras to generate fourth image data; and causing a fifth camera of the one or more second cameras to generate fifth image data; and processing the first image data to generate the first processed image data comprises combining at least a portion of the third image data, at least a portion of the fourth image data, and at least a portion of the fifth image data.

What is claimed is:

1. A method comprising:
receiving a signal from a motion sensor of an electronic device;
determining, based at least in part on the signal, that the motion sensor detected first motion;
causing a first camera of the electronic device to generate first image data, wherein the first camera is a first type of camera;

causing a second camera of the electronic device to generate second image data, wherein the second camera is the first type of camera;

causing a third camera of the electronic device to generate third image data, wherein the third camera is the first type of camera;

based at least in part on the determining that the motion sensor detected the first motion, analyzing the first image data to verify the first motion;

causing a fourth camera of the electronic device to begin generating fourth image data, wherein the fourth camera is a second type of camera that is different than the first type of camera;

generating first processed image data by combining at least a portion of the first image data, at least a portion of the second image data, and at least a portion of the third image data;

during the generating of the first processed image data, storing the fourth image data in one or more first buffers;

after the generating of the first processed image data, generating second processed image data using the fourth image data;

sending the first processed image data to a computing system; and sending the second processed image data to the computing system.

2. The method as recited in claim 1, further comprising:
storing the first image data in one or more second buffers;
storing the second image data in the one or more second buffers; and
storing the third image data in the one or more second buffers.

3. The method as recited in claim 1, wherein:
the first image data represents a first image depicting a first field of view (FOV) of the first camera;
the second image data represents a second image depicting a second FOV of the second camera;
the third image data represents a third image depicting a third FOV of the third camera;
the first processed image data represents a fourth image depicting a fourth FOV that includes at least a portion of the first FOV, at least a portion of the second FOV, and at least a portion of the third FOV; and
the second processed image data represents a fifth image depicting a fifth FOV of the fourth camera, a horizontal angle of the fifth FOV being substantially equal to a horizontal angle of the fourth FOV, and a vertical angle of the fifth FOV being different than a vertical angle of the fourth FOV.

4. The method as recited in claim 1, further comprising sending event data to the computing system, the event data indicating that the electronic device detected the first motion.

5. The method as recited in claim 1, further comprising:
causing the first camera to generate fifth image data;
analyzing the fifth image data to determine:
  a first number of black pixels represented by the fifth image data;
  a first number of dark pixels represented by the fifth image data;
  a first number of bright pixels represented by the fifth image data; and
  a first number of saturated pixels represented by the fifth image data; and
determining that a first amount of light satisfies a light threshold based at least in part on the first number of black pixels, the first number of dark pixels, the first number of bright pixels, and the first number of saturated pixels,
wherein the causing of the first camera to generate the first image data is based at least in part on the determining that the first amount of light satisfies the light threshold.

6. The method as recited in claim 5, further comprising:
causing the first camera to operate in a first power state;
determining that a period of time has elapsed, wherein the analyzing of the fifth image data is based at least in part on the determining that the period of time has elapsed; and
causing the first camera to operate in a second power state based at least in part on the determining that the first amount of light satisfies the light threshold, wherein the first camera uses more power when operating in the second power state than when operating in the first power state.

7. The method as recited in claim 6, further comprising:
causing the first camera to generate sixth image data;
analyzing the sixth image data to determine:
  a second number of black pixels represented by the sixth image data;
  a second number of dark pixels represented by the sixth image data;
  a second number of bright pixels represented by the sixth image data; and
  a second number of saturated pixels represented by the sixth image data; and
determining that a second amount of light does not satisfy the light threshold based at least in part on the second number of black pixels, the second number of dark pixels, the second number of bright pixels, and the second number of saturated pixels,
wherein the causing the first camera to operate in the first power state is based at least in part on the determining that the second amount of light does not satisfy the light threshold.

8. The method as recited in claim 1, wherein:
the first processed image data includes an image data format;
the second processed image data includes the image data format.

9. The method as recited in claim 1, further comprising:
determining that a time period has elapsed since the detecting of the first motion; and
based at least in part on the determining that the time period has elapsed, causing the fourth camera to cease generating the fourth image data.

10. The method as recited in claim 1, wherein:
the second type of camera includes a first resolution;
the first type of camera includes a second resolution; and
the first resolution is greater than the second resolution.

11. The method as recited in claim 1, wherein:
the second type of camera includes a color image sensor; and
the first type of camera includes a monochromatic image sensor.

12. An electronic device comprising:
a motion sensor;
a first camera, wherein the first camera is a first type of camera;
a second camera, wherein the second camera is the first type of camera;
a third camera, wherein the third camera is a second type of camera that is different than the first type of camera;
one or more processors; and one or more non-transitory computer-readable media storing instructions that, when executed by the one or more processors, cause the electronic device to perform operations comprising:
  detecting motion using the motion sensor;
  generating first image data using the first camera;
  storing the first image data in one or more first buffers;
  generating second image data using the second camera;
  storing the second image data in the one or more first buffers;
  based at least in part on the detecting of the motion, analyzing the first image data to determine that the first image data represents an object;
  generating third image data using the third camera;
  generating first processed image data by combining at least a portion of the first image data and at least a portion of the second image data;
  while the generating of the first processed image data, storing the third image data in one or more second buffers;
  after the generating of the first processed image data, generating second processed image data using the third image data;
  sending the first processed image data to a computing system; and
 sending the second processed image data to the computing system.

13. The electronic device as recited in claim 12, further comprising:
  a fourth camera,
  wherein the one or more computer-readable media store further instructions that, when executed by the one or more processors, cause the electronic device to perform further operations comprising
    generating fourth image data using the fourth camera,
  wherein the generating of the first processed image data further uses at least a portion of the fourth image data.

14. The method as recited in claim 1, further comprising:
  storing event data representing a type;
  determining that the first image data represents an object;
  determining that the object includes the type; and
  determining that an event occurred based at least in part on the determining that the object includes the type,
  and wherein the causing of the fourth camera to begin the generating of the fourth image data is further based at least in part on the determining that the event occurred.

15. The method as recited in claim 1, further comprising:
  determining that a first amount of light satisfies a threshold, wherein the causing the first camera to generate the first image data based at least in part on the first amount of light satisfying the threshold;
  determining that a second amount of light does not satisfy the threshold; and
  causing the first camera to cease from generating fifth image data based at least in part on the second amount of light not satisfying the threshold.

16. The method as recited in claim 1, further comprising, based at least in part on verifying the first motion, causing at least one of:
  the first camera to turn off;
  the second camera to turn off; or
  the third camera to turn off.

17. The method as recited in claim 1, further comprising, based at least in part on verifying the first motion, causing at least one of:
  the first camera to change from a first power state to a second power state;
  the second camera to change from the first power state to the second power state; or
  the third camera to change from the first power state to the second power state.

18. The method as recited in claim 1, further comprising, based at least in part on verifying the first motion, causing at least one of:
  the first camera to cease storing the first image data in one or more second buffers;
  the second camera to cease storing second image data in the one or more second buffers; or
  the third camera to cease storing third image data in the one or more second buffers.

19. The method as recited in claim 1, wherein the analyzing of the first image data to verify the first motion comprises at least one of:
  analyzing the first image data to determine that the first image data represents an object; or
  analyzing the first image data to determine that the first image data represents second motion.

20. A method comprising:
  causing a first camera of an electronic device to generate first image data, wherein the first camera is a first type of camera;
  storing the first image data in one or more first buffers;
  causing a second camera of the electronic device to generate second image data, wherein the second camera is the first type of camera;
  storing the second image data in the one or more first buffers;
  determining that the first image data represents an object;
  based at least in part on the first image data representing the object, causing a third camera of the electronic device to begin generating third image data, wherein the third camera is a second type of camera that is different than the first type of camera;
  generating first processed image data by combining at least a portion of the first image data and at least a portion of the second image data;
  while the generating of the first processed image data, storing the third image data in one or more second buffers;
  after the generating of the first processed image data, generating second processed image data using the third image data;
  sending the first processed image data to a computing system; and
  sending the second processed image data to the computing system.

* * * * *